(12) United States Patent
Ardaud et al.

(10) Patent No.: US 12,543,028 B2
(45) Date of Patent: Feb. 3, 2026

(54) LOW-BANDWIDTH AND EMERGENCY COMMUNICATION USER INTERFACES

(71) Applicant: Apple Inc., Cupertino, CA (US)

(72) Inventors: Guillaume R. Ardaud, San Francisco, CA (US); Julian K. Missig, Redwood City, CA (US); Matan Stauber, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/941,400

(22) Filed: Sep. 9, 2022

(65) Prior Publication Data

US 2023/0081032 A1 Mar. 16, 2023

Related U.S. Application Data

(60) Provisional application No. 63/243,502, filed on Sep. 13, 2021.

(51) Int. Cl.
*H04W 4/90* (2018.01)
*H04W 76/50* (2018.01)
*H04W 92/08* (2009.01)

(52) U.S. Cl.
CPC ............ *H04W 4/90* (2018.02); *H04W 76/50* (2018.02); *H04W 92/08* (2013.01)

(58) Field of Classification Search
CPC ...................................................... H04W 4/90
USPC ...................................................... 455/404.1
See application file for complete search history.

(56) References Cited

U.S. PATENT DOCUMENTS

| | | |
|---|---|---|
| 5,146,231 A | 9/1992 | Ghaem et al. |
| 5,303,286 A | 4/1994 | Wiedeman |
| 5,446,465 A | 8/1995 | Diefes et al. |
| 5,583,514 A | 12/1996 | Fulop |
| 5,587,717 A | 12/1996 | Jang |
| 5,812,932 A | 9/1998 | Wiedeman et al. |
| 5,863,057 A | 1/1999 | Wessels |
| 5,937,349 A | 8/1999 | Andresen |
| 5,995,041 A | 11/1999 | Bradley et al. |
| 6,006,068 A | 12/1999 | Elkin et al. |
| 6,052,587 A | 4/2000 | Moraes et al. |
| 6,108,538 A | 8/2000 | Blasiak et al. |
| 6,147,644 A | 11/2000 | Castles et al. |
| 6,157,896 A | 12/2000 | Castles et al. |
| 6,169,881 B1 | 1/2001 | Astrom et al. |
| 6,208,858 B1 | 3/2001 | Antonio et al. |
| 6,240,366 B1 | 5/2001 | Nagatsuma et al. |
| 6,263,280 B1 | 7/2001 | Stingone, Jr. |

(Continued)

FOREIGN PATENT DOCUMENTS

| | | |
|---|---|---|
| CN | 101938287 A | 1/2011 |
| CN | 102215295 A | 10/2011 |

(Continued)

OTHER PUBLICATIONS

International Preliminary Report on Patentability received for PCT Patent Application No. PCT/US2022/043183, mailed on Mar. 28, 2024, 12 pages.

(Continued)

*Primary Examiner* — Qutbuddin Ghulamali
(74) *Attorney, Agent, or Firm* — YHE Law LLP

(57) ABSTRACT

The present disclosure generally relates to low-bandwidth and emergency communication user interfaces.

58 Claims, 28 Drawing Sheets

(56) References Cited

U.S. PATENT DOCUMENTS

| | | |
|---|---|---|
| 6,272,316 B1 | 8/2001 | Wiedeman et al. |
| 6,278,861 B1 | 8/2001 | Ward et al. |
| 6,317,689 B1 | 11/2001 | Lee |
| 6,397,054 B1 * | 5/2002 | Hoirup ............... H04B 7/18567 455/450 |
| 6,549,848 B1 | 4/2003 | Green et al. |
| 6,580,452 B1 | 6/2003 | Gangitano |
| 6,690,934 B1 | 2/2004 | Conrad et al. |
| 6,763,226 B1 | 7/2004 | Mczeal, Jr. |
| 6,992,991 B2 | 1/2006 | Duske et al. |
| 7,184,744 B1 | 2/2007 | Schnabel |
| 7,233,795 B1 | 6/2007 | Ryden |
| 7,311,608 B1 | 12/2007 | Danieli et al. |
| 7,738,912 B1 | 6/2010 | Hawkins et al. |
| 7,865,205 B1 | 1/2011 | Lundy et al. |
| 7,890,134 B2 | 2/2011 | Richardson et al. |
| 8,095,665 B1 | 1/2012 | Bau |
| 8,249,585 B2 | 8/2012 | Tronc et al. |
| 8,254,970 B1 | 8/2012 | Oshinsky et al. |
| 8,521,122 B2 | 8/2013 | Scott et al. |
| 8,554,170 B2 | 10/2013 | Franz et al. |
| 8,676,121 B1 | 3/2014 | Monte et al. |
| 8,688,450 B2 | 4/2014 | Lloyd et al. |
| 8,855,012 B1 | 10/2014 | Suri |
| 8,890,685 B1 | 11/2014 | Sookman et al. |
| 8,971,946 B2 | 3/2015 | Ahmed et al. |
| 9,037,164 B2 | 5/2015 | Keerthi |
| 9,235,923 B1 | 1/2016 | Robinson et al. |
| 9,325,852 B2 | 4/2016 | Forstall et al. |
| 9,369,832 B1 | 6/2016 | Noble et al. |
| 9,408,077 B1 | 8/2016 | David et al. |
| 9,418,537 B2 * | 8/2016 | Cahill ..................... H04W 4/90 |
| 9,430,186 B2 | 8/2016 | Faaborg et al. |
| 9,503,177 B1 | 11/2016 | Shi et al. |
| 9,521,378 B1 | 12/2016 | Palaganas et al. |
| 9,575,720 B2 | 2/2017 | Faaborg et al. |
| 9,769,639 B2 * | 9/2017 | Cole, Jr. ................ H04W 4/90 |
| 9,947,363 B2 | 4/2018 | Moon et al. |
| 10,116,893 B1 | 10/2018 | Reis et al. |
| 10,419,712 B2 | 9/2019 | Arrasvuori et al. |
| 10,459,504 B2 | 10/2019 | Veloso et al. |
| 10,511,707 B2 | 12/2019 | Johnson et al. |
| 10,560,562 B1 | 2/2020 | Tandon |
| 10,608,978 B2 | 3/2020 | Koum et al. |
| 10,623,451 B2 | 4/2020 | Rathod |
| 10,645,561 B1 | 5/2020 | Guo et al. |
| 10,791,536 B1 | 9/2020 | Murphy |
| 10,797,785 B1 | 10/2020 | Rhee |
| 10,853,410 B2 | 12/2020 | Herz |
| 10,959,074 B1 | 3/2021 | Shuman et al. |
| 10,999,158 B2 | 5/2021 | Kramar et al. |
| 11,003,315 B2 | 5/2021 | Sung et al. |
| 11,144,176 B2 | 10/2021 | Chang et al. |
| 11,349,559 B1 | 5/2022 | Reuss et al. |
| 11,455,078 B1 | 9/2022 | Goodrich et al. |
| 11,938,880 B2 * | 3/2024 | Jones ..................... B60R 21/01 |
| 2001/0043011 A1 | 11/2001 | Ugusa et al. |
| 2002/0000931 A1 | 1/2002 | Petronic et al. |
| 2002/0006117 A1 | 1/2002 | Duske et al. |
| 2002/0131330 A1 | 9/2002 | Zion et al. |
| 2003/0054814 A1 | 3/2003 | Karabinis et al. |
| 2003/0083816 A1 | 5/2003 | Imakado et al. |
| 2004/0166811 A1 | 8/2004 | Moon |
| 2004/0183281 A1 | 9/2004 | Stopczynski |
| 2004/0192368 A1 | 9/2004 | Edwards et al. |
| 2004/0257275 A1 | 12/2004 | Yee et al. |
| 2005/0085215 A1 | 4/2005 | Kokko et al. |
| 2005/0143135 A1 | 6/2005 | Brems et al. |
| 2006/0017612 A1 | 1/2006 | Nagatani |
| 2006/0030334 A1 | 2/2006 | Hashimoto |
| 2006/0095563 A1 | 5/2006 | Benjamin et al. |
| 2006/0247915 A1 | 11/2006 | Bradford et al. |
| 2006/0258365 A1 | 11/2006 | Cha et al. |
| 2007/0047697 A1 | 3/2007 | Drewry et al. |
| 2007/0109186 A1 | 5/2007 | Fujiwara et al. |
| 2007/0123252 A1 | 5/2007 | Tronc et al. |
| 2007/0130606 A1 | 6/2007 | Jeong |
| 2007/0142028 A1 | 6/2007 | Ayoub et al. |
| 2007/0188380 A1 | 8/2007 | Duong et al. |
| 2007/0216572 A1 | 9/2007 | Schnabel |
| 2008/0030496 A1 | 2/2008 | Lee et al. |
| 2008/0076410 A1 | 3/2008 | Beyer |
| 2008/0153538 A1 | 6/2008 | Oshaughnessy et al. |
| 2008/0165022 A1 | 7/2008 | Herz et al. |
| 2008/0166011 A1 | 7/2008 | Sever et al. |
| 2008/0168290 A1 | 7/2008 | Jobs et al. |
| 2008/0168361 A1 | 7/2008 | Forstall et al. |
| 2008/0168379 A1 | 7/2008 | Forstall et al. |
| 2008/0186135 A1 | 8/2008 | Boling et al. |
| 2008/0303715 A1 | 12/2008 | Wang et al. |
| 2008/0313686 A1 | 12/2008 | Matvey |
| 2009/0049905 A1 | 2/2009 | Lawhite et al. |
| 2009/0083382 A1 | 3/2009 | Rosenberg et al. |
| 2009/0135062 A1 | 5/2009 | Hori |
| 2009/0191854 A1 | 7/2009 | Beason |
| 2009/0191893 A1 | 7/2009 | Smith |
| 2009/0205041 A1 | 8/2009 | Michalske |
| 2009/0241072 A1 | 9/2009 | Chaudhri et al. |
| 2009/0262033 A1 | 10/2009 | King et al. |
| 2009/0267828 A1 | 10/2009 | Kobayashi et al. |
| 2009/0279674 A1 | 11/2009 | Roberts |
| 2010/0062749 A1 | 3/2010 | Yasuda et al. |
| 2010/0083159 A1 | 4/2010 | Mountain et al. |
| 2010/0085255 A1 | 4/2010 | Wakabayashi |
| 2010/0113020 A1 | 5/2010 | Subramanian et al. |
| 2010/0162169 A1 | 6/2010 | Skarp |
| 2010/0167672 A1 | 7/2010 | Ahn et al. |
| 2010/0257490 A1 | 10/2010 | Lyon et al. |
| 2010/0271312 A1 | 10/2010 | Alameh et al. |
| 2010/0311385 A1 | 12/2010 | Hurwitz |
| 2011/0013075 A1 | 1/2011 | Kim et al. |
| 2011/0088003 A1 | 4/2011 | Swink et al. |
| 2011/0092158 A1 | 4/2011 | Plamondon |
| 2011/0130113 A1 | 6/2011 | Takuno |
| 2011/0136428 A1 | 6/2011 | Ritter |
| 2011/0157046 A1 | 6/2011 | Lee et al. |
| 2011/0228721 A1 | 9/2011 | Shinohara et al. |
| 2011/0230161 A1 | 9/2011 | Newman |
| 2011/0248948 A1 | 10/2011 | Griffin et al. |
| 2011/0291974 A1 | 12/2011 | Son et al. |
| 2011/0306292 A1 | 12/2011 | Wilson et al. |
| 2012/0015622 A1 | 1/2012 | Kuz et al. |
| 2012/0068899 A1 | 3/2012 | Ayotte et al. |
| 2012/0081356 A1 | 4/2012 | Filippov et al. |
| 2012/0124516 A1 | 5/2012 | Friedman |
| 2012/0135715 A1 | 5/2012 | Kang et al. |
| 2012/0140767 A1 | 6/2012 | Brothers et al. |
| 2012/0237002 A1 | 9/2012 | Sennett et al. |
| 2012/0239822 A1 | 9/2012 | Poulson et al. |
| 2012/0302200 A1 | 11/2012 | Esbensen |
| 2013/0045708 A1 | 2/2013 | Nguyen et al. |
| 2013/0088455 A1 | 4/2013 | Jeong |
| 2013/0109425 A1 | 5/2013 | Kerger et al. |
| 2013/0127665 A1 | 5/2013 | Miller et al. |
| 2013/0135146 A1 | 5/2013 | Ransom et al. |
| 2013/0183924 A1 | 7/2013 | Saigh et al. |
| 2013/0197951 A1 | 8/2013 | Watson et al. |
| 2013/0205350 A1 | 8/2013 | Ling et al. |
| 2013/0225118 A1 | 8/2013 | Jang et al. |
| 2013/0231077 A1 | 9/2013 | Cahill |
| 2013/0271319 A1 | 10/2013 | Trerise |
| 2013/0271320 A1 | 10/2013 | Trerise |
| 2013/0295872 A1 | 11/2013 | Guday et al. |
| 2013/0295982 A1 | 11/2013 | Lee et al. |
| 2013/0301521 A1 | 11/2013 | Abdi |
| 2013/0315108 A1 | 11/2013 | Lindner et al. |
| 2013/0326642 A1 | 12/2013 | Hajj et al. |
| 2013/0332026 A1 | 12/2013 | Mckown et al. |
| 2014/0022192 A1 | 1/2014 | Hatanaka |
| 2014/0028601 A1 | 1/2014 | Moore et al. |
| 2014/0039894 A1 | 2/2014 | Shostak |
| 2014/0064463 A1 | 3/2014 | Reddy |
| 2014/0071060 A1 | 3/2014 | Santos-Gomez |
| 2014/0134969 A1 | 5/2014 | Jin et al. |

(56) References Cited

U.S. PATENT DOCUMENTS

| | | |
|---|---|---|
| 2014/0177396 A1 | 6/2014 | Lee et al. |
| 2014/0213214 A1 | 7/2014 | Reis |
| 2014/0213236 A1 | 7/2014 | Jimbo et al. |
| 2014/0237393 A1* | 8/2014 | Van Wie .............. G06F 3/0482 715/757 |
| 2014/0245783 A1 | 9/2014 | Proud et al. |
| 2014/0267543 A1 | 9/2014 | Kerger et al. |
| 2014/0283142 A1 | 9/2014 | Shepherd et al. |
| 2014/0327629 A1 | 11/2014 | Jobs et al. |
| 2014/0370841 A1 | 12/2014 | Roberts et al. |
| 2015/0011220 A1 | 1/2015 | Buckle et al. |
| 2015/0018040 A1 | 1/2015 | He et al. |
| 2015/0040012 A1 | 2/2015 | Faaborg et al. |
| 2015/0052618 A1 | 2/2015 | Michalske |
| 2015/0063428 A1 | 3/2015 | Lever |
| 2015/0065077 A1 | 3/2015 | Kim et al. |
| 2015/0079923 A1 | 3/2015 | McNeil |
| 2015/0089398 A1 | 3/2015 | Song et al. |
| 2015/0097687 A1 | 4/2015 | Sloo et al. |
| 2015/0137972 A1 | 5/2015 | Nepo |
| 2015/0141072 A1 | 5/2015 | Mumick |
| 2015/0189091 A1 | 7/2015 | Forstall et al. |
| 2015/0208220 A1 | 7/2015 | Hulan |
| 2015/0257126 A1 | 9/2015 | Herz |
| 2015/0261496 A1 | 9/2015 | Faaborg et al. |
| 2015/0271317 A1 | 9/2015 | Nelson et al. |
| 2015/0319284 A1 | 11/2015 | Leonessi |
| 2015/0338524 A1 | 11/2015 | Ben Moshe et al. |
| 2015/0341759 A1 | 11/2015 | Kerger et al. |
| 2015/0350296 A1 | 12/2015 | Yang et al. |
| 2015/0358790 A1 | 12/2015 | Nasserbakht |
| 2016/0014059 A1 | 1/2016 | Rathod |
| 2016/0056525 A1 | 2/2016 | Hansryd et al. |
| 2016/0057595 A1 | 2/2016 | Ahmed et al. |
| 2016/0062540 A1 | 3/2016 | Yang et al. |
| 2016/0065669 A1 | 3/2016 | Van Dijkman et al. |
| 2016/0066277 A1 | 3/2016 | Yang et al. |
| 2016/0088455 A1 | 3/2016 | Bozik et al. |
| 2016/0183098 A1 | 6/2016 | Lim |
| 2016/0191694 A1 | 6/2016 | Kim et al. |
| 2016/0192163 A1 | 6/2016 | Miner et al. |
| 2016/0227023 A1 | 8/2016 | Maly et al. |
| 2016/0234664 A1 | 8/2016 | Vendrow et al. |
| 2016/0277903 A1* | 9/2016 | Poosala .............. G06F 3/0488 |
| 2016/0302083 A1 | 10/2016 | Durick et al. |
| 2016/0306051 A1 | 10/2016 | Hirabayashi et al. |
| 2016/0374047 A1 | 12/2016 | Reis |
| 2017/0006620 A1 | 1/2017 | Reis |
| 2017/0021260 A1 | 1/2017 | Willett et al. |
| 2017/0026110 A1 | 1/2017 | Richardson et al. |
| 2017/0026509 A1 | 1/2017 | Rand |
| 2017/0045623 A1 | 2/2017 | Zlogar et al. |
| 2017/0053461 A1 | 2/2017 | Pal et al. |
| 2017/0069191 A1 | 3/2017 | Erkkila |
| 2017/0085600 A1 | 3/2017 | Carter et al. |
| 2017/0150060 A1 | 5/2017 | Herz |
| 2017/0171636 A1 | 6/2017 | Devlin et al. |
| 2017/0180964 A1 | 6/2017 | Mehta et al. |
| 2017/0223162 A1 | 8/2017 | Wilder et al. |
| 2017/0330436 A1 | 11/2017 | Williams et al. |
| 2017/0332045 A1 | 11/2017 | Metter et al. |
| 2017/0357411 A1 | 12/2017 | Williams et al. |
| 2018/0032234 A1 | 2/2018 | Michalske |
| 2018/0035922 A1 | 2/2018 | Kim et al. |
| 2018/0040951 A1 | 2/2018 | Uchiyama |
| 2018/0088242 A1 | 3/2018 | Eagling |
| 2018/0092057 A1 | 3/2018 | Yamashita et al. |
| 2018/0095635 A1 | 4/2018 | Valdivia et al. |
| 2018/0176362 A1 | 6/2018 | Cohen |
| 2018/0192264 A1 | 7/2018 | Kwok et al. |
| 2018/0270000 A1 | 9/2018 | Reis et al. |
| 2018/0316416 A1 | 11/2018 | Reis et al. |
| 2018/0316885 A1 | 11/2018 | Reis et al. |
| 2018/0338026 A1 | 11/2018 | Jon et al. |
| 2018/0338035 A1 | 11/2018 | Johnson et al. |
| 2018/0338237 A1 | 11/2018 | Maheswaranathan |
| 2018/0338334 A1 | 11/2018 | Jin et al. |
| 2019/0020992 A1 | 1/2019 | Romano |
| 2019/0049592 A1 | 2/2019 | Koontz et al. |
| 2019/0190591 A1 | 6/2019 | Wang et al. |
| 2019/0200684 A1 | 7/2019 | Ballstaedt |
| 2019/0280788 A1 | 9/2019 | Hardy et al. |
| 2019/0318283 A1 | 10/2019 | Kelly et al. |
| 2019/0387092 A1 | 12/2019 | Tessier |
| 2020/0025944 A1 | 1/2020 | Mellier et al. |
| 2020/0053641 A1 | 2/2020 | Lee et al. |
| 2020/0117900 A1 | 4/2020 | Deng et al. |
| 2020/0119984 A1 | 4/2020 | Bouvet et al. |
| 2020/0132644 A1 | 4/2020 | Micalizzi et al. |
| 2020/0187295 A1 | 6/2020 | Li et al. |
| 2020/0196209 A1 | 6/2020 | Cui et al. |
| 2020/0201540 A1 | 6/2020 | Zambetti et al. |
| 2020/0213436 A1 | 7/2020 | Mumick |
| 2020/0244673 A1 | 7/2020 | Stockdale et al. |
| 2020/0252780 A1 | 8/2020 | Mcclendon et al. |
| 2020/0304444 A1* | 9/2020 | Aneja .................... H04L 51/56 |
| 2020/0367069 A1 | 11/2020 | Struhsaker et al. |
| 2020/0383153 A1 | 12/2020 | Agarwal et al. |
| 2021/0006287 A1 | 1/2021 | Peeters et al. |
| 2021/0011173 A1 | 1/2021 | Rhee |
| 2021/0051444 A1 | 2/2021 | Ryu et al. |
| 2021/0058149 A1 | 2/2021 | Nuttall et al. |
| 2021/0110682 A1 | 4/2021 | Howard et al. |
| 2021/0120394 A1 | 4/2021 | Martin et al. |
| 2021/0144539 A1 | 5/2021 | Edge et al. |
| 2021/0168581 A1 | 6/2021 | Van Den Dungen |
| 2021/0175963 A1 | 6/2021 | Chang et al. |
| 2021/0243072 A1 | 8/2021 | Peterson et al. |
| 2021/0311203 A1 | 10/2021 | Reis et al. |
| 2021/0311613 A1 | 10/2021 | Williams et al. |
| 2022/0066048 A1 | 3/2022 | Diggelen et al. |
| 2022/0091737 A1 | 3/2022 | Bower et al. |
| 2022/0108595 A1 | 4/2022 | Jiang et al. |
| 2022/0116105 A1 | 4/2022 | Robinson et al. |
| 2022/0131822 A1 | 4/2022 | Jon et al. |
| 2022/0253136 A1 | 8/2022 | Holder et al. |
| 2022/0256631 A1 | 8/2022 | Jain et al. |
| 2022/0359064 A1 | 11/2022 | Pierson et al. |
| 2023/0063173 A1 | 3/2023 | Caro et al. |
| 2023/0065219 A1 | 3/2023 | Caro et al. |
| 2023/0066232 A1 | 3/2023 | Caro et al. |
| 2023/0308538 A1 | 9/2023 | Caro et al. |
| 2023/0328171 A1 | 10/2023 | Caro et al. |
| 2024/0080389 A1 | 3/2024 | Lauritzen |
| 2024/0104859 A1 | 3/2024 | Chand et al. |
| 2024/0241627 A1 | 7/2024 | Williams et al. |
| 2024/0406700 A1 | 12/2024 | Paul et al. |
| 2025/0085827 A1 | 3/2025 | Caro et al. |
| 2025/0159074 A1 | 5/2025 | Caro et al. |
| 2025/0342671 A1 | 11/2025 | Chand et al. |
| 2025/0350541 A1 | 11/2025 | Paul |
| 2025/0350914 A1 | 11/2025 | Chang et al. |

FOREIGN PATENT DOCUMENTS

| | | |
|---|---|---|
| CN | 102752448 A | 10/2012 |
| CN | 102905244 A | 1/2013 |
| CN | 101938287 B | 6/2013 |
| CN | 103297610 A | 9/2013 |
| CN | 104168367 A | 11/2014 |
| CN | 104641318 A | 5/2015 |
| CN | 105283840 A | 1/2016 |
| CN | 105453025 A | 3/2016 |
| CN | 105554225 A | 5/2016 |
| CN | 105786394 A | 7/2016 |
| CN | 106104677 A | 11/2016 |
| CN | 108718447 A | 10/2018 |
| EP | 0963061 A2 | 12/1999 |
| EP | 2782297 A1 | 9/2014 |
| EP | 2981000 A1 | 2/2016 |
| EP | 3248180 A1 | 11/2017 |
| EP | 3676972 B1 | 2/2022 |
| JP | 9-172401 A | 6/1997 |
| JP | 10-191423 A | 7/1998 |

(56) References Cited

FOREIGN PATENT DOCUMENTS

| | | |
|---|---|---|
| JP | 2000-40990 A | 2/2000 |
| JP | 2001-320449 A | 11/2001 |
| JP | 2002-197577 A | 7/2002 |
| JP | 2003-75525 A | 3/2003 |
| JP | 2004-96265 A | 3/2004 |
| JP | 2004-328289 A | 11/2004 |
| JP | 2008-257363 A | 10/2008 |
| JP | 4465365 B2 | 5/2010 |
| JP | 4501833 B2 | 7/2010 |
| JP | 2013-140164 A | 7/2013 |
| JP | 2013-239979 A | 11/2013 |
| JP | 2016-15624 A | 1/2016 |
| JP | 2018-532298 A | 11/2018 |
| JP | 2019-505117 A | 2/2019 |
| JP | 2021-40276 A | 3/2021 |
| JP | 6853820 B2 | 3/2021 |
| KR | 10-2015-0094197 A | 8/2015 |
| KR | 10-2016-0018109 A | 2/2016 |
| KR | 10-2016-0097913 A | 8/2016 |
| KR | 10-2016-0135779 A | 11/2016 |
| KR | 10-2514692 B1 | 3/2023 |
| WO | 2005/057890 A2 | 6/2005 |
| WO | 2007/139580 A1 | 12/2007 |
| WO | 2010/064716 A1 | 6/2010 |
| WO | 2014/197339 A1 | 12/2014 |
| WO | 2014/200729 A2 | 12/2014 |
| WO | 2014/200731 A1 | 12/2014 |
| WO | 2015/017043 A1 | 2/2015 |
| WO | 2015/062237 A1 | 5/2015 |
| WO | 2015/192277 A1 | 12/2015 |
| WO | 2016/060848 A1 | 4/2016 |
| WO | 2016/116814 A1 | 7/2016 |
| WO | 2019/118020 A1 | 6/2019 |
| WO | 2022/147146 A1 | 7/2022 |
| WO | 2023/034323 A1 | 3/2023 |

OTHER PUBLICATIONS

Office Action received for Japanese Patent Application No. 2022-557929, mailed on Mar. 29, 2024, 8 pages (4 pages of English Translation and 4 pages of Official Copy).
Office Action received for Japanese Patent Application No. 2023-001269, mailed on Mar. 22, 2024, 14 pages (7 pages of English Translation and 7 pages of Official Copy).
Office Action received for Japanese Patent Application No. 2023-001270, mailed on Mar. 22, 2024, 10 pages (5 pages of English Translation and 5 pages of Official Copy).
Applicant-Initiated Interview Summary received for U.S. Appl. No. 17/899,510, mailed on Jan. 4, 2024, 2 pages.
Decision to Grant received for European Patent Application No. 22197456.1, mailed on Aug. 29, 2024, 3 pages.
Result of Consultation received for European Patent Application No. 17810730.6, mailed on May 2, 2024, 4 pages.
Chand et al., "A mobile application for Women's Safety: WoSApp", TENCON 2015-2015 IEEE Region 10 Conference doi: 10.1109/TENCON.2015.7373171., Nov. 1-4, 2015, 5 pages.
Faiz et al., "Smart vehicle accident detection and alarming system using a smartphone", 2015 International Conference on Computer and Information Engineering (ICCIE), doi: 10.1109/CCIE.2015. 7399319., Nov. 26-27, 2015, pp. 66-69.
Fernandes et al., "Mobile Application for Automatic Accident Detection and Multimodal Alert", 2015 IEEE 81st Vehicular Technology Conference (VTC Spring), doi: 10.1109NTCSpring.2015. 7145935., May 11-14, 2015, 5 pages.
Inso et al., "Play it safe a personal security application on Android platform", 2016 Fifth ICT International Student Project Conference (ICT-ISPC), doi: 10.1109/ICT-ISPC.2016.7519254., May 27-28, 2016, 4 pages.
Invitation to Pay Additional Fees and Partial International Search Report received for PCT Patent Application No. PCT/US2022/042069, mailed on Dec. 22, 2022, 14 pages.

Invitation to Pay Additional Fees received for PCT Patent Application No. PCT/US2022/043183, mailed on Nov. 30, 2022, 10 pages.
Non-Final Office Action received for U.S. Appl. No. 17/349, 191, mailed on Dec. 21, 2022, 13 pages.
International Preliminary Report on Patentability received for PCT Patent Application No. PCT/US2022/042069, mailed on Mar. 14, 2024, 15 pages.
International Search Report and Written Opinion received for PCT Patent Application No. PCT/US2023/033376, mailed on Mar. 18, 2024, 21 pages.
Invitation to Pay Additional Fees and Partial International Search Report received for PCT Patent Application No. PCT/US2023/033376, mailed on Jan. 24, 2024, 13 pages.
Non-Final Office Action received for U.S. Appl. No. 17/899,510, mailed on Mar. 27, 2024, 22 pages.
Applicant-Initiated Interview Summary received for U.S. Appl. No. 17/899,510. mailed on Nov. 22, 2023, 2 pages.
Final Office Action received for U.S. Appl. No. 17/899,510, mailed on Nov. 30, 2023, 21 pages.
Notice of Allowance received for U.S. Appl. No. 17/349,191, mailed on Nov. 29, 2023, 8 pages.
Applicant-Initiated Interview Summary received for U.S. Appl. No. 17/899,510, mailed on Jun. 5, 2024, 2 pages.
Intention to Grant received for European Patent Application No. 17810730.6, mailed on Jun. 11, 2024, 9 pages.
Notice of Allowance received for U.S. Appl. No. 17/899,510, mailed on Sep. 11, 2024, 20 pages.
Office Action received for Australian Patent Application No. 2023270278, mailed on Sep. 17, 2024, 3 pages.
Intention to Grant received for European Patent Application No. 22197456.1, mailed on Apr. 16, 2024, 9 pages.
Corrected Notice of Allowance received for U.S. Appl. No. 17/899,530, mailed on Nov. 8, 2023, 3 pages.
Non-Final Office Action received for U.S. Appl. No. 17/899,510, mailed on Oct. 26, 2023, 18 pages.
Certificate of Examination received for Australian Patent Application No. 2019100525, mailed on Aug. 6, 2019, 2 pages.
Certificate of Examination received for Australian Patent Application No. 2019101260, mailed on Mar. 25, 2020, 2 pages.
Decision on Appeal received for U.S. Appl. No. 15/424,186, mailed on May 7, 2021, 12 pages.
Decision to Grant received for Danish Patent Application No. PA201870383, mailed on Jun. 3, 2020, 2 pages.
European Search Report received for European Patent Application No. 21179101.7, mailed on Sep. 28, 2021, 5 pages.
Examiner's Answer to Appeal Brief received for U.S. Appl. No. 15/424,186, mailed on Oct. 7, 2020, 8 pages.
Extended European Search Report received for European Patent Application No. 17810730.6, mailed on Nov. 29, 2019, 12 pages.
Final Office Action received for U.S. Appl. No. 15/424,186, mailed on Aug. 9, 2019, 18 pages.
Intention to Grant received for Danish Patent Application No. PA201870383, mailed on Feb. 11, 2020, 2 pages.
International Preliminary Report on Patentability received for PCT Patent Application No. PCT/US2017/035155, mailed on Dec. 20, 2018, 15 pages.
International Preliminary Report on Patentability received for PCT Patent Application No. PCT/US2018/033051, mailed on Nov. 28, 2019, 15 pages.
International Search Report and Written Opinion received for PCT Patent Application No. PCT/US2017/035155, mailed on Oct. 2, 2017, 19 pages.
International Search Report and Written Opinion Received for PCT Patent Application No. PCT/US2018/033051, mailed on Nov. 22, 2018, 22 pages.
Invitation to Pay Additional Fees and Partial International Search Report received for PCT Patent Application No. PCT/US2018/033051, mailed on Sep. 20, 2018, 14 pages.
Invitation to Pay Additional Fees received for PCT Patent Application No. PCT/US2017/035155, mailed on Aug. 3, 2017, 2 pages.
Invitation to Pay Search Fees received for European Patent Application No. 18730555.2, mailed on May 14, 2020, 3 pages.

(56) References Cited

OTHER PUBLICATIONS

Motorola Solutions, "WAVE 7000 Push-to-Talk for Mobile Devices", XP055709564, Retrieved from the Internet: URL: https://learning.motorolasolutions.com/es/node/2426/download, Jul. 2016, pp. 1-54.
Non-Final Office Action received for U.S. Appl. No. 15/424,186, mailed on Jan. 11, 2019, 15 pages.
Non-Final Office Action received for U.S. Appl. No. 15/981,828, mailed on Jan. 7, 2020, 8 pages.
Notice of Acceptance received for Australian Patent Application No. 2018269510, mailed on Apr. 17, 2020, 3 pages.
Notice of Acceptance received for Australian Patent Application No. 2019250182, mailed on Mar. 11, 2021, 3 pages.
Notice of Acceptance received for Australian Patent Application No. 2020210262, mailed on Jan. 20, 2022, 3 pages.
Notice of Allowance received for Chinese Patent Application No. 201880036526.1, mailed on Apr. 22, 2021, 2 pages (1 page of English Translation and 1 page of Official Copy).
Notice of Allowance received for U.S. Appl. No. 15/981,828, mailed on July 13, 2020, 8 pages.
Office Action received for Australian Patent Application No. 2017277838, mailed on Aug. 20, 2019, 3 pages.
Office Action received for Australian Patent Application No. 2017277838, mailed on Jun. 5, 2019, 3 pages.
Office Action received for Australian Patent Application No. 2018269510, mailed on Feb. 21, 2020, 3 pages.
Office Action received for Australian Patent Application No. 2019101260, mailed on Dec. 16, 2019, 3 pages.
Office Action received for Australian Patent Application No. 2019250182, mailed on Aug. 18, 2020, 4 pages.
Office Action received for Australian Patent Application No. 2019250182, mailed on Dec. 2, 2020, 5 pages.
Office Action received for Australian Patent Application No. 2020210262, mailed on Jul. 28, 2021, 6 pages.
Office Action received for Chinese Patent Application No. 201780033617.5, mailed on Apr. 2, 2021, 24 pages (13 pages of English Translation and 11 pages of Official Copy).
Office Action received for Chinese Patent Application No. 201780033617.5, mailed on Apr. 20, 2020, 24 pages (13 pages of English Translation and 11 pages of Official Copy).
Office Action received for Chinese Patent Application No. 201780033617.5, mailed on Sep. 29, 2020, 26 pages (15 pages of English Translation and 11 pages of Official Copy).
Office Action received for Chinese Patent Application No. 201780033617.5, mailed on Sep. 30, 2021, 16 pages (10 pages of English Translation and 6 pages of Official Copy).
Office Action received for Chinese Patent Application No. 201880036526.1, mailed on Aug. 21, 2020, 8 pages (3 pages of English Translation and 5 pages of Official Copy).
Office Action received for Danish Patent Application No. PA201770395, mailed on Apr. 11, 2019, 10 pages.
Office Action received for Danish Patent Application No. PA201770395, mailed on May 25, 2018, 10 pages.
Office Action received for Danish Patent Application No. PA201870383, mailed on Aug. 26, 2019, 3 pages.
Office Action received for Danish Patent Application No. PA202070167, mailed on Jul. 2, 2021, 5 pages.
Office Action received for European Patent Application No. 17810730.6, mailed on Aug. 18, 2021, 12 pages.
Office Action received for European Patent Application No. 18730555.2, mailed on Feb. 25, 2021, 9 pages.
Office Action received for European Patent Application No. 18730555.2, mailed on Sep. 7, 2020, 11 pages.
Office Action received for European Patent Application No. 21179101.7, mailed on Oct. 8, 2021, 10 pages.
Peters, Jay, "The iPhone 13's rumored satellite link sounds like it's just for emergencies", The Verge, Available online at: https://apple.news/A-xX1QS6IT2m818PPKtL52Q, Aug. 30, 2021, 2 pages.
Pocketnow, "AT&T Enhanced Push To Talk: A Guided Tour | Pocketnow", Retrieved from https://www.youtube.com/watch?v=aagcgg07EEc, Dec. 25, 2012, 1 page.

"ProPTT2 Wearable App with Apple Watch", Retrieved from the Internet: <https://www.youtube.com/watch?v=iqOT30irl4A>, Mar. 29, 2017, 3 pages.
"Qualcomm Toq—smartwatch—User Manual", Avaliable Online at: https://toq.qualcomm.com/sites/default/files/qualcomm_toq_user_manual.pdf [retrieved on Jun. 25, 2015], Nov. 27, 2013, pp. 1-38.
Record of Oral Hearing received for U.S. Appl. No. 15/424,186, mailed on May 10, 2021, 12 pages.
Search Report and Opinion received for Danish Patent Application No. PA201770395, mailed on Sep. 5, 2017, 14 pages.
Search Report and Opinion received for Danish Patent Application No. PA201870383, mailed on Sep. 7, 2018, 8 pages.
Search Report and Opinion received for Danish Patent Application No. PA202070167, mailed on Nov. 25, 2020, 9 pages.
Team On the Run, "Push-To-Talk Feature for Android", Retrieved from the Internet: <https://www.youtube.com/watch?v=_dlrC7q92KQ>, Oct. 14, 2016, 3 pages.
Notice of Allowance received for Japanese Patent Application No. 2022-557929, mailed on Aug. 5, 2024, 5 pages (1 page of English Translation and 4 pages of Official Copy).
Applicant Initiated Interview Summary received for U.S. Appl. No. 17/079,216, mailed on May 8, 2023, 2 pages.
Applicant Initiated Interview Summary received for U.S. Appl. No. 17/899,510, mailed on Apr. 27, 2023, 2 pages.
Applicant-Initiated Interview Summary received for U.S. Appl. No. 17/349,191, mailed on Aug. 1, 2023, 5 pages.
Applicant-Initiated Interview Summary received for U.S. Appl. No. 17/349,191, mailed on Feb. 15, 2023, 3 pages.
Applicant-Initiated Interview Summary received for U.S. Appl. No. 17/349,191, mailed on Feb. 21, 2023, 3 pages.
Applicant-Initiated Interview Summary received for U.S. Appl. No. 17/899,315, mailed on Jan. 24, 2023, 3 pages.
Applicant-Initiated Interview Summary received for U.S. Appl. No. 17/899,510, mailed on Aug. 2, 2023, 2 pages.
Applicant-Initiated Interview Summary received for U.S. Appl. No. 17/899,530, mailed on Apr. 3, 2023, 5 pages.
Applicant-Initiated Interview Summary received for U.S. Appl. No. 17/899,530, mailed on Feb. 3, 2023, 6 pages.
Applicant-Initiated Interview Summary received for U.S. Appl. No. 17/899,530, mailed on Jul. 3, 2023, 6 pages.
Clark Mitchell, "Qualcomm's going toe-to-toe with Apple's satellite messaging feature", Available online at: https://www.theverge.com/2023/1/5/23538207/qualcomm-satellite-messaging-snapdragon-android, Jan. 6, 2023, 18 pages.
Corrected Notice of Allowance received for U.S. Appl. No. 17/079,216, mailed on Aug. 3, 2023, 4 pages.
Corrected Notice of Allowance received for U.S. Appl. No. 17/079,216, mailed on May 19, 2023, 3 pages.
Extended European Search Report received for European Patent Application No. 22197430.6, mailed on Jan. 26, 2023, 8 pages.
Extended European Search Report received for European Patent Application No. 22197456.1, mailed on Feb. 2, 2023, 9 pages.
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Final Office Action received for U.S. Appl. No. 17/349,191, mailed on Jun. 28, 2023, 15 pages.
Final Office Action received for U.S. Appl. No. 17/899,510, mailed on Jun. 2, 2023, 15 pages.
Final Office Action received for U.S. Appl. No. 17/899,530, mailed on Mar. 8, 2023, 68 pages.
International Search Report and Written Opinion received for PCT Patent Application No. PCT/US2022/042069, mailed on Feb. 14, 2023, 22 pages.
International Search Report and Written Opinion received for PCT Patent Application No. PCT/US2022/043183, mailed on Jan. 23, 2023, 17 pages.
Non-Final Office Action received for U.S. Appl. No. 17/079,216, mailed on Jan. 11, 2023, 15 pages.
Non-Final Office Action received for U.S. Appl. No. 17/899,315, mailed on Dec. 22, 2022, 20 pages.

(56) References Cited

OTHER PUBLICATIONS

Non-Final Office Action received for U.S. Appl. No. 17/899,315, mailed on Nov. 4, 2022, 20 pages.
Non-Final Office Action received for U.S. Appl. No. 17/899,510, mailed on Mar. 16, 2023, 16 pages.
Non-Final Office Action received for U.S. Appl. No. 17/899,530, mailed on Jan. 3, 2023, 67 pages.
Non-Final Office Action received for U.S. Appl. No. 17/899,530, mailed on May 25, 2023, 68 pages.
Notice of Acceptance received for Australian Patent Application No. 2022202360, mailed on Apr. 14, 2023, 3 pages.
Notice of Acceptance received for Australian Patent Application No. 2022235630, mailed on Sep. 28, 2023, 3 pages.
Notice of Acceptance received for Australian Patent Application No. 2023204622, mailed on Aug. 10, 2023, 3 pages.
Notice of Allowance received for U.S. Appl. No. 17/079,216, mailed on Apr. 27, 2023, 6 pages.
Notice of Allowance received for U.S. Appl. No. 17/079,216, mailed on May 5, 2023, 3 pages.
Notice of Allowance received for U.S. Appl. No. 17/899,315, mailed on Feb. 24, 2023, 9 pages.
Notice of Allowance received for U.S. Appl. No. 17/899,530, mailed on Oct. 19, 2023, 13 pages.
Office Action received for Australian Patent Application No. 2022202360, mailed on Feb. 17, 2023, 4 pages.
Office Action received for Australian Patent Application No. 2022235630, mailed on Jul. 21, 2023, 6 pages.
Office Action received for Australian Patent Application No. 2022235630, mailed on May 17, 2023, 3 pages.
Office Action received for European Patent Application No. 17810730.6, mailed on Jul. 6, 2023, 13 pages.
Office Action received for European Patent Application No. 21179101.7, mailed on Jul. 7, 2023, 8 pages.
Notice of Allowance received for Chinese Patent Application No. 202110666978.1, mailed on Jun. 28, 2024, 5 pages (1 page of English Translation and 4 pages of Official Copy).
International Search Report and Written Opinion received for PCT Patent Application No. PCT/US2023/032051, mailed on Mar. 4, 2024, 19 pages.
Invitation to Pay Additional Fees and Partial International Search Report received for PCT Patent Application No. PCT/US2023/032051, mailed on Jan. 8, 2024, 10 pages.
Corrected Notice of Allowance received for U.S. Appl. No. 17/899,510, mailed on Dec. 10, 2024, 3 pages.
Corrected Notice of Allowance received for U.S. Appl. No. 17/899,510, mailed on Oct. 1, 2024, 3 pages.
Corrected Notice of Allowance received for U.S. Appl. No. 17/899,510, mailed on Oct. 21, 2024, 16 pages.
Decision to Grant received for European Patent Application No. 17810730.6, mailed on Oct. 17, 2024, 2 pages.
Extended European Search Report received for European Patent Application No. 24204114.3, mailed on Dec. 23, 2024, 10 pages.
Extended European Search Report received for European Patent Application No. 24204790.0, mailed on Jan. 13, 2025, 9 pages.
International Search Report and Written Opinion received for PCT Patent Application No. PCT/US2024/032052, mailed on Oct. 8, 2024, 11 pages.
Non-Final Office Action received for U.S. Appl. No. 17/898,342, mailed on Dec. 12, 2024, 12 pages.
Notice of Acceptance received for Australian Patent Application No. 2023270278, mailed on Oct. 30, 2024, 3 pages.
Notice of Allowance received for Japanese Patent Application No. 2023-001270, mailed on Sep. 30, 2024, 4 pages (1 page of English Translation and 3 pages of Official Copy).
Office Action received for European Patent Application No. 22197430.6, mailed on Dec. 3, 2024, 8 pages.
Office Action received for European Patent Application No. 22769872.7, mailed on Nov. 15, 2024, 11 pages.
Office Action received for Japanese Patent Application No. 2023-001269, mailed on Sep. 20, 2024, 9 pages (4 pages of English Translation and 5 pages of Official Copy).
Applicant-Initiated Interview Summary received for U.S. Appl. No. 18/622,524, mailed on Jun. 5, 2025, 4 pages.
Board Decision received for Chinese Patent Application No. 201780033617.5, mailed on May 30, 2025, 17 pages (1 page of English Translation and 16 pages of Official Copy).
Board Opinion received for Chinese Patent Application No. 201780033617.5, mailed on Apr. 17, 2025, 16 pages (9 pages of English Translation and 7 pages of Official Copy).
Decision to Grant received for European Patent Application No. 21179101.7, mailed on May 2, 2025, 4 pages.
International Preliminary Report on Patentability received for PCT Patent Application No. PCT/US2023/033376, mailed on Apr. 3, 2025, 15 pages.
Notice of Allowance received for Japanese Patent Application No. 2024-515962, mailed on Apr. 18, 2025, 4 pages (1 page of English Translation and 3 pages of Official Copy).
Intention to Grant received for European Patent Application No. 21179101.7, mailed on Feb. 27, 2025, 9 pages.
Intention to Grant received for European Patent Application No. 22785843.8, mailed on Mar. 19, 2025, 8 pages.
International Preliminary Report on Patentability received for PCT Patent Application No. PCT/US2023/032051, mailed on Mar. 20, 2025, 13 pages.
Non-Final Office Action received for U.S. Appl. No. 18/622,524, mailed on Mar. 18, 2025, 18 pages.
Notice of Allowance received for Japanese Patent Application No. 2023-001269, mailed on Feb. 25, 2025, 5 pages (1 page of English Translation and 4 pages of Official Copy).
Notice of Allowance received for U.S. Appl. No. 17/898,342, mailed on Mar. 28, 2025, 10 pages.
Office Action received for Japanese Patent Application No. 2024-515962, mailed on Mar. 3, 2025, 6 pages (3 pages of English Translation and 3 pages of Official Copy).
Intention to Grant received for European Patent Application No. 22785843.8, mailed on Jul. 10, 2025, 8 pages.
Applicant-Initiated Interview Summary received for U.S. Appl. No. 18/201,411, mailed on Aug. 21, 2025, 5 pages.
Applicant-Initiated Interview Summary received for U.S. Appl. No. 18/622,524, mailed on Nov. 6, 2025, 4 pages.
Corrected Notice of Allowance received for U.S. Appl. No. 17/898,342, mailed on Aug. 8, 2025, 3 pages.
Corrected Notice of Allowance received for U.S. Appl. No. 18/367,418, mailed on Jul. 8, 2025, 12 pages.
Decision to Grant received for European Patent Application No. 22197430.6, mailed on Oct. 30, 2025, 4 pages.
Extended European Search Report received for European Patent Application No. 25169286.9, mailed on Jun. 26, 2025, 12 pages.
Final Office Action received for U.S. Appl. No. 18/201,411, mailed on Sep. 17, 2025, 24 pages.
Final Office Action received for U.S. Appl. No. 18/622,524, mailed on Oct. 7, 2025, 13 pages.
Intention to Grant received for European Patent Application No. 22197430.6, mailed on Jul. 22, 2025, 12 pages.
Intention to Grant received for European Patent Application No. 22769872.7, mailed on Oct. 14, 2025, 9 pages.
Intention to Grant received for European Patent Application No. 24204114.3, mailed on Oct. 20, 2025, 9 pages.
Letter Restarting Period for Response received for U.S. Appl. No. 18/201,411, mailed on Sep. 23, 2025, 24 pages.
Non-Final Office Action received for U.S. Appl. No. 18/201,411, mailed on Aug. 11, 2025, 18 pages.
Non-Final Office Action received for U.S. Appl. No. 18/241,747, mailed on Oct. 27, 2025, 13 pages.
Notice of Allowance received for Japanese Patent Application No. 2025-048996, mailed on Jun. 23, 2025, 5 pages (1 page of English Translation and 4 pages of Official Copy).
Notice of Allowance received for U.S. Appl. No. 17/898,342, mailed on Jul. 29, 2025, 9 pages.
Notice of Allowance received for U.S. Appl. No. 18/367,418, mailed on Aug. 15, 2025, 14 pages.

(56) References Cited

OTHER PUBLICATIONS

Notice of Allowance received for U.S. Appl. No. 18/367,418, mailed on Jun. 24, 2025, 18 pages.
Office Action received for Japanese Patent Application No. 2024-186863, mailed on Sep. 1, 2025, 8 pages (4 pages of English Translation and 4 pages of Official Copy).
Advisory Action received for U.S. Appl. No. 18/201,411, mailed on Nov. 17, 2025, 5 pages.
Decision to Grant received for European Patent Application No. 22785843.8, mailed on Nov. 13, 2025, 2 pages.
Office Action received for Korean Patent Application No. 10-2024-7007190, mailed on Oct. 22, 2025, 19 pages (8 pages of English Translation and 11 pages of Official Copy).

* cited by examiner

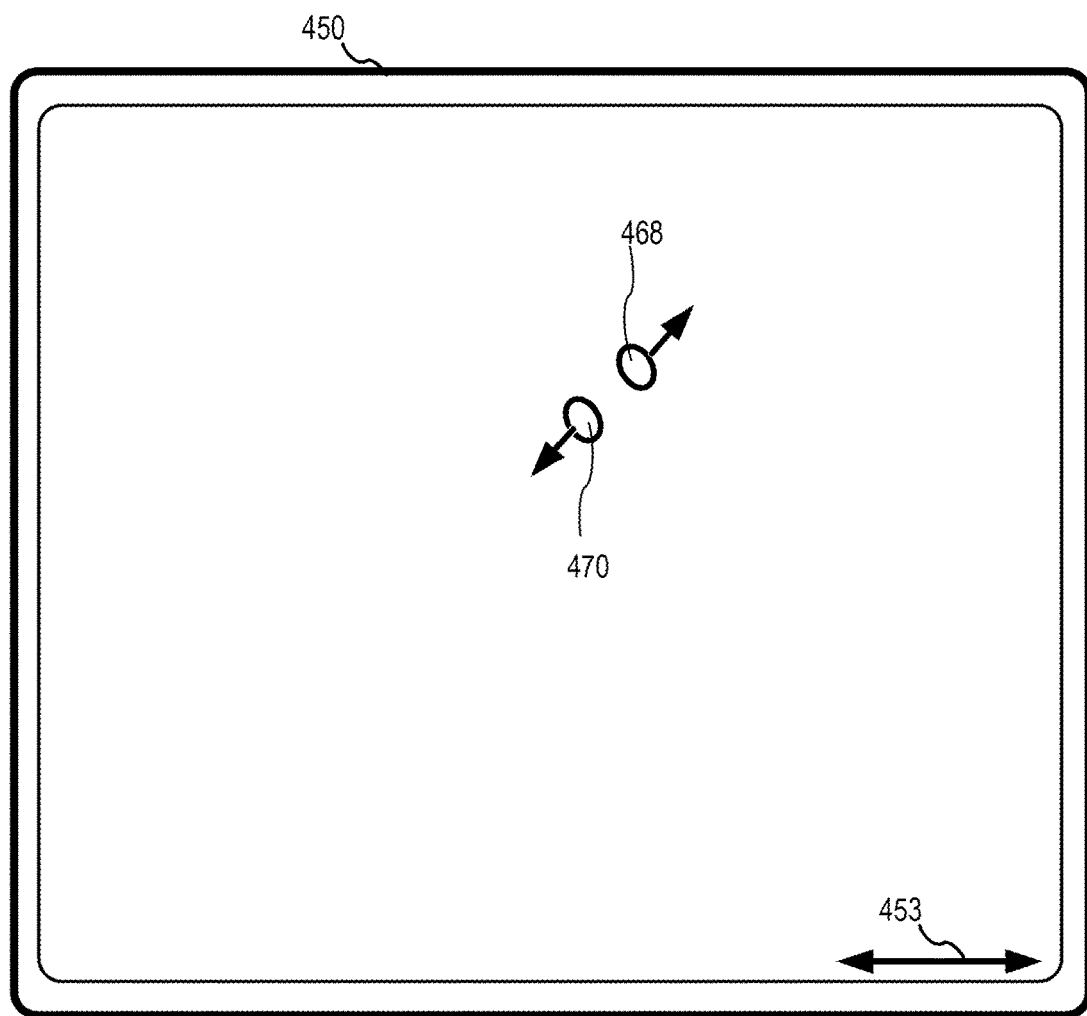
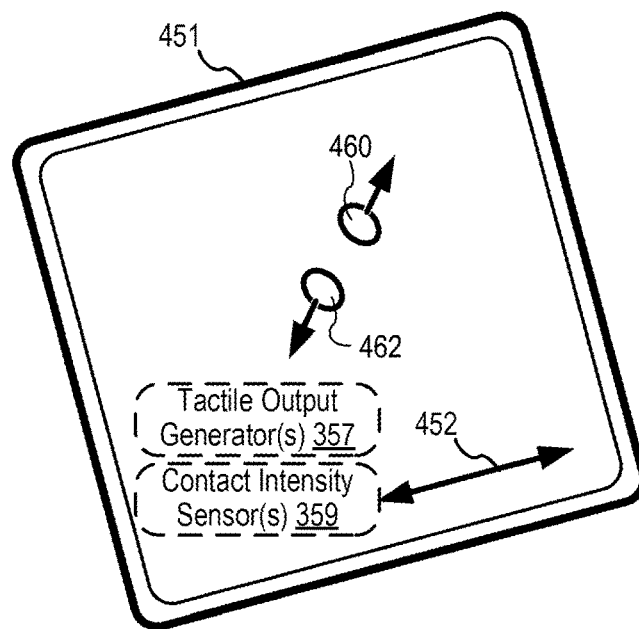
*FIG. 4B*

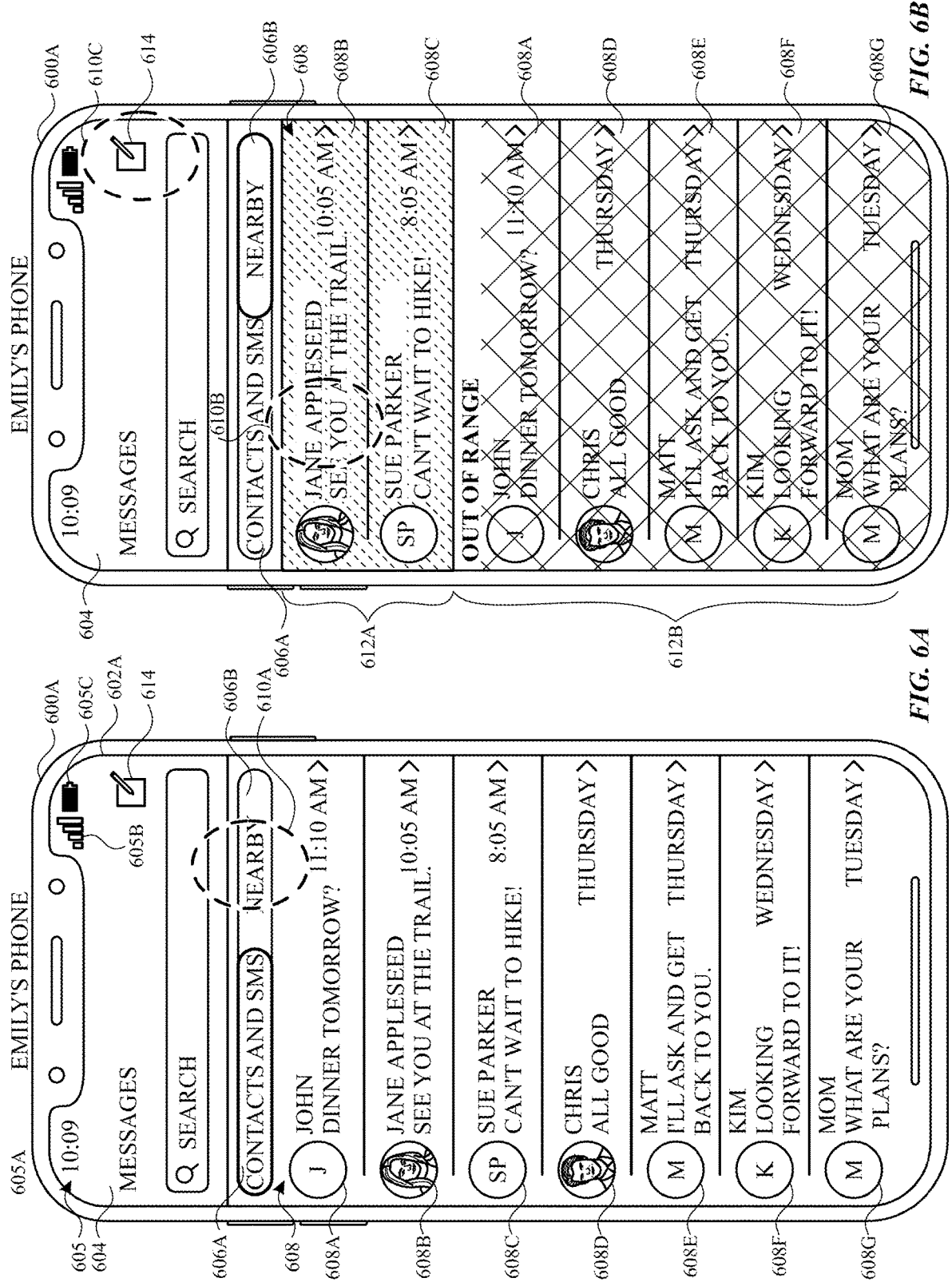

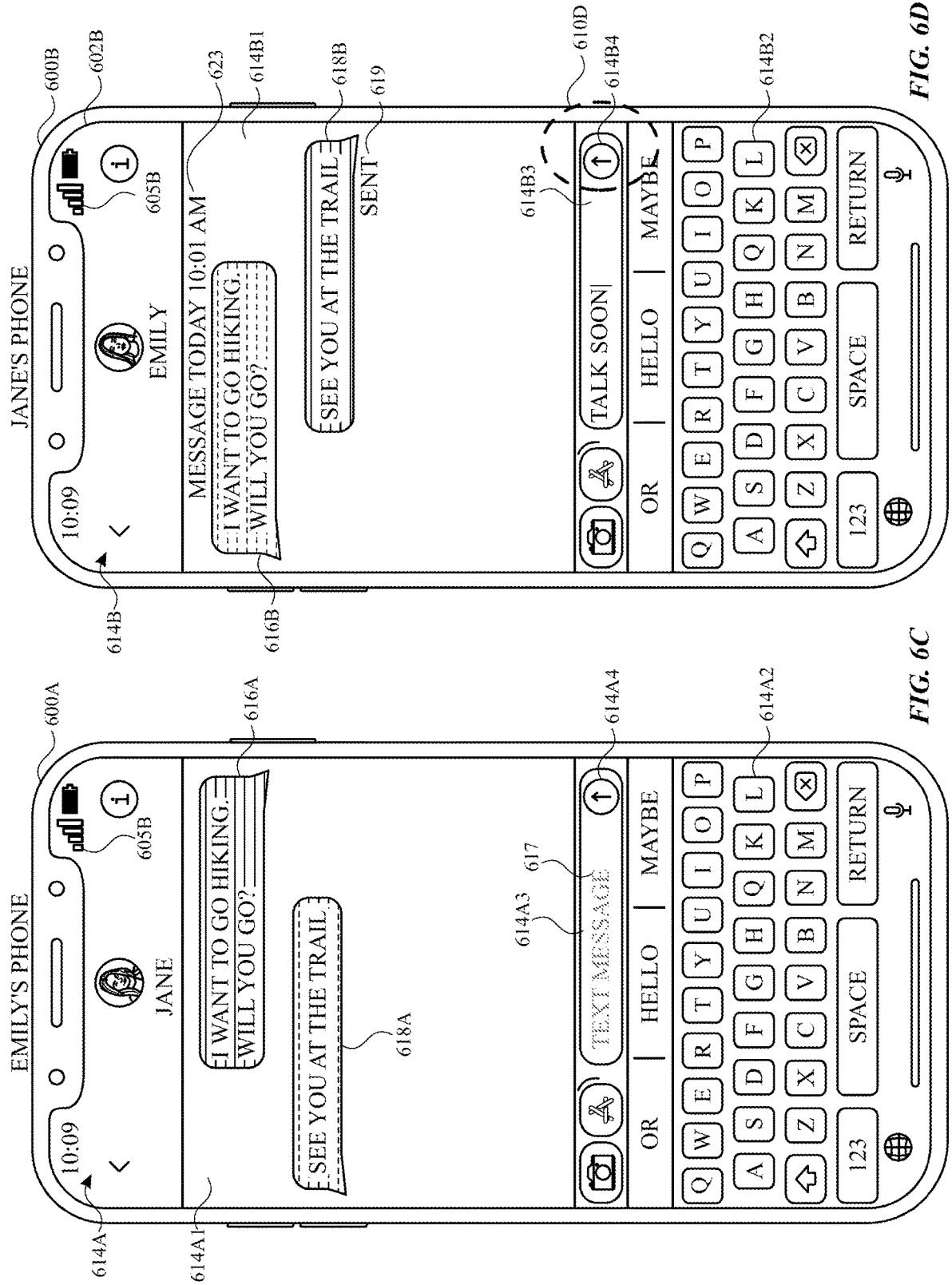

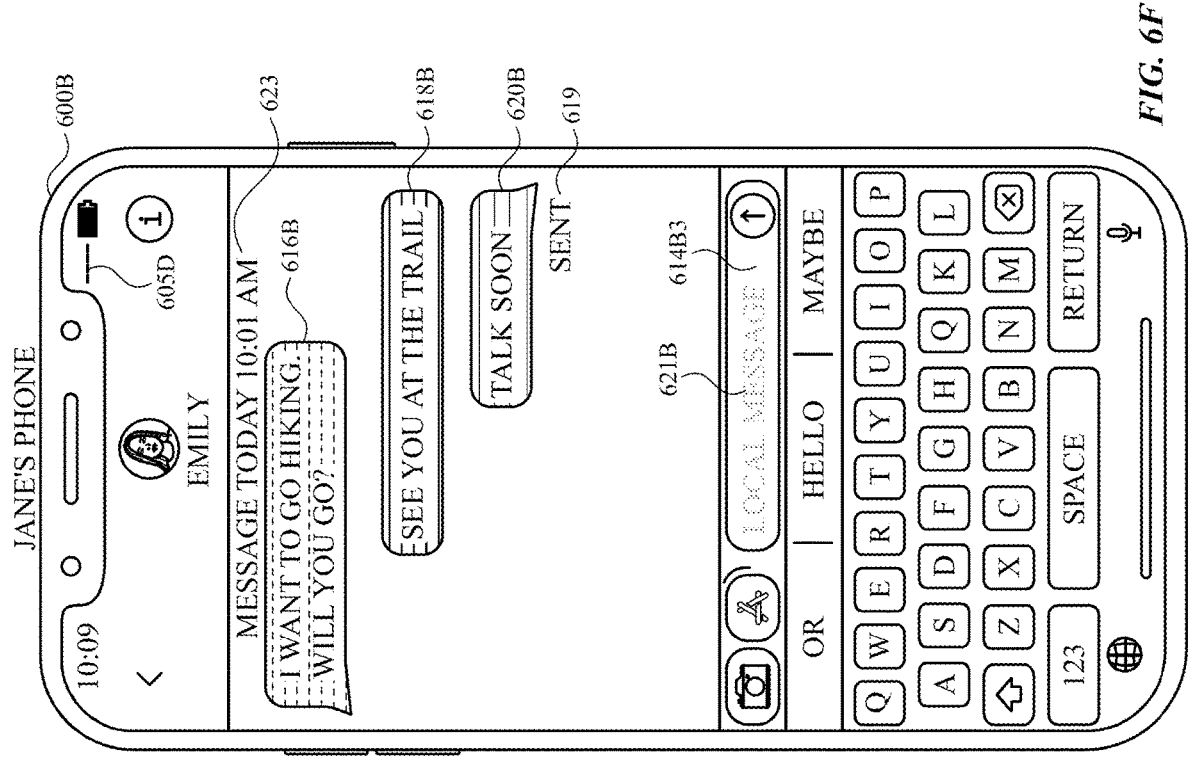
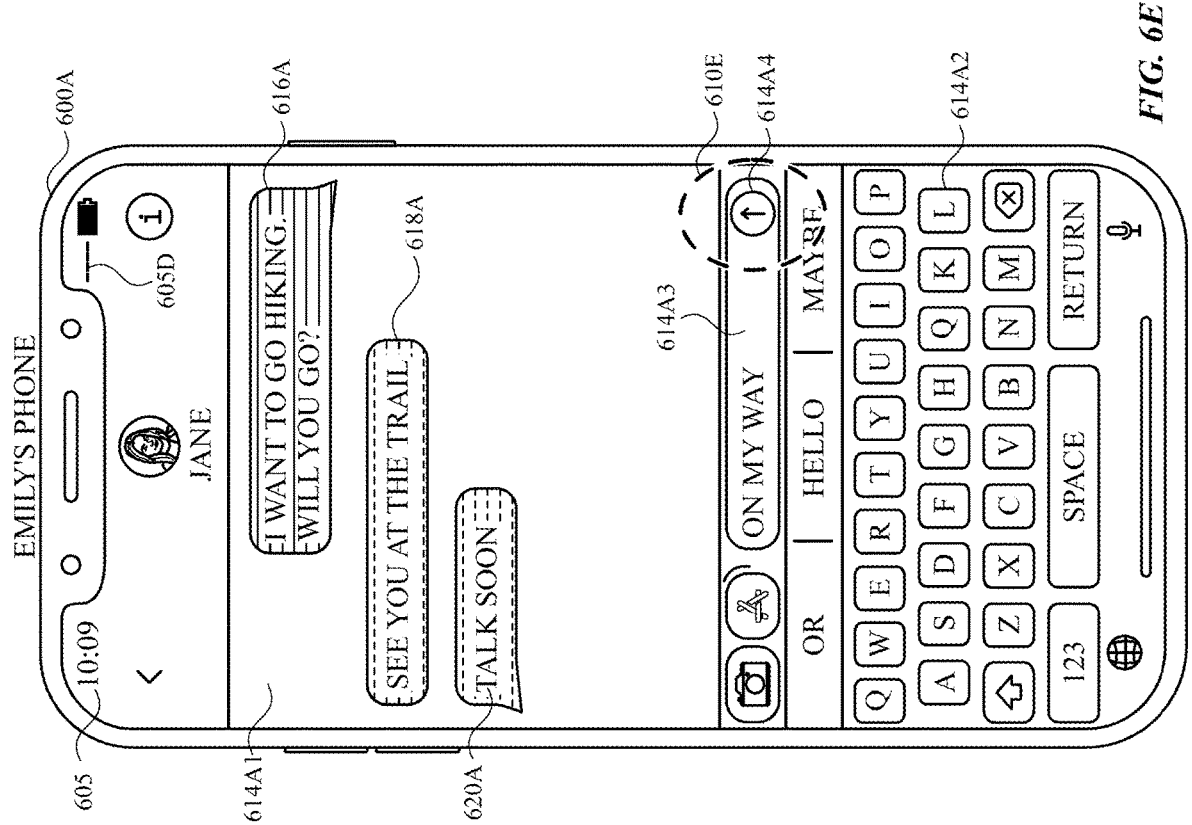
FIG. 6F
FIG. 6E

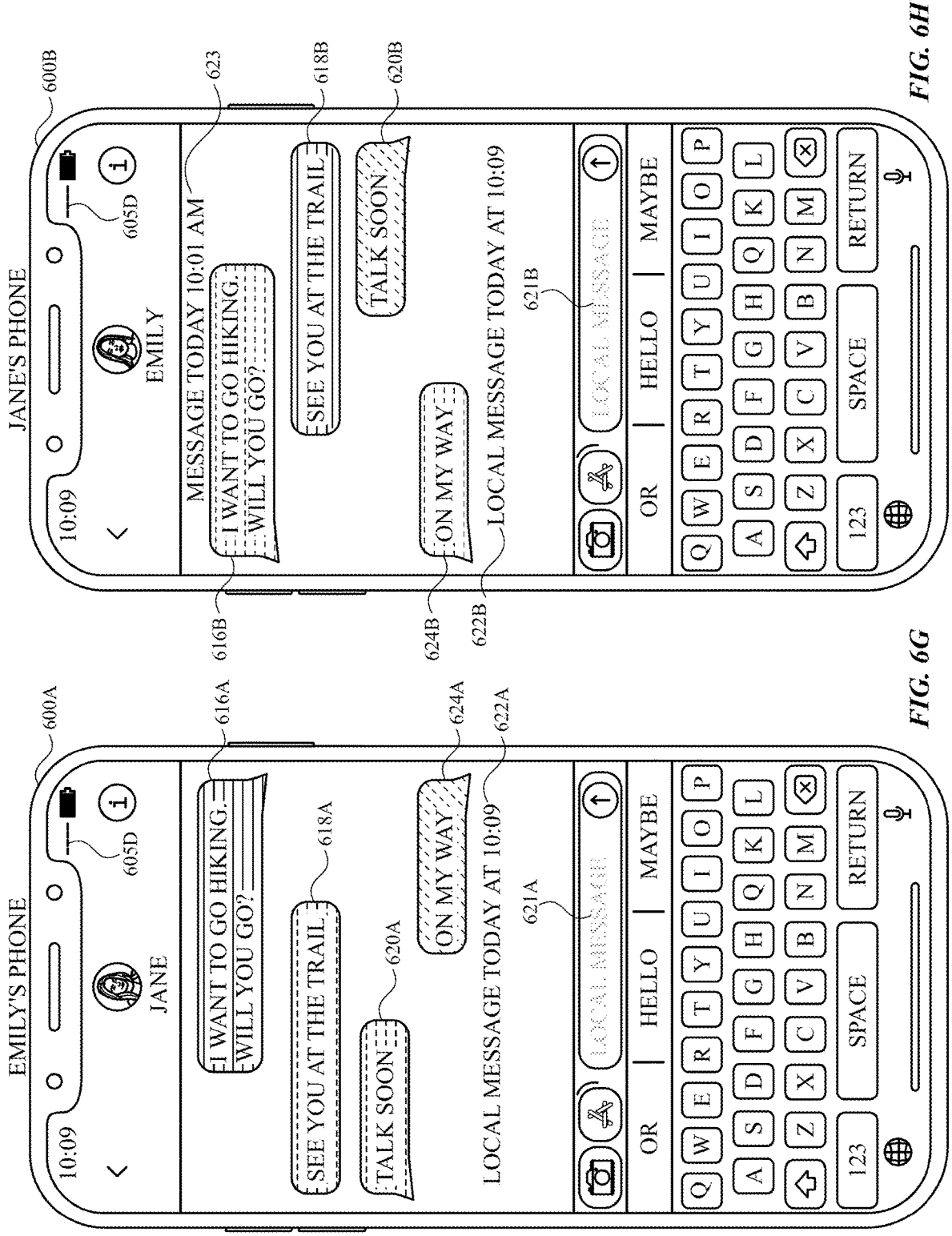

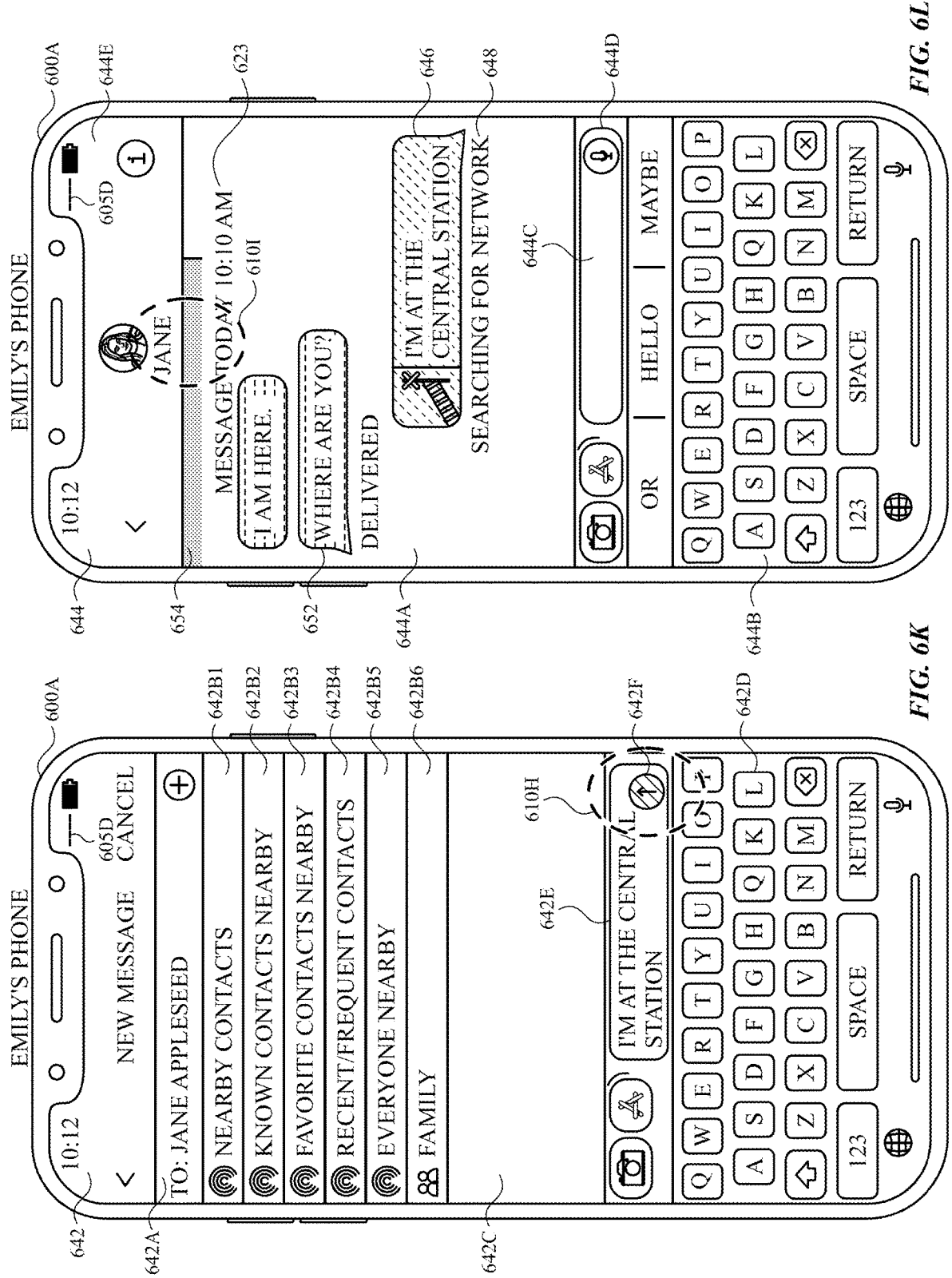

700

702
Display a user interface for initiating a communication.

704
In accordance with a determination that a terrestrial wireless network is available to the computer system to initiate the communication, display at least a portion of the user interface with a first appearance.

706
In accordance with a determination that no terrestrial wireless network is available to the computer system to initiate the communication, display the portion of the user interface with a second appearance, wherein the second appearance is different from the first appearance and includes an indication that the communication can be initiated via an alternative communication network other than the terrestrial wireless network.

*FIG. 7*

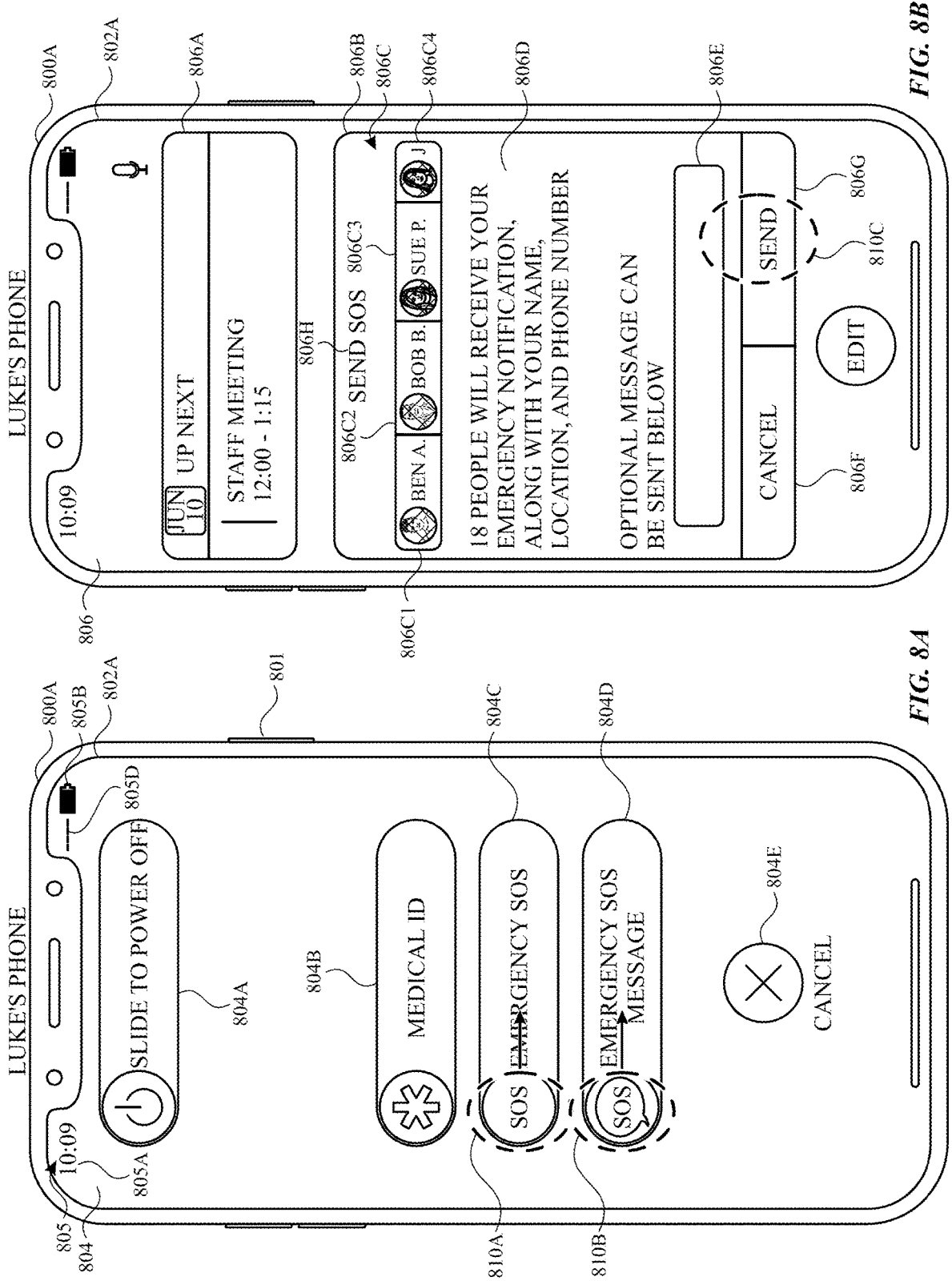

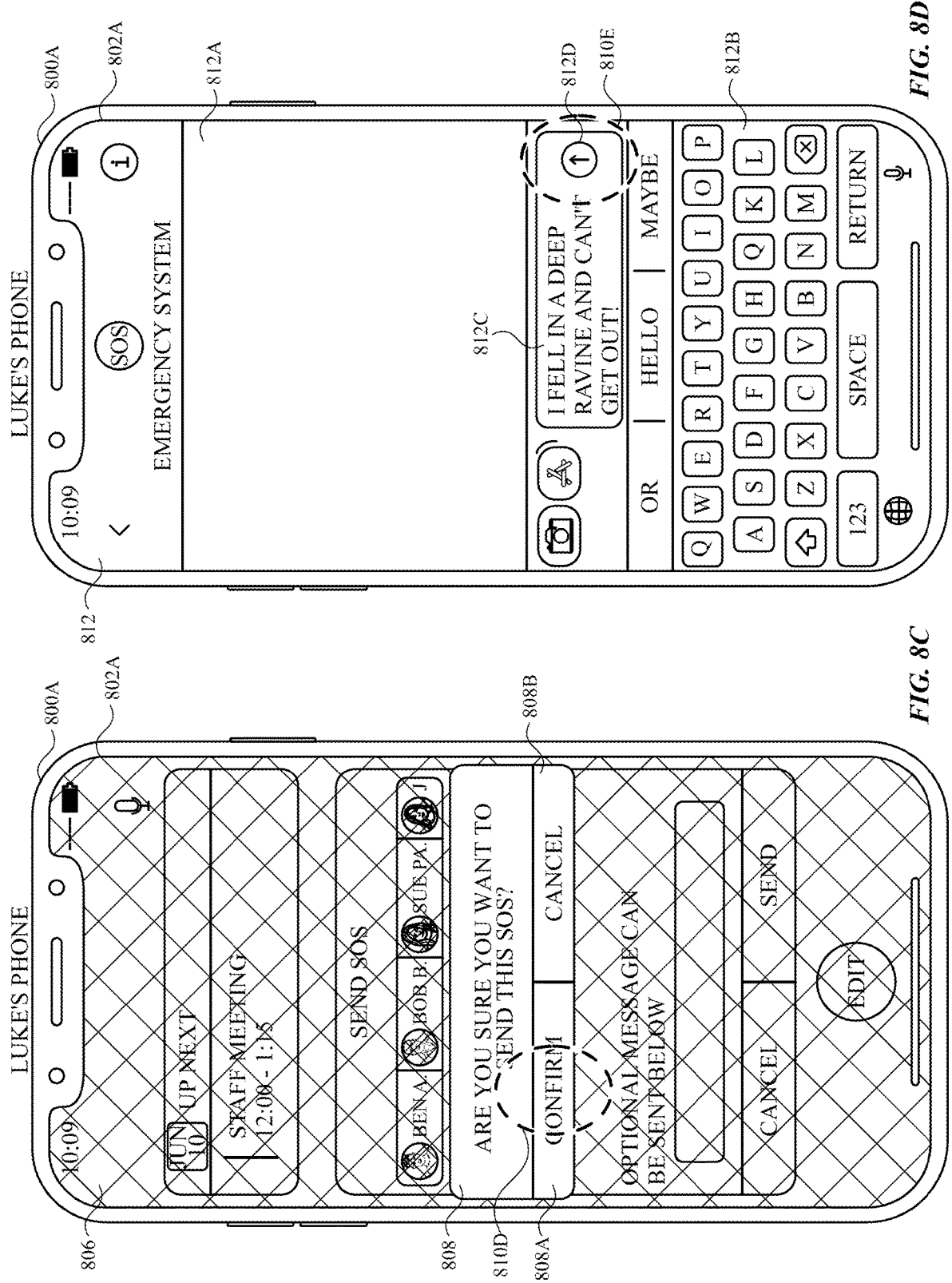

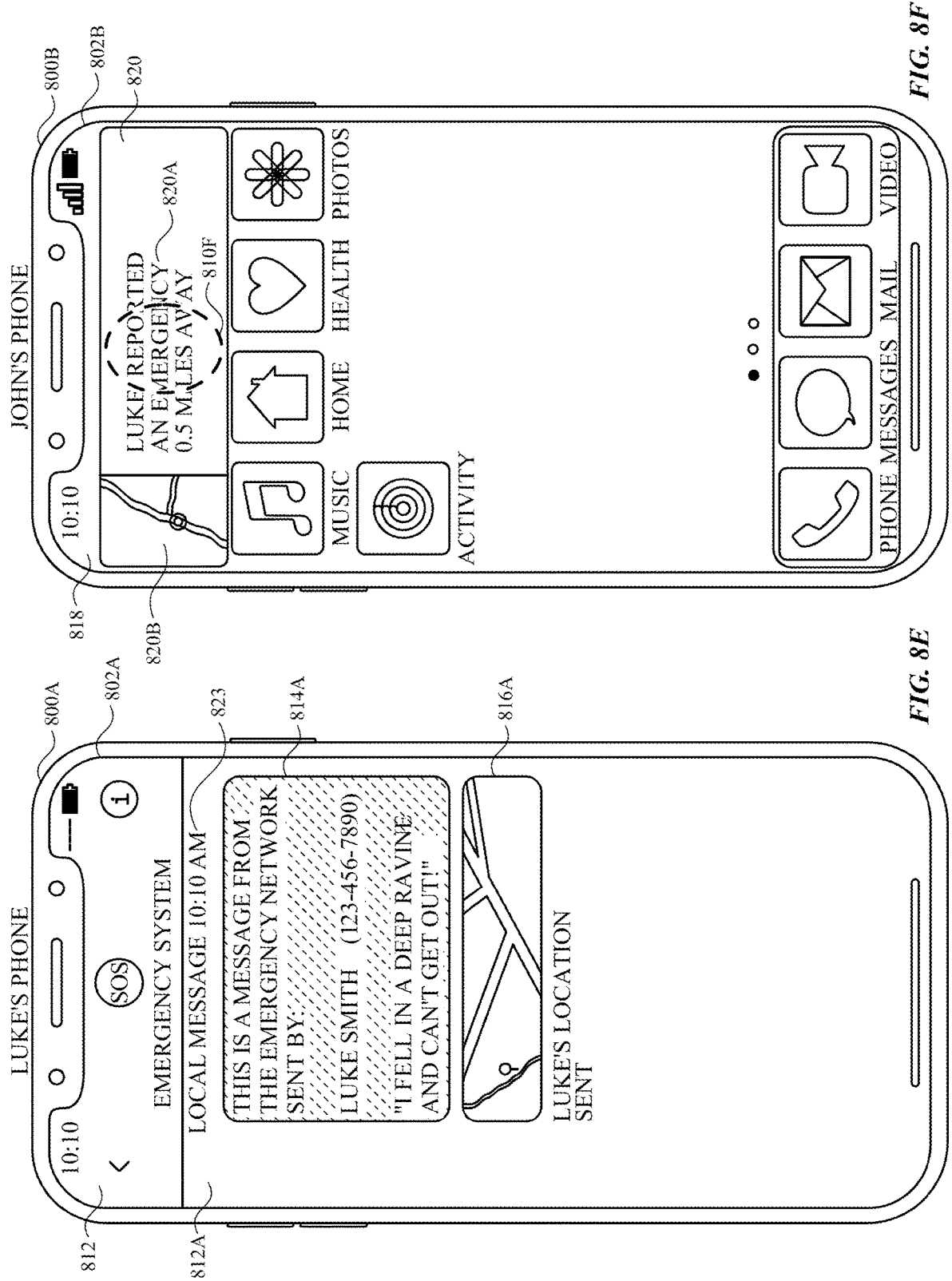

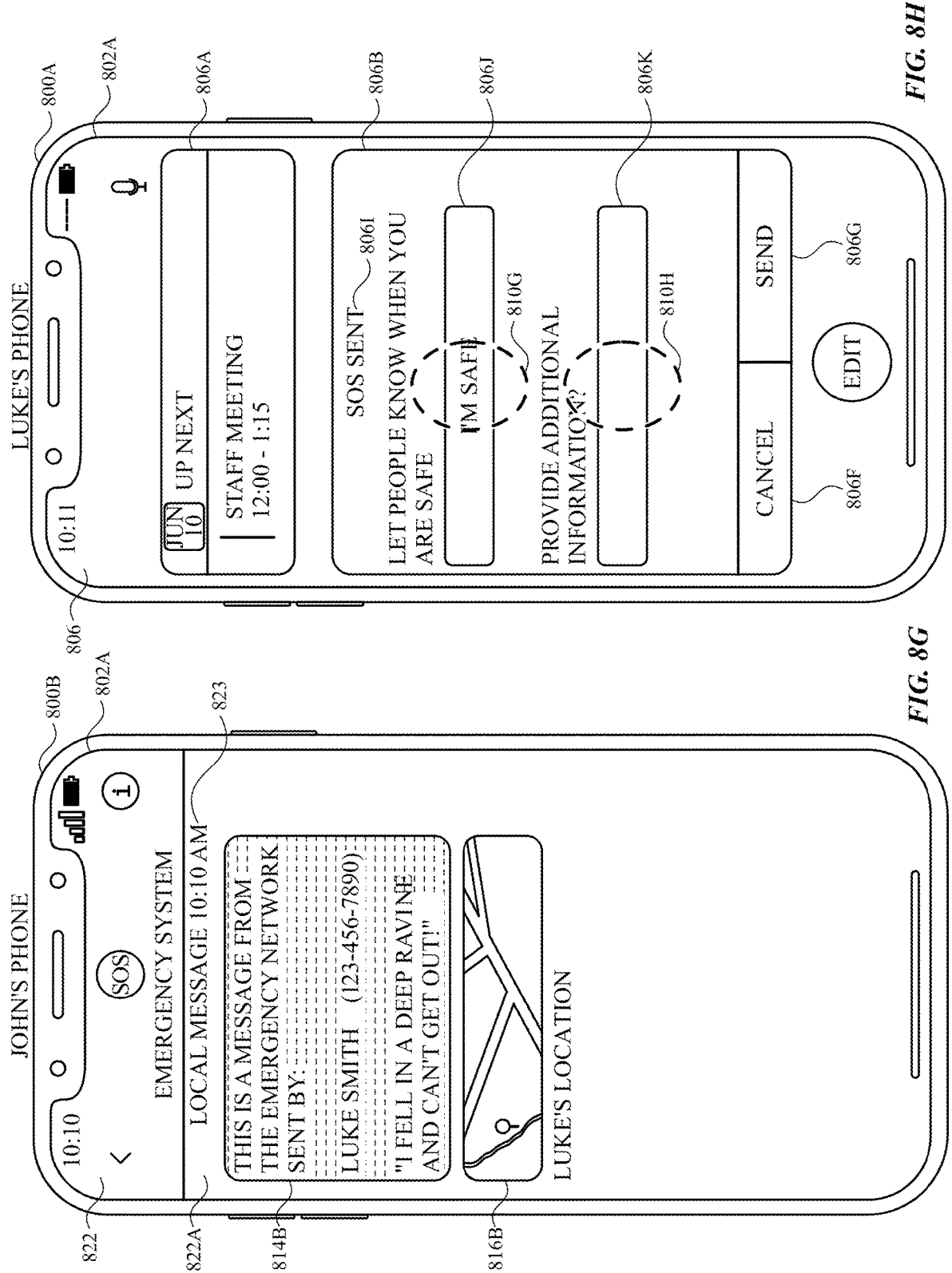

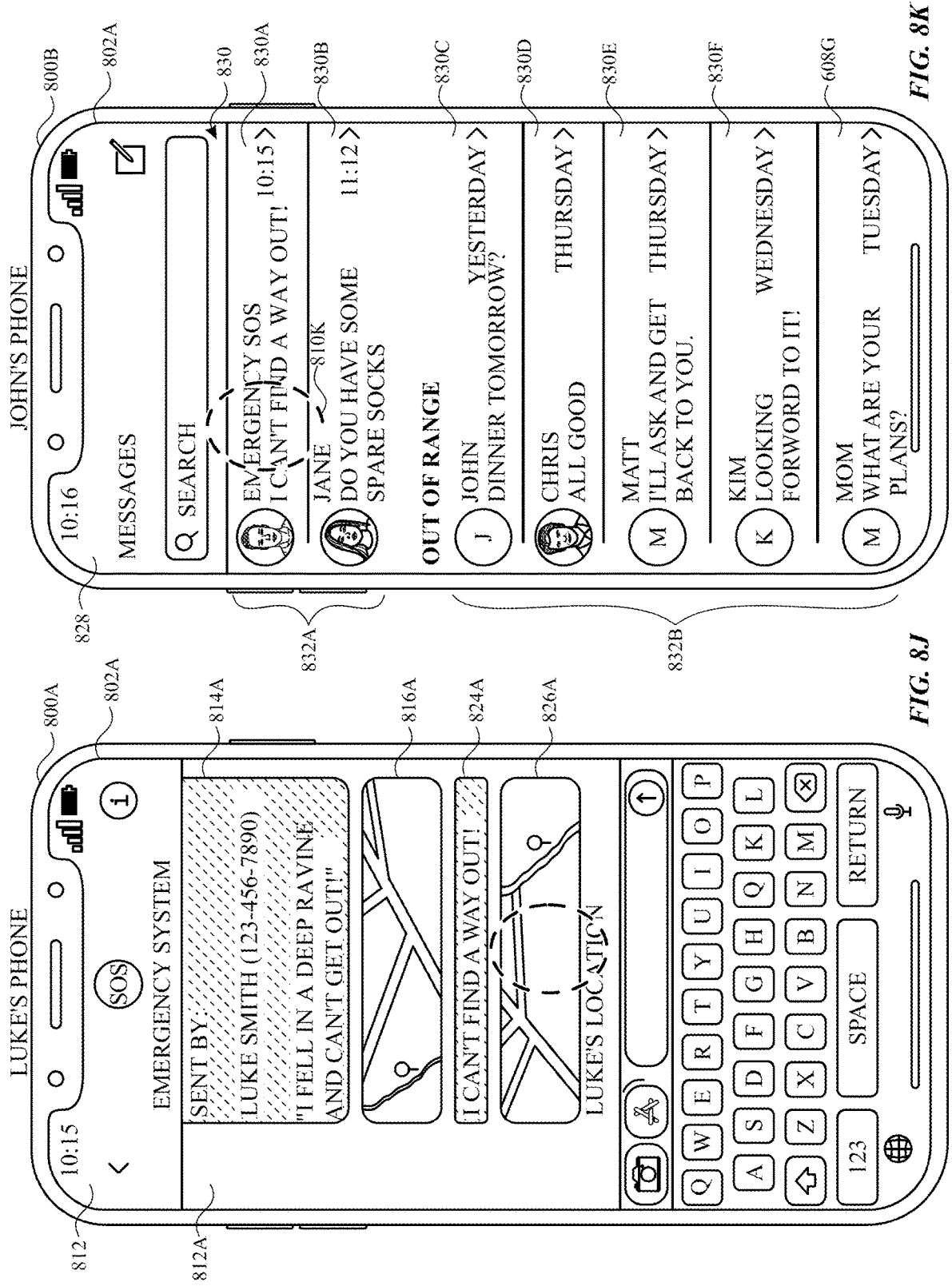

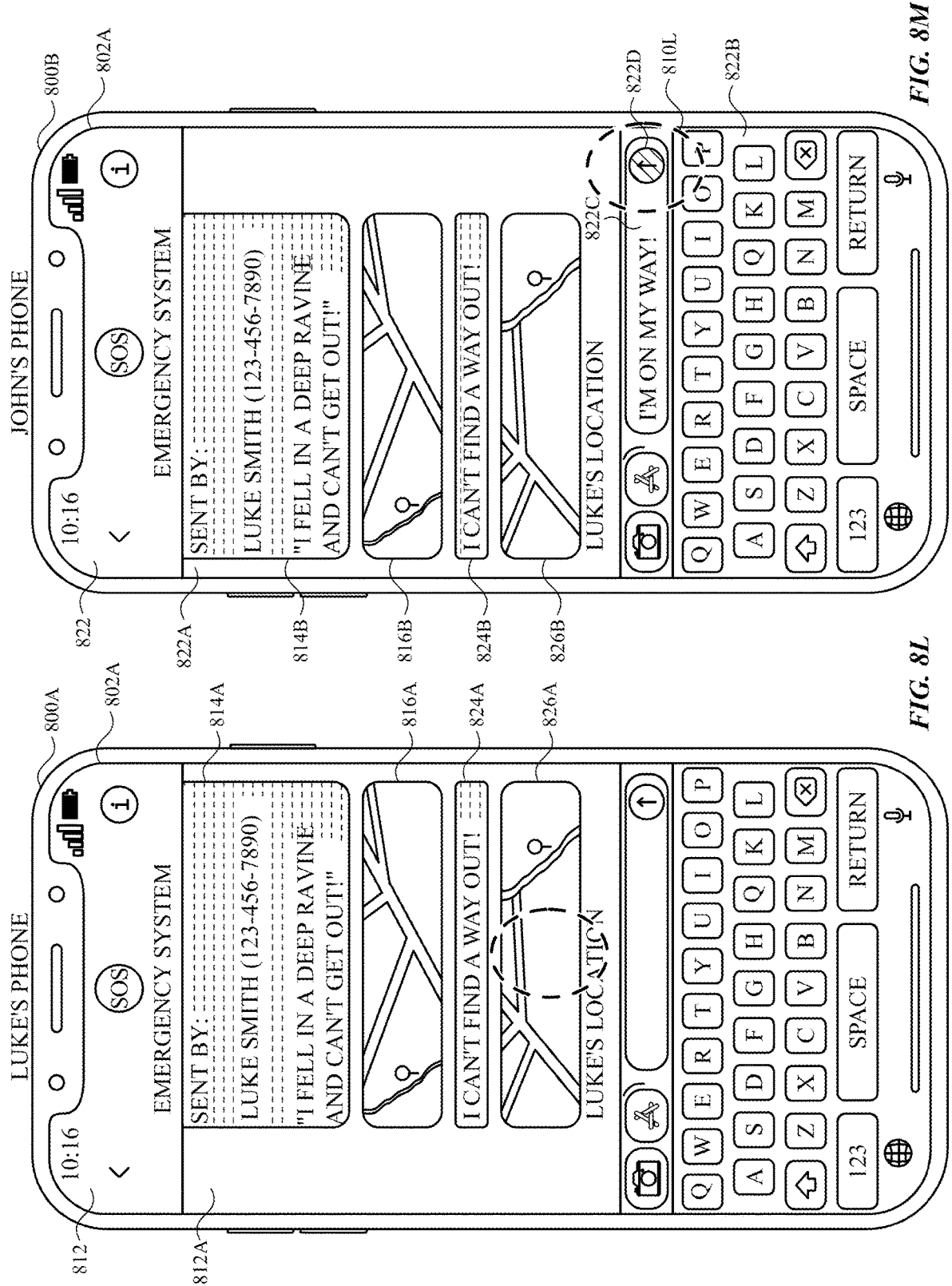

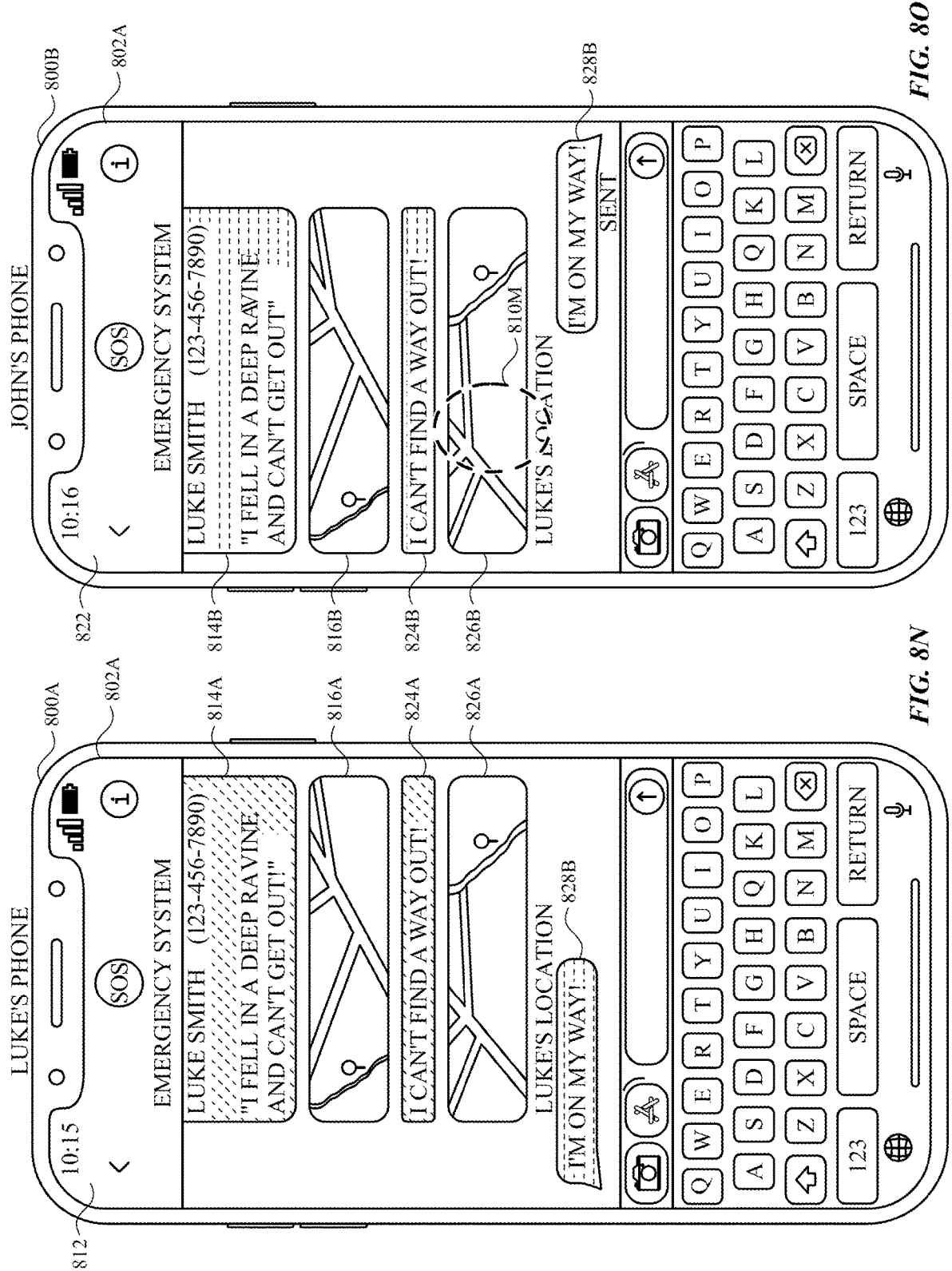

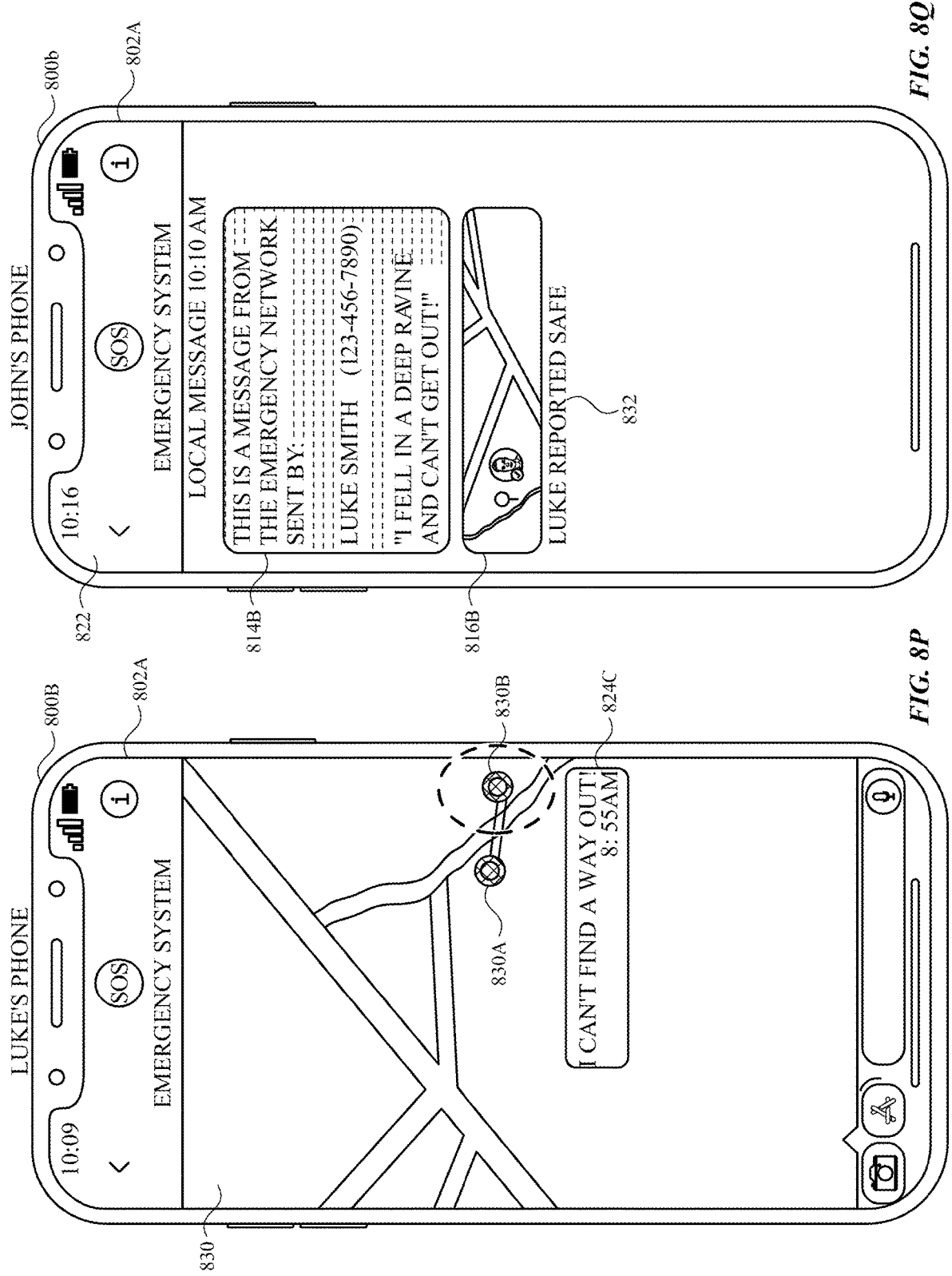

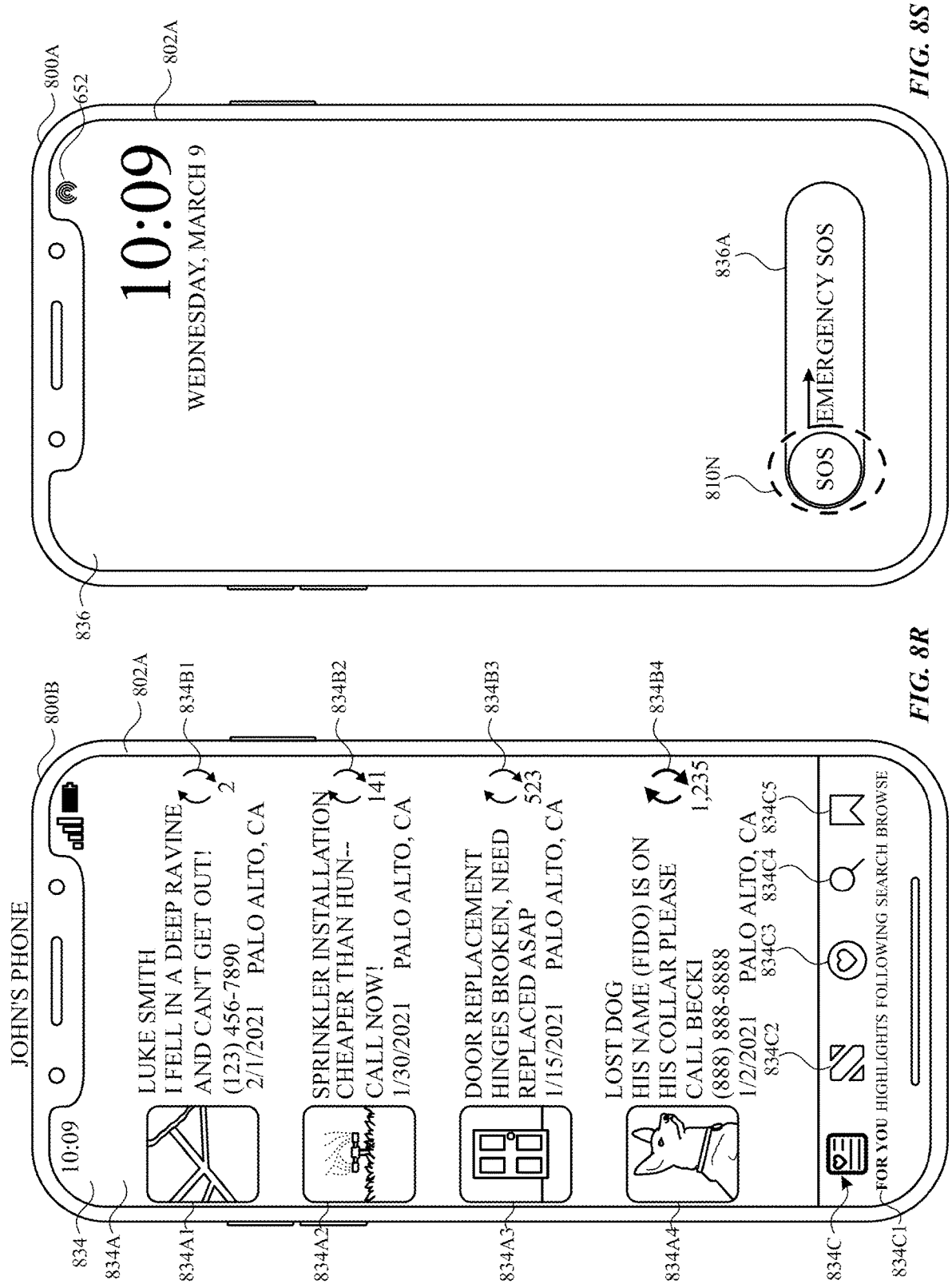

LOW-BANDWIDTH AND EMERGENCY COMMUNICATION USER INTERFACES

CROSS-REFERENCE TO RELATED APPLICATION

This application claims priority to U.S. Provisional Patent Application Ser. No. 63/243,502, entitled "LOW-BANDWIDTH AND EMERGENCY COMMUNICATION USER INTERFACES," filed on Sep. 13, 2021, the content of which is hereby incorporated by reference in its entirety.

FIELD

The present disclosure relates generally to computer user interfaces, and more specifically to techniques for low-bandwidth communication and/or emergency communication.

BACKGROUND

Computer systems can include hardware and/or software for displaying interfaces for various types of communication.

BRIEF SUMMARY

Some techniques for low-bandwidth and emergency communication using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for low-bandwidth and emergency communication. Such methods and interfaces optionally complement or replace other methods for low-bandwidth and emergency communication. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: displaying, via the display generation component, a user interface for initiating a communication, the user interface including: in accordance with a determination that a terrestrial wireless network is available to the computer system to initiate the communication, displaying at least a portion of the user interface with a first appearance; and in accordance with a determination that no terrestrial wireless network is available to the computer system to initiate the communication, displaying the portion of the user interface with a second appearance, wherein the second appearance is different from the first appearance and includes an indication that the communication can be initiated via an alternative communication network other than the terrestrial wireless network.

In accordance with some embodiments, a non-transitory computer-readable storage medium is described. The non-transitory computer-readable medium stores one or more programs configured to be executed by one or more processors of a computer system that is in communication with a display generation component, the one or more programs including instructions for: displaying, via the display generation component, a user interface for initiating a communication, the user interface including: in accordance with a determination that a terrestrial wireless network is available to the computer system to initiate the communication, displaying at least a portion of the user interface with a first appearance; and in accordance with a determination that no terrestrial wireless network is available to the computer system to initiate the communication, displaying the portion of the user interface with a second appearance, wherein the second appearance is different from the first appearance and includes an indication that the communication can be initiated via an alternative communication network other than the terrestrial wireless network.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a user interface for initiating a communication, the user interface including: in accordance with a determination that a terrestrial wireless network is available to the computer system to initiate the communication, displaying at least a portion of the user interface with a first appearance; and in accordance with a determination that no terrestrial wireless network is available to the computer system to initiate the communication, displaying the portion of the user interface with a second appearance, wherein the second appearance is different from the first appearance and includes an indication that the communication can be initiated via an alternative communication network other than the terrestrial wireless network.

In accordance with some embodiments, a computer system configured to communicate with a display generation component is described. The computer system comprises: one or more processors; and memory storing one or more programs configured to be executed by the one or more processors, the one or more programs including instructions for: displaying, via the display generation component, a user interface for initiating a communication, the user interface including: in accordance with a determination that a terrestrial wireless network is available to the computer system to initiate the communication, displaying at least a portion of the user interface with a first appearance; and in accordance with a determination that no terrestrial wireless network is available to the computer system to initiate the communication, displaying the portion of the user interface with a second appearance, wherein the second appearance is different from the first appearance and includes an indication that the communication can be initiated via an alternative communication network other than the terrestrial wireless network.

In accordance with some embodiments, a computer system configured to communicate with a display generation component is described. The computer system comprises: means for displaying, via the display generation component, a user interface for initiating a communication, the user interface including: in accordance with a determination that a terrestrial wireless network is available to the computer system to initiate the communication, displaying at least a portion of the user interface with a first appearance; and in accordance with a determination that no terrestrial wireless network is available to the computer system to initiate the communication, displaying the portion of the user interface with a second appearance, wherein the second appearance is different from the first appearance and includes an indication that the communication can be initiated via an alternative communication network other than the terrestrial wireless network.

In accordance with some embodiments, a computer program product is described. The computer program product comprises one or more programs configured to be executed by one or more processors of a computer system that is in communication with a display generation component, the one or more programs including instructions for: displaying, via the display generation component, a user interface for initiating a communication, the user interface including: in accordance with a determination that a terrestrial wireless network is available to the computer system to initiate the communication, displaying at least a portion of the user interface with a first appearance; and in accordance with a determination that no terrestrial wireless network is available to the computer system to initiate the communication, displaying the portion of the user interface with a second appearance, wherein the second appearance is different from the first appearance and includes an indication that the communication can be initiated via an alternative communication network other than the terrestrial wireless network.

In accordance with some embodiments, a method performed at a computer system that is in communication with a display generation component and one or more input devices is described. The method comprises: while the computer system is in an emergency communication mode: displaying, via the display generation component, a first user interface specific to the emergency communication mode that includes a selectable send communication option to send a communication to one or more recipients that are automatically selected based on a proximity of remote computer systems associated with the one or more recipients to the computer system without providing information that identifies the one or more recipients; receiving, via the one or more input devices, one or more inputs that include a selection of the send communication option; and in response to receiving the one or more inputs, sending the communication to the one or more recipients.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while the computer system is in an emergency communication mode: displaying, via the display generation component, a first user interface specific to the emergency communication mode that includes a selectable send communication option to send a communication to one or more recipients that are automatically selected based on a proximity of remote computer systems associated with the one or more recipients to the computer system without providing information that identifies the one or more recipients; receiving, via the one or more input devices, one or more inputs that include a selection of the send communication option; and in response to receiving the one or more inputs, sending the communication to the one or more recipients.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while the computer system is in an emergency communication mode: displaying, via the display generation component, a first user interface specific to the emergency communication mode that includes a selectable send communication option to send a communication to one or more recipients that are automatically selected based on a proximity of remote computer systems associated with the one or more recipients to the computer system without providing information that identifies the one or more recipients; receiving, via the one or more input devices, one or more inputs that include a selection of the send communication option; and in response to receiving the one or more inputs, sending the communication to the one or more recipients.

In accordance with some embodiments, a computer system configured to communicate with a display generation component and one or more input devices is described. The computer system comprises: one or more processors; and memory storing one or more programs configured to be executed by the one or more processors, the one or more programs including instructions for: while the computer system is in an emergency communication mode: displaying, via the display generation component, a first user interface specific to the emergency communication mode that includes a selectable send communication option to send a communication to one or more recipients that are automatically selected based on a proximity of remote computer systems associated with the one or more recipients to the computer system without providing information that identifies the one or more recipients; receiving, via the one or more input devices, one or more inputs that include a selection of the send communication option; and in response to receiving the one or more inputs, sending the communication to the one or more recipients.

In accordance with some embodiments, a computer system configured to communicate with a display generation component and one or more input devices is described. The computer system comprises: means for, while the computer system is in an emergency communication mode: displaying, via the display generation component, a first user interface specific to the emergency communication mode that includes a selectable send communication option to send a communication to one or more recipients that are automatically selected based on a proximity of remote computer systems associated with the one or more recipients to the computer system without providing information that identifies the one or more recipients; receiving, via the one or more input devices, one or more inputs that include a selection of the send communication option; and in response to receiving the one or more inputs, sending the communication to the one or more recipients.

In accordance with some embodiments, a computer program product is described. The computer program product comprises one or more programs configured to be executed by one or more processors of a computer system that is in communication with a display generation component and one or more input devices, the one or more programs including instructions for: while the computer system is in an emergency communication mode: displaying, via the display generation component, a first user interface specific to the emergency communication mode that includes a selectable send communication option to send a communication to one or more recipients that are automatically selected based on a proximity of remote computer systems associated with the one or more recipients to the computer system without providing information that identifies the one or more recipients; receiving, via the one or more input devices, one or more inputs that include a selection of the send communication option; and in response to receiving the one or more inputs, sending the communication to the one or more recipients.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for low-bandwidth and emergency communication, thereby increasing the effectiveness, efficiency, and user satisfaction with such devices. Such methods and interfaces may complement or replace other methods for low-bandwidth and emergency communication.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 depicts a flow diagram illustrating a method for low-bandwidth and emergency communication in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for low-bandwidth and emergency communication. In some examples, a portion of a user interface can be displayed with a first appearance in accordance with a determination that a terrestrial wireless communication network is available for communication, and displayed with a different appearance in accordance with a determination that no terrestrial wireless communication network is available. In some examples, while a computer system is in an emergency communication mode, a user interface specific to the emergency communication mode and recipients are automatically selected to receive a communication based on proximity to the computer system. Such techniques can reduce the cognitive burden on a user who perform low-bandwidth and emergency communication, thereby enhancing productivity. Further, such techniques can reduce processor and battery power otherwise wasted on redundant user inputs.

Figure 8I:
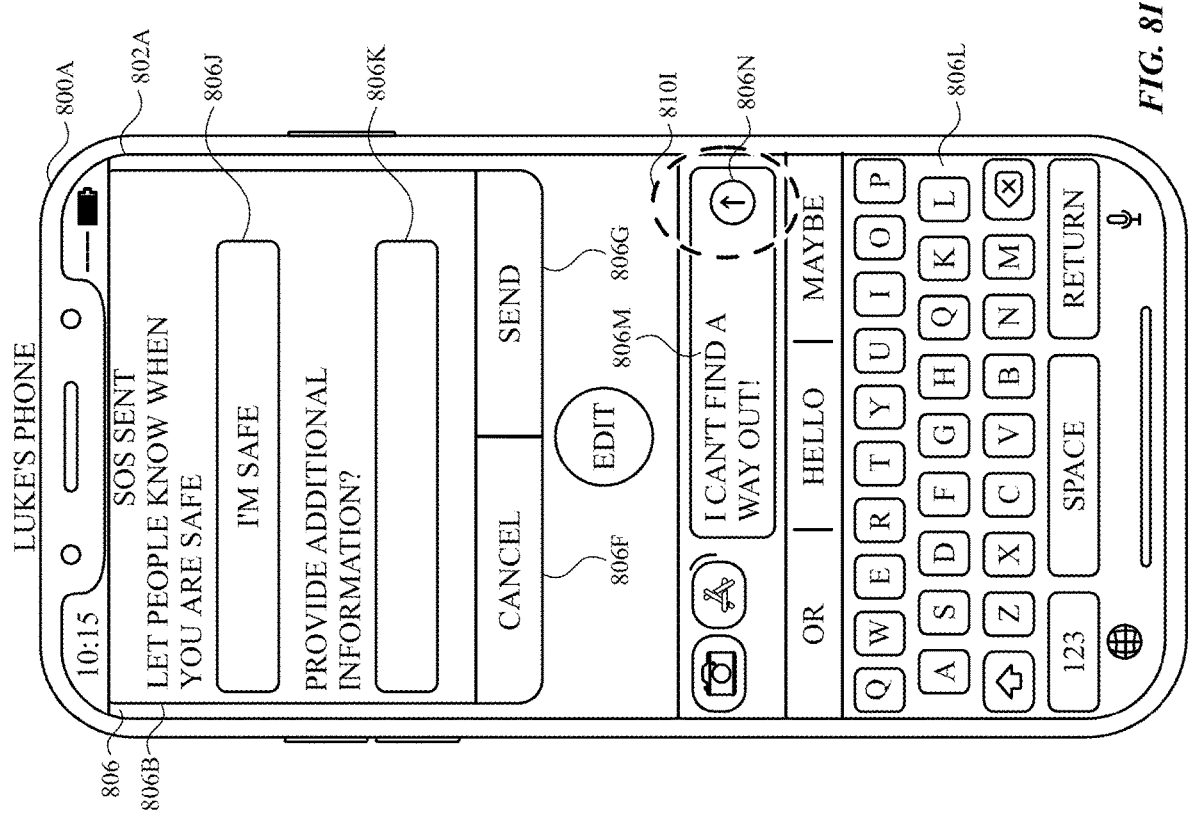
FIGS. 8A-8S illustrate exemplary user interfaces for low-bandwidth and emergency communication in accordance with some embodiments.
Figure 9:
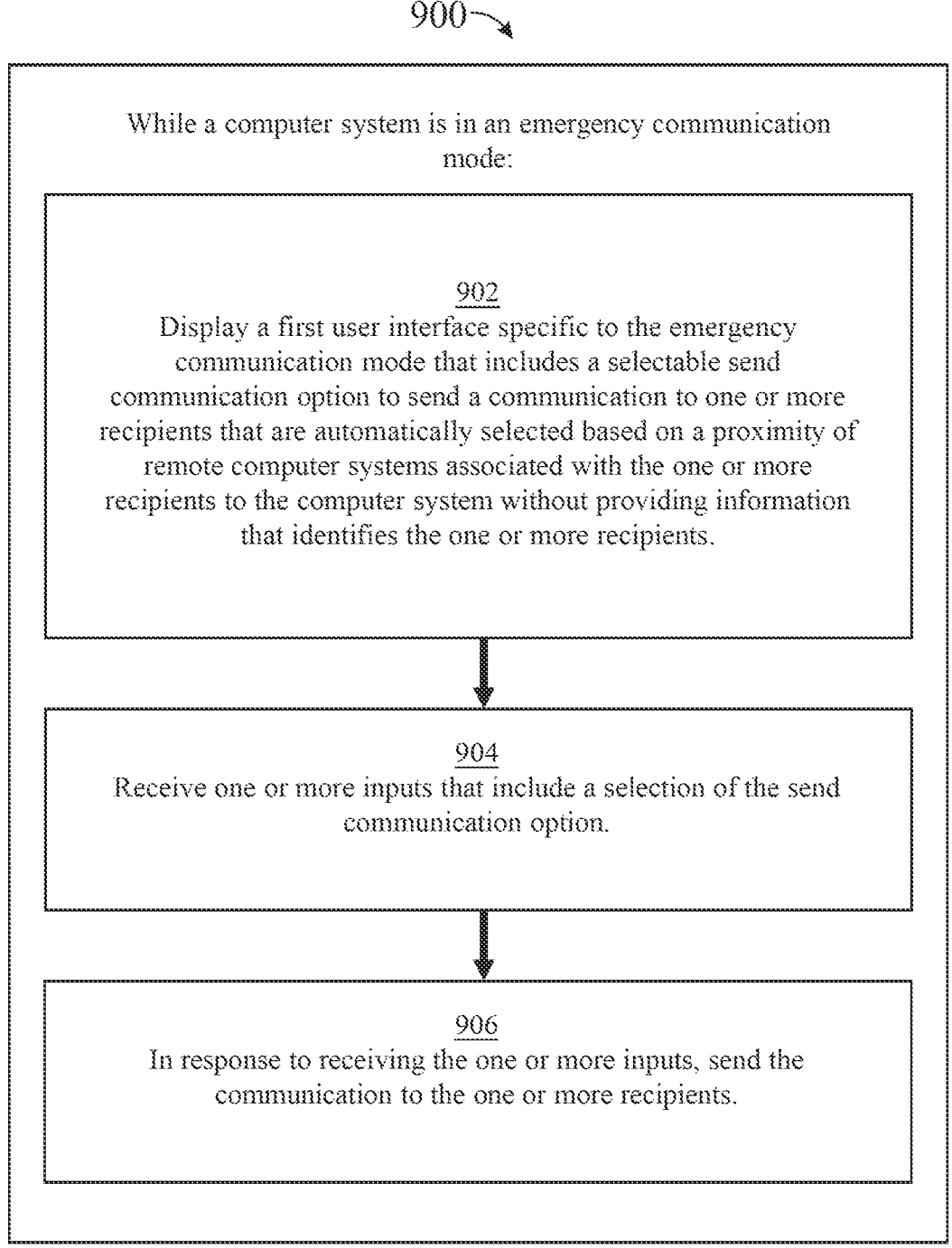
FIG. 9 depicts a flow diagram illustrating a method for low-bandwidth and emergency communication in accordance with some embodiments.

Below, FIGS. 1A-1B, 2, 3, 4A-4B, and 5A-5B provide a description of exemplary devices for performing the techniques low-bandwidth and emergency communication. FIGS. 6A-6O illustrate exemplary user interfaces for low-bandwidth and emergency communication. FIG. 7 is a flow diagram illustrating methods of low-bandwidth and emergency communication in accordance with some embodiments. The user interfaces in FIGS. 6A-6O are used to illustrate the processes described below, including the processes in FIG. 7. FIGS. 8A-8S illustrate exemplary user interfaces for low-bandwidth and emergency communication. FIG. 9 is a flow diagram illustrating methods of low-bandwidth and emergency communication in accordance with some embodiments. The user interfaces in FIGS. 8A-8S are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
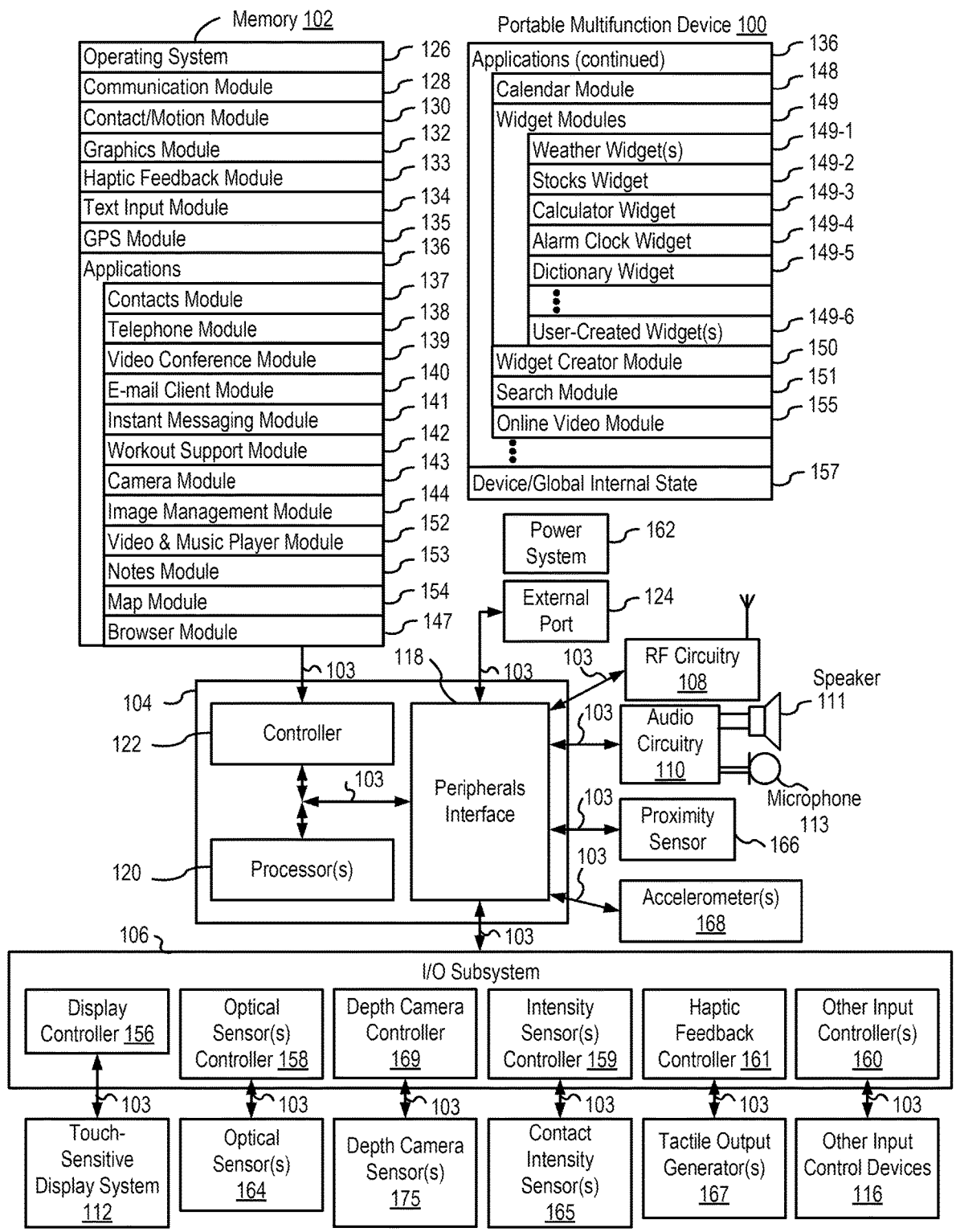
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No.

6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
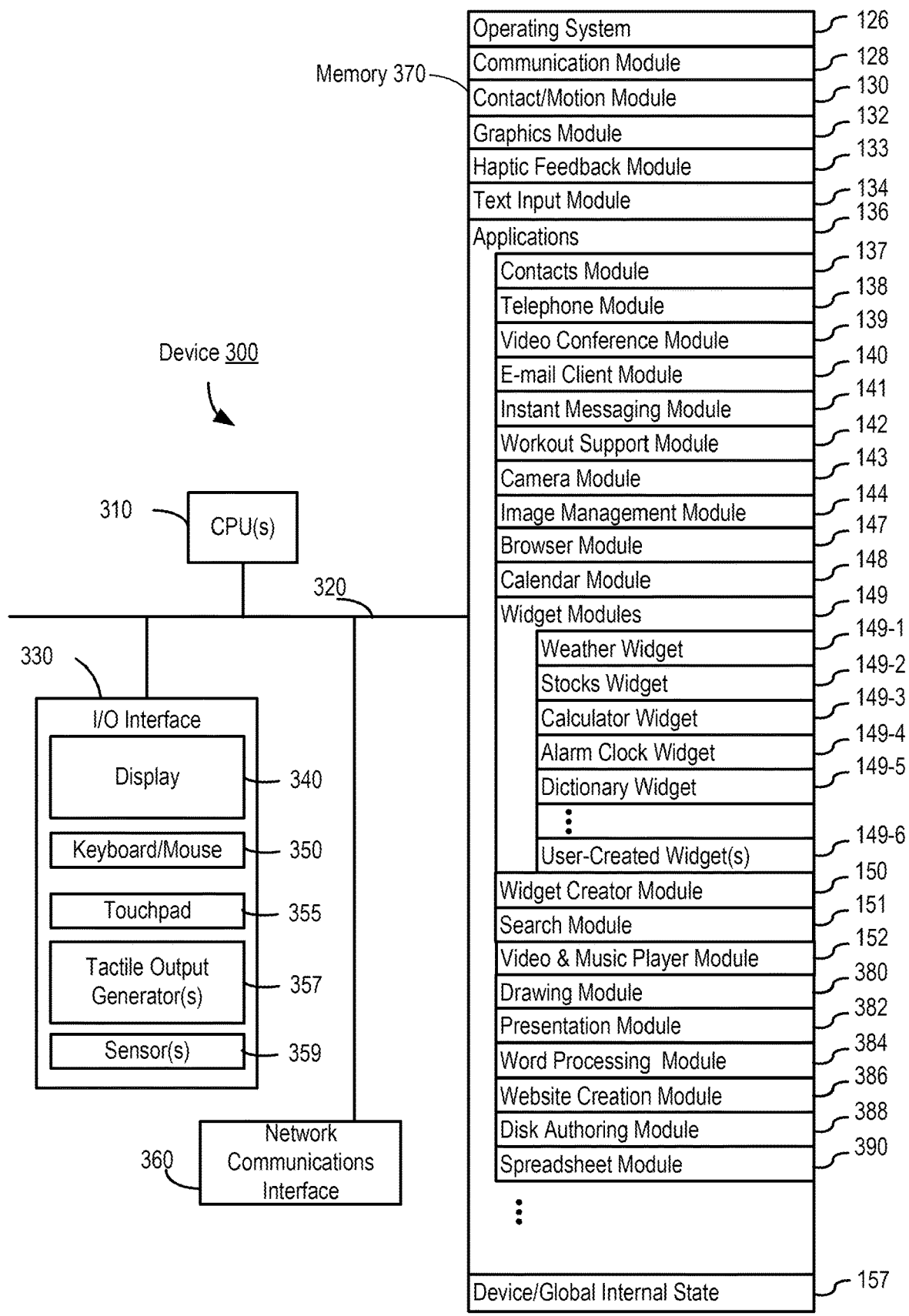
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
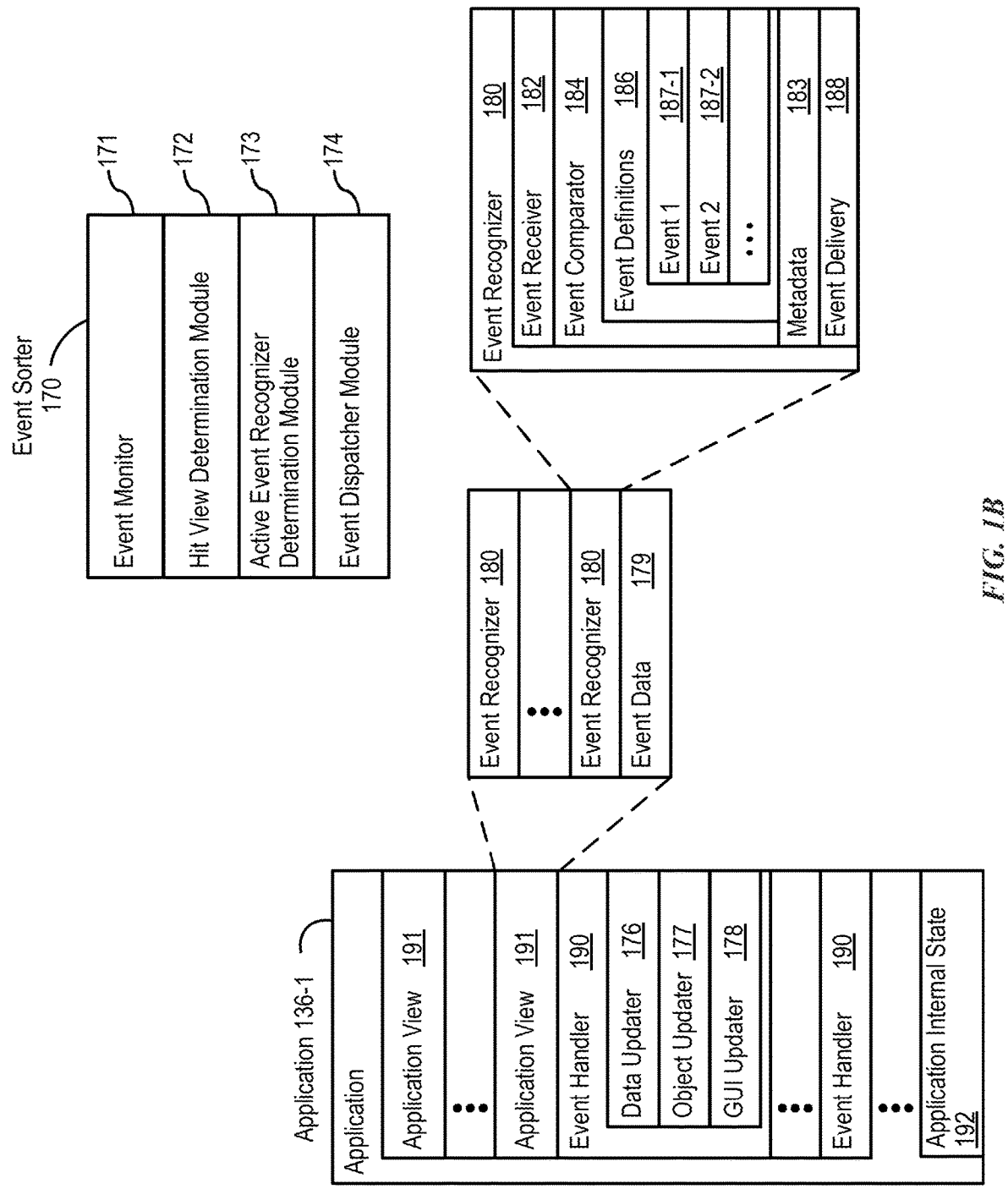
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
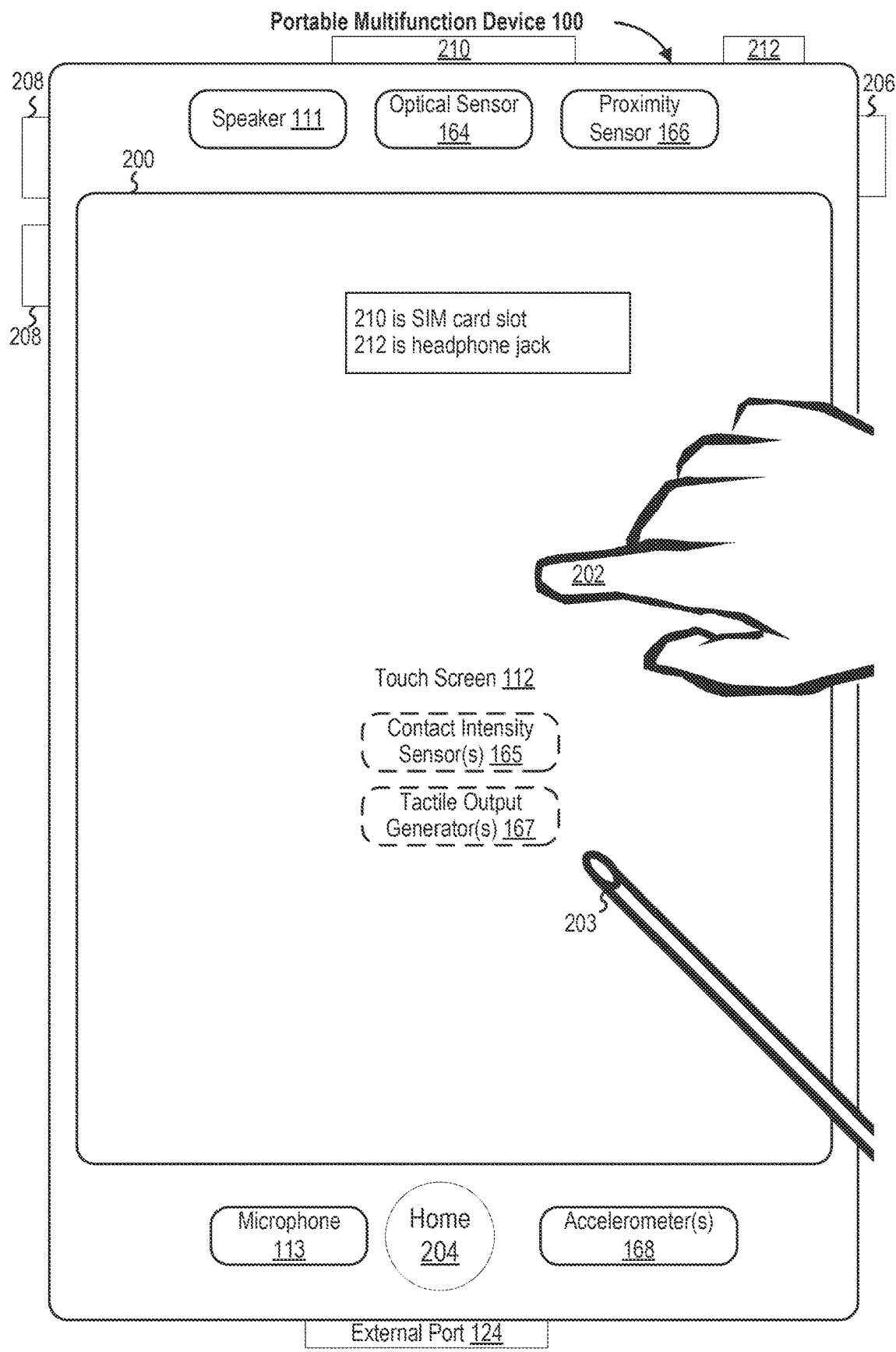
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
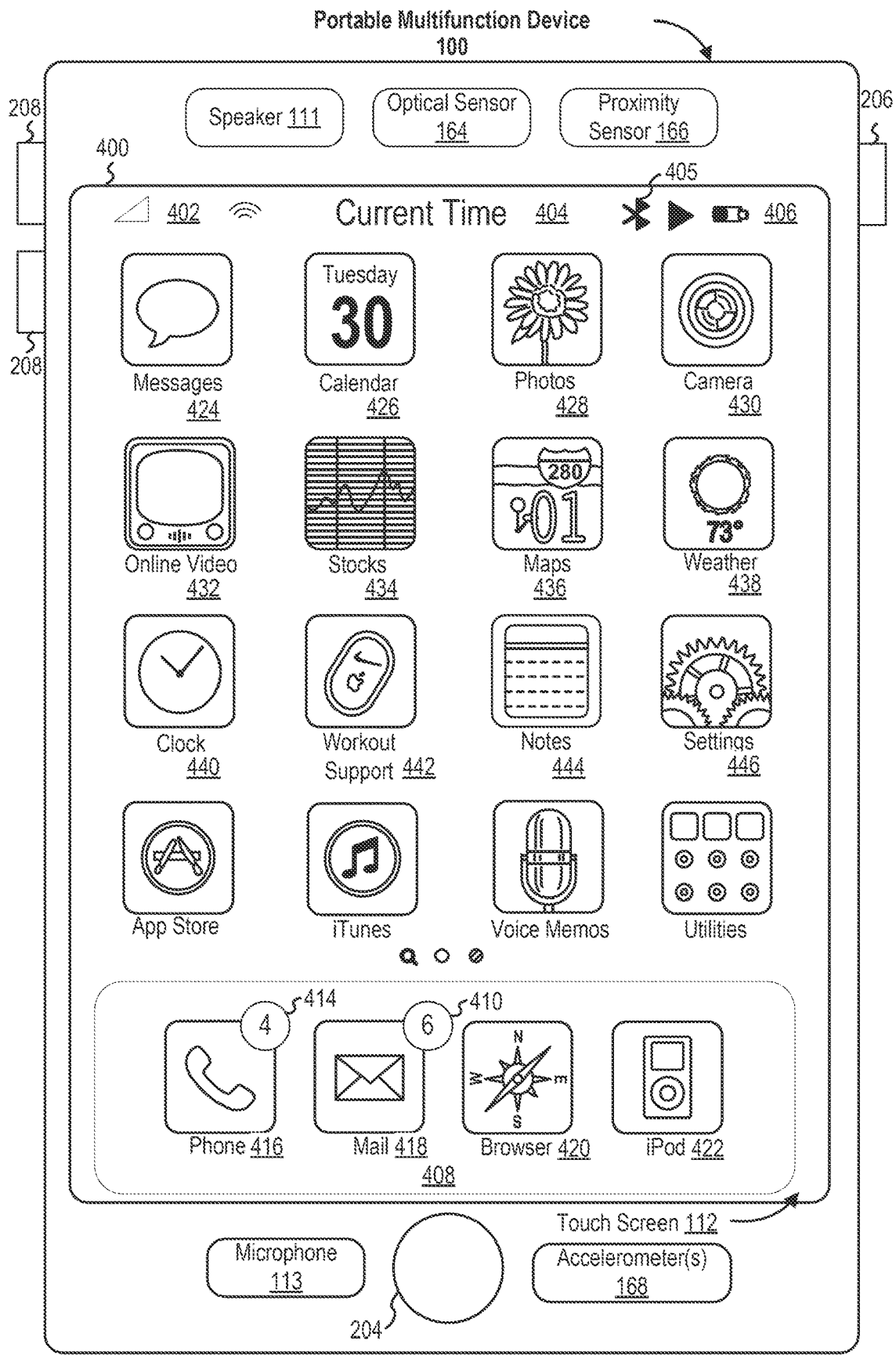
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
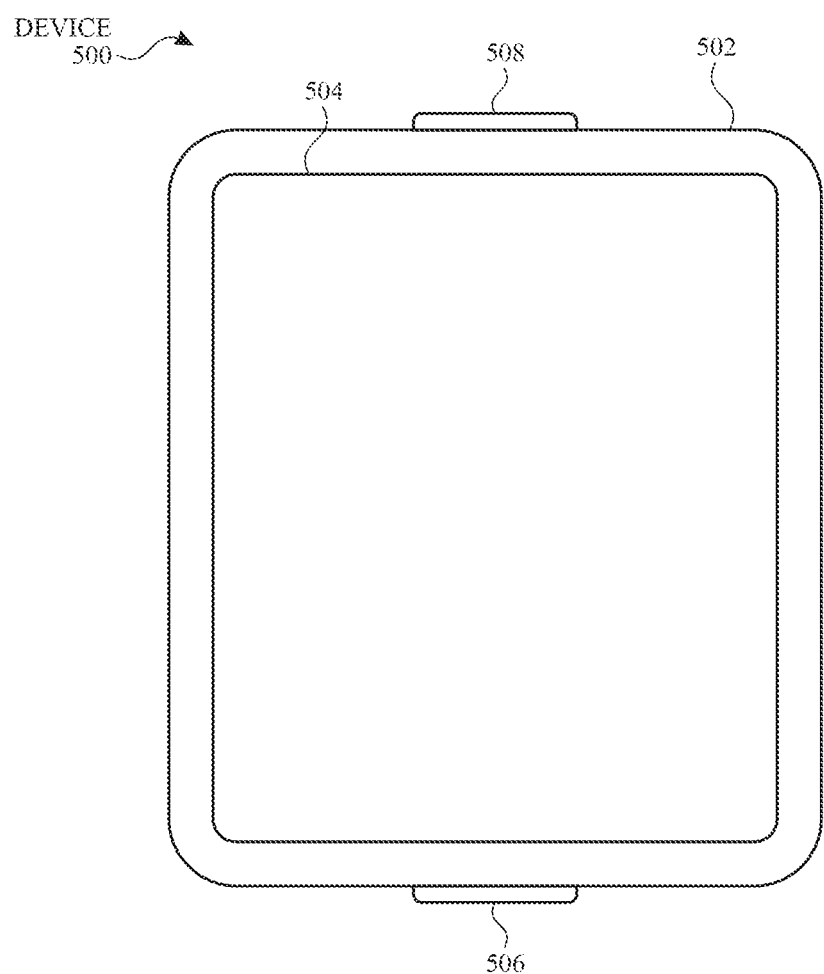
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
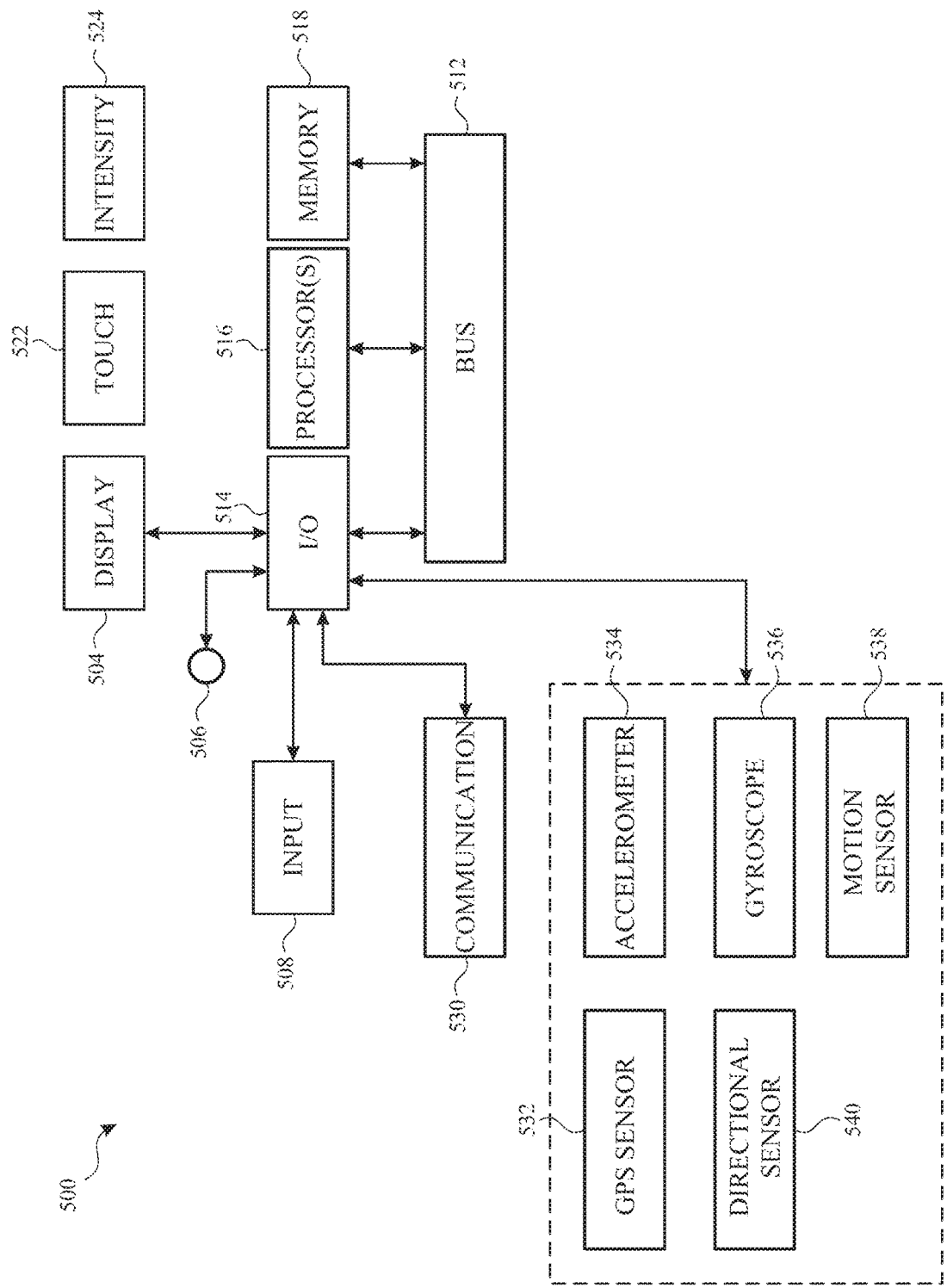
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6O illustrate exemplary user interfaces for low-bandwidth and emergency communication, in accordance with some embodiments. The user interfaces in these figures are used to illustrate the processes described below, including the processes in FIG. 7.

FIG. 6A illustrates computer system 600A (e.g., a smartphone, 100, 300, or 500) associated with a user named Emily. Computer system 600A includes display 602A. In FIG. 6A, computer system 600A displays user interface 604 of a messaging application. User interface 604 includes conversation list 608 of previous messaging conversations 608A-608G and conversation arrangement indicators 606A and 606B. In FIG. 6A, conversation arrangement indicator 606A is currently selected, as indicated by bold outlining. When conversation arrangement indicator 606A is selected, computer system 600A displays a list of conversations with all contacts and SMS conversations, arranged top to bottom according to recency, with the most recent conversation on top.

Computer system 600A displays status bar 605 at the top of display 602A. Status bar 605 includes indication of time 605A, cellular status indicator 605B, and battery indicator 605C. In FIG. 6A, cellular status indicator 605B indicates that a terrestrial wireless network is available to computer system 600A to initiate a communication (e.g., a phone call, text message, or live video communication).

In FIG. 6A, computer system 600 detects input 610A (e.g., a tap) corresponding to selection of conversation arrangement indicator 606B. In response to detecting selection of conversation arrangement indicator 606B, computer system 600A arranges (e.g., re-arranges) conversation list 608 based in part on the proximity of a participant of a conversation and/or whether computer system 600A is capable of communicating with a participant via a network other than a terrestrial cellular network (e.g., a peer-to-peer network), as shown in FIG. 6B.

In FIG. 6B, computer system 600A displays conversation list 608 divided into two portions, nearby portion 612A and out of range portion 612B. Conversation arrangement indicator 606B is outlined to indicate that conversation list 608 is arranged based on proximity. When conversation arrangement indicator 606B is selected, nearby portion 612A includes conversations of nearby users arranged according to recency. In FIG. 6B, conversation 608B, with user Jane, and conversation 608C, with user Sue, are displayed in nearby portion 612A, with conversation 608B on top because it is more recent than conversation 608C. In some embodiments, a conversation is included in nearby portion 612A because a computer system associated with a corresponding user is within a threshold distance of computer system 600A. In some embodiments, a conversation is included in nearby portion 612A because a computer system associated with a corresponding user is capable of communicating with computer system 600A via a network other than a terrestrial cellular network.

Conversations of participants that are out of range of computer system 600A (e.g., a computer system associated with a corresponding user is beyond a threshold distance of computer system 600A and/or is not capable of communicating with computer system 600A via a network other than a terrestrial cellular network) are displayed in out of range portion 612B. For example, when arrangement indicator 606A is selected, conversation 608A with user John is displayed above conversations 608B and 608C, as shown in FIG. 6A; and when nearby arrangement indicator 606B is selected, conversation 608A with user John is displayed below conversations 608B and 608C, in out of range portion 612B, as shown in FIG. 6B. Conversations 608A and 608D-608G are arranged according to recency in out of range portion 612B.

In FIG. 6B, computer system 600A displays conversations in nearby portion 612A with different appearance than conversations in out of range portion 612B. For example, in FIG. 6B, conversations 608B and 608C in nearby portion 612A are displayed with a first shading, color, and/or effect as indicated by the diagonal lines. Conversations 608A and 608D-608G in out of range portion 612B are displayed with a second shading, color, and/or effect (e.g., are greyed out and/or blurred), as indicated by the diagonal hatching in FIG. 6B.

While computer system 600A displays user interface 604, a user can select a conversation to view details of the conversation. In FIG. 6B, computer system 600A detects user input 610B (e.g., a tap) corresponding to selection of conversation 608B with Jane. In response to detecting selection of conversation 608B, computer system 600A displays message conversation user interface 614A, as shown in FIG. 6C.

In FIG. 6C, message conversation user interface 614A includes message conversation region 614A1, keyboard 614A2, message compose field 614A3, and send option 614A4. Message conversation region 614A1 includes messages between Emily and Jane. Messages sent by Emily (e.g., message 616A) are aligned on the right side of message conversation region 614A1. Messages received by Emily (e.g., message 618A) are aligned on the left side of message conversation region 614a1. Messages received by Emily are displayed with a different appearance (e.g., color, font, shading, and/or border) than messages sent by Emily, as indicated by the solid horizontal lines in message 616A and the broken horizontal lines in message 618A. In some embodiments, keyboard 614a2 and/or send option 614A4 are not initially displayed in message conversation user interface 614A. In some embodiments, computer system 600A initiates display of keyboard 614a2 and/or send option 614A4 in response to detecting input selecting message compose field 614a3.

FIG. 6D illustrates a display of the conversation between Emily and Jane on a computer system 600B associated with Jane. Computer system 600B displays message conversation user interface 614B, which is similar to message conversation user interface 614A on Emily's computer system 600A. Message conversation user interface 614B includes message conversation region 614B1, keyboard 614B2, message compose field 614B3, and send option 614B4. Message conversation region 614B1 includes messages between Emily and Jane. Messages sent by Jane (e.g., message 616B corresponding to message 616A) are aligned on the right side of message conversation region 614B1. Messages received by Jane (e.g., message 618B corresponding to message 618A) are aligned on the left side of message conversation region 614B1. Messages received by Jane are displayed with a different appearance (e.g., color, font, shading, and/or border) than messages sent by Jane, as indicated by the broken horizontal lines in message 616B and the solid horizontal lines in message 618B. In some embodiments, keyboard 614B2 and/or send option 614B4 are not initially displayed in message conversation user interface 614B. In some embodiments, computer system 600B initiates display of keyboard 614B2 and/or send option 614B4 in response to detecting input selecting message compose field 614B3. Message status indicator 619 indicates that message 618B has been successfully sent.

A user can compose and send a new message from message conversation user interface 614A or 614B by selecting message compose field (e.g., 614A3 or 614B3) and entering content using keyboard 614A2 or 614B2. In some embodiments, message compose field 614*a*4 and/or 614B3 is selected by default when message conversation user interface 614 is displayed.

In FIG. 6C, a terrestrial wireless network is available to computer system 600B to initiate a communication (e.g., to send a text message to Emily). Because a terrestrial wireless network is available to computer system 600B to initiate a communication, computer system 600B displays signal indicator 605B.

In FIG. 6D, computer system 600B detects one or more inputs in message conversation user interface 614*b* to compose a message (e.g., inputs corresponding to selection of message compose field 614*b*3 and keys of keyboard 614*b*2) and, in response, displays a composed (but unsent) message (e.g., "TALK SOON") in message compose field 614B3. Computer system 600B detects input 610D (e.g., a tap) corresponding to selection of send option 614B4. In response to detecting input 610D, computer system 600B sends a message with the content in message compose field 614B3 at the time send option 614B4 is selected. The message is added to the message conversation between Emily and Jane, shown in FIG. 6E as message 620A received by Emily, and in FIG. 6F as message 620B sent by Jane.

In FIG. 6E, because received message 620A is sent via a terrestrial wireless network, computer system 600A displays message 620A with the same appearance as other messages received by Emily (e.g., message 618A). In FIG. 6E, no terrestrial wireless network is available to computer system 600A to initiate a communication (e.g., to send a text message to Jane). Because no terrestrial wireless network is available to computer system 600A to initiate a communication, computer system 600A displays signal indicator 605D in status bar 605 (e.g., computer system 600A updates or replaces cellular status indicator 605B with no-signal indicator 605D).

In FIG. 6F, because message 620B sent by Jane sent via a terrestrial wireless network, computer system 600A displays message 620B with the same appearance as other messages sent by Jane (e.g., message 618B). In FIG. 6F, no terrestrial wireless network is available to computer system 600B to initiate a communication (e.g., to send a text message to Emily). Because no terrestrial wireless network is available to computer system 600B to initiate a communication, computer system 600B displays signal indicator 605D in status bar 605 (e.g., computer system 600B updates or replaces cellular status indicator 605B with no-signal indicator 605D) and displays temporary textual indicator 621B ("LOCAL MESSAGE") in message compose field 614B3. Temporary textual indicator 621B ("LOCAL MESSAGE") indicates that content entered into message compose field 614B3 will be sent as a local message (e.g., because no terrestrial wireless network is available to computer system 600B to initiate a communication). Temporary textual indicator 621B ("LOCAL MESSAGE") was not displayed, e.g., in message compose field 614A3 in FIG. 6C because a terrestrial wireless network was available to computer system 600A to initiate a communication at that time. Instead, message compose field 614A3 in FIG. 6C includes temporary textual indicator 617 ("TEXT MESSAGE") in message compose field 614B3, which indicates that a terrestrial wireless network is available to computer system 600A to initiate a communication. In some embodiments, message compose field 614A3 in FIG. 6C does not include temporary textual indicator 617 ("TEXT MESSAGE") (e.g., message compose field 614A3 in FIG. 6C is blank).

In FIG. 6E, computer system 600A detects one or more inputs in message conversation user interface 614*a* to compose a message (e.g., inputs corresponding to selection of message compose field 614*a*3 and keys of keyboard 614*a*2) and, in response, displays a composed (but unsent) message (e.g., "ON MY WAY") in message compose field 614*a*3. Computer system 600*a* detects input 610E (e.g., a tap) corresponding to selection of send option 614*a*4. In response to detecting input 610E, computer system 600*a* sends a message with the content in message compose field 614*a*3 at the time send option 614*a*4 is selected. The message is added to the message conversation between Emily and Jane, shown in FIG. 6G as message 624A sent by Emily, and in FIG. 6H as message 624B received by Jane.

In FIG. 6G, because message 624A sent by Emily is a local message (e.g., was sent via a network other than a terrestrial cellular network and/or was sent via a peer-to-peer network or a satellite communication network), computer system 600A displays indication 622A that message 620B is a local message (e.g., in comparison to indicator 623 displayed for messages sent via a terrestrial wireless communication network) and displays message 624A with a different appearance (e.g., color, font, shading, and/or border) than message 616A, which was not a local message (e.g., message 616A was sent by Emily via a terrestrial cellular network) and with a different appearance than received message 618A.

In FIG. 6H, computer system 600B displays message 624B with the same appearance as other messages received by Jane (e.g., message 616B). In some embodiments, because received message 624B is a local message, computer system displays message 624B with a different appearance (e.g., color, font, shading, and/or border) than message 616B, which was not a local message (e.g., message 616B was received by Jane via a terrestrial cellular network). Computer system 600B displays indication 622B that message 624B is a local message.

Figure 6I:
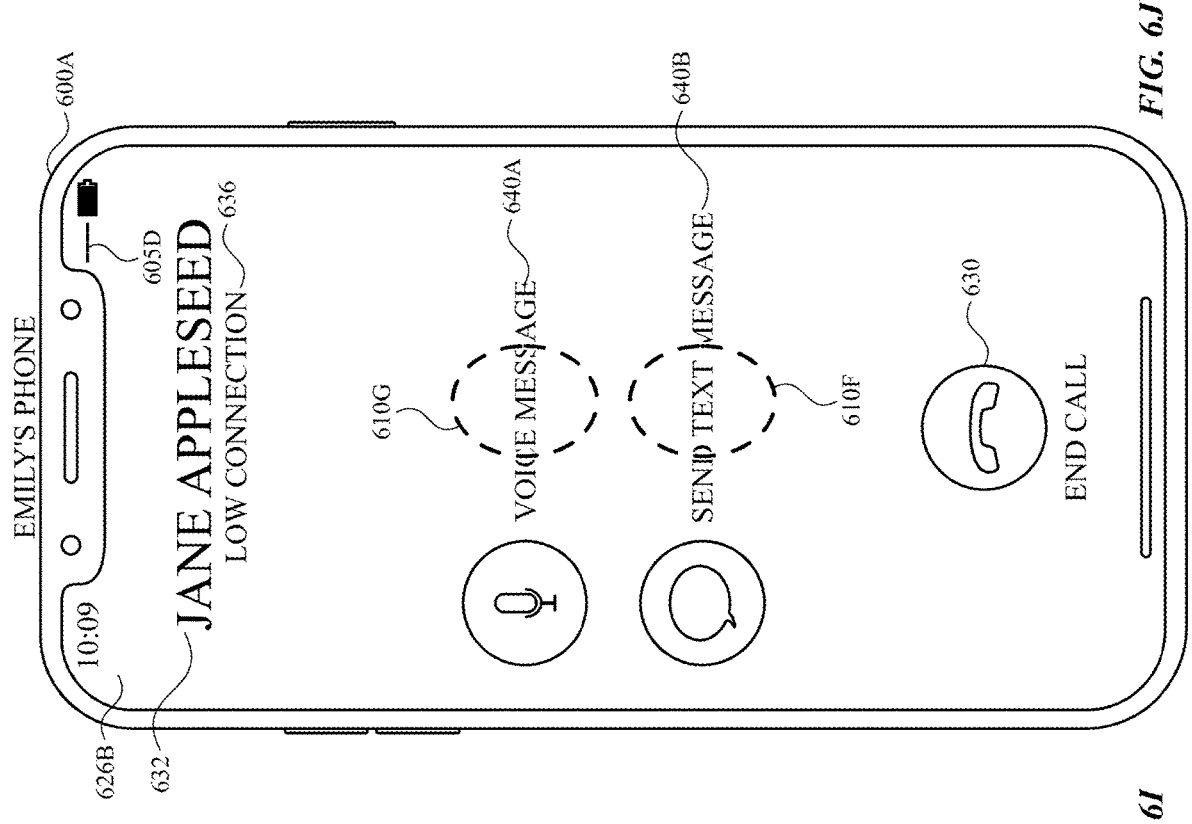
FIGS. 6A-6O illustrate exemplary user interfaces for low-bandwidth and emergency communication in accordance with some embodiments.

Turning to FIG. 6I, computer system 600A displays phone call user interface 626A when computer system 600A is attempting to initiate a phone. Call recipient indicator 632 indicates that the recipient of the call is Jane Appleseed. In some embodiments, computer system 600A displays phone call user interface 626A in response to detecting an input corresponding to a request to initiate a call with Jane (e.g., by entering Jane's number into a keypad and selecting a call button or selecting Jane from a list of contactable users). Call status indicator 634 indicates that the status of the call is "CALLING . . . " In FIG. 6I, a status of "CALLING . . . " indicates that computer system 600A is attempting (e.g., initially attempts) to initiate the call via a terrestrial wireless network, even though signal indicator 605D in status bar 605 indicates that no terrestrial wireless network is available to computer system 600A to initiate a communication.

Phone call user interface 626A includes call options 628A-628F corresponding respectively to mute option 628A, keypad option 628B, speaker option 628C, add call option 628D, video call option 628E, contacts option 628F, and end call option 630. Because computer system 600A is attempting to initiate the call but the call is not connected, add call option 628D and video call option 628E are displayed with a different appearance than call options 628A-628C and 628F (e.g., add call option 628D and video call option 628E are greyed out) to indicate that add call option 628D and video call option 628E are disabled (e.g., cannot be selected). End call option 630 can be selected to cause compute system 600A to stop attempting to initiate the call (e.g., in response to detecting an input (e.g., a tap) selecting end call option 630, computer system 600A ceases attempting to initiate the call to Jane) and, optionally, cease display of call user interface 626A (e.g., and display a home screen or previously displayed user interface).

Figure 6J:
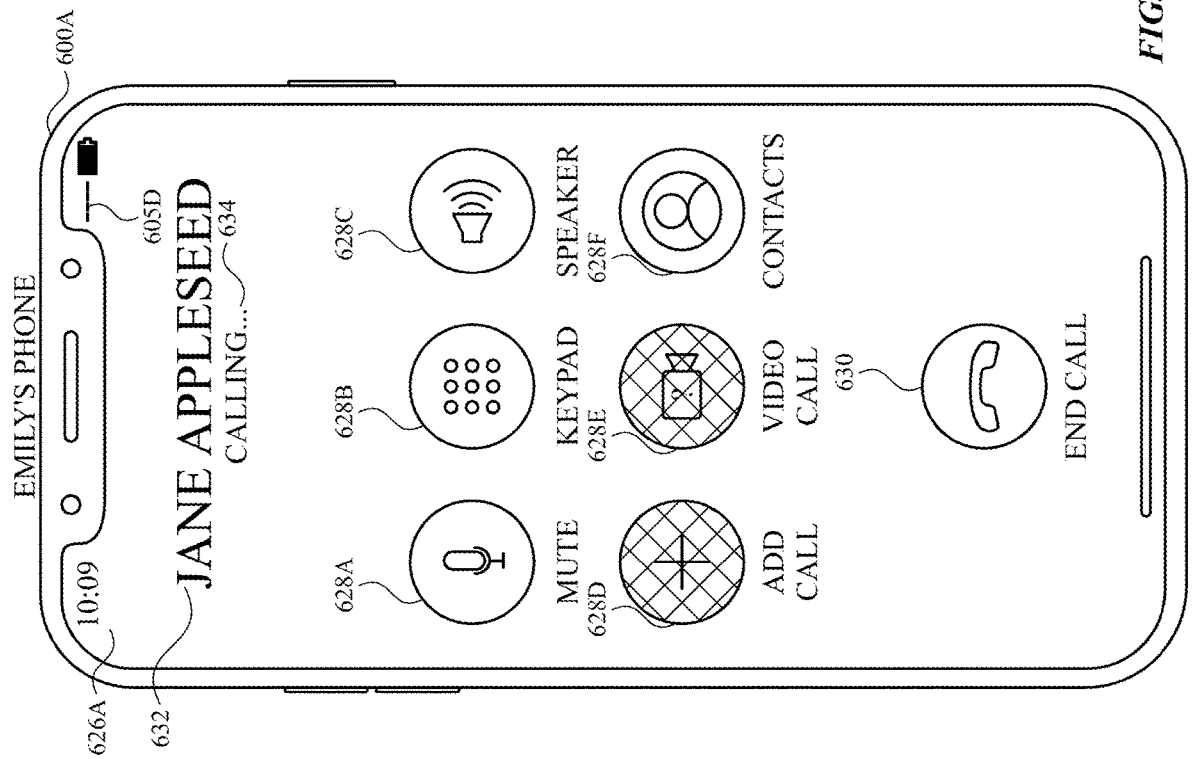

If computer system 600A determines that the call has not been or cannot be connected (e.g., computer system 600A has not successfully initiated or connected the call after a threshold amount of time, or the type of signal and/or strength of signal does not satisfy connection criteria), computer system 600A displays call user interface 626B shown in FIG. 6J, which includes options for alternative communication protocols. In FIG. 6J, computer system 600A displays call status indicator 636 (e.g., replaces and/or updates call status indicator 634 with call status indicator 636) and displays alternative communication options, including voice message option 640A and text message option 640B (e.g., replaces call options 628A-628F with voice message option 640A and text message option 640B). Call status indicator 636 indicates that computer system 600A has a low connection (e.g., a connection that supports only low-bandwidth communication). Voice message option 640A and text message option 640B provide communication methods that require less connection (e.g., less bandwidth and/or signal strength) than a phone call. Call user interface 626B includes end call option 630 (e.g., computer system 600A maintains display of end call option 630 from call user interface 626A). In some embodiments, in response to detecting an input (e.g., a tap) selecting end call option 630 in call user interface 626B, computer system 600A ceases display of call user interface 626B, and if computer system 600A is still attempting to initiate communication with Jane, stops attempting to initiate communication with Jane.

While displaying call user interface 626B, computer system 600A detecting input 610F (e.g., a tap) corresponding to selection of text message option 640B. In response to detecting input 610F, computer system 600A displays new message user interface 642 of a messaging application for sending a new message, as shown in FIG. 6K. In some embodiments, computer system 600A displays new message user interface 642 in response to detecting input 610C (e.g., a tap) on new message option 614 in user interface 604 shown in FIG. 6B.

In FIG. 6K, new message user interface 642 includes recipient field 642A, suggested recipient options 642B1-642B6, message conversation region 642C, keyboard 642D, message compose field 642E, and send option 642F. In the embodiment illustrated in FIG. 6K, because compute system 600A was attempting to initiate a communication with Jane Appleseed, computer system 600A automatically populates (e.g., pre-populates) recipient field 642A with Jane Appleseed as a recipient.

Suggested recipient options 642B1-642B6 provide various sets of users that can be selected as recipients for the new message. Option 641B1 corresponds to a set of contactable users that are determined to be nearby (e.g., they are within a threshold distance of computer system 600A, but not necessarily in Emily's contact list). Option 641B2 corresponds to a set of known contactable users that are determined to be nearby (e.g., they are in Emily's contact list and are within a threshold distance of computer system 600A). Option 641B3 corresponds to a set of favorite contactable users that are determined to be nearby (e.g., they have been designated as favorites by Emily and are within a threshold distance of computer system 600A). Option 641B4 corresponds to a set of recent and/or frequent contactable users (e.g., Emily has recently or frequently been in contact with them). Option 641B5 corresponds to a set of all contactable users that are determined to be nearby (e.g., they are within a threshold distance of computer system 600A regardless of contact status). Option 641B6 corresponds to a set of users designated as family.

In FIG. 6K, message compose field 642E has been populated with text "I'M AT THE CENTRAL STATION" (e.g., in response to detecting inputs on the respective characters in keyboard 642D).

In FIG. 6K, computer system 600A detects input 610H on send option 642F. In response to detecting input 610H, computer system 600A attempts to send a message to Jane Appleseed that includes the content in message compose field 642E at the time send option 642F is selected. As shown in FIG. 6L, the message is added to a message conversation between Emily and Jane as message 646 in message conversation region 644A of message conversation user interface 644. Computer system 600A displays message status indicator 648 under message 646, which indicates that message 646 is pending (e.g., has not been sent and/or received) because computer system 600A is searching for a network (e.g., to send message 646). Computer system 600A displays sending indicator 654 (e.g., between conversation header 644E and message conversation region 644A). Sending indicator 654 indicates the progress of sending message 646 and/or other messages that are pending to be sent (e.g., a percentage of the process of sending one or more messages that has been performed). Because computer system 600A is attempting to send message 646 as a local message, computer system 600A displays message 646 with a different appearance than messages received by Emily (e.g., message 618A) and/or messages sent via a terrestrial wireless (e.g., cellular or internet) network (e.g., message 616A in FIG. 6G). Computer system 600A can display an indication of how many messages are pending and/or a list (e.g., a queue) of pending messages (e.g., in response to a user request). In FIG. 6L, computer system 600A detects input 610I selecting sending indicator 654. In some embodiments, input 610I is a tap at least partially on conversation header 644E, and/or a drag starting at least partially on conversation header 644E. In response to detecting input 610I, computer system 600A displays a list of pending messages (communications (e.g., messages) that have been requested to be sent but have not been sent).

Figure 6M:
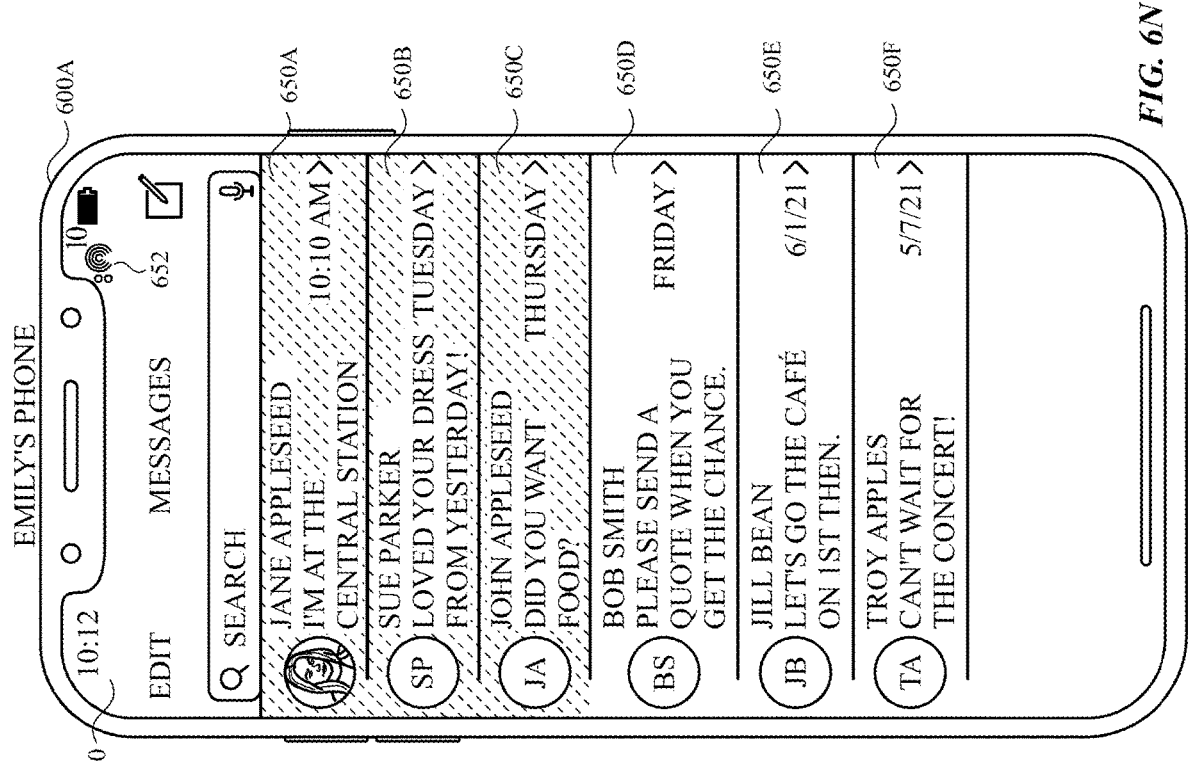

In FIG. 6M, message 646 has been sent as a local message (as indicated by the diagonal lines in message 646), and message status indicator 648 has been updated accordingly (e.g., to "SENT"). In some embodiments, because message 646 is sent as a local message, message status indicator 648 is replaced with indication 622A. In some embodiments, if sending of message 646 is achieved via a terrestrial wireless network, computer system 600A displays message 646 with a different appearance (e.g., consistent with the appearance of other messages sent via a terrestrial wireless network, such as message 616A).

Figure 6N:
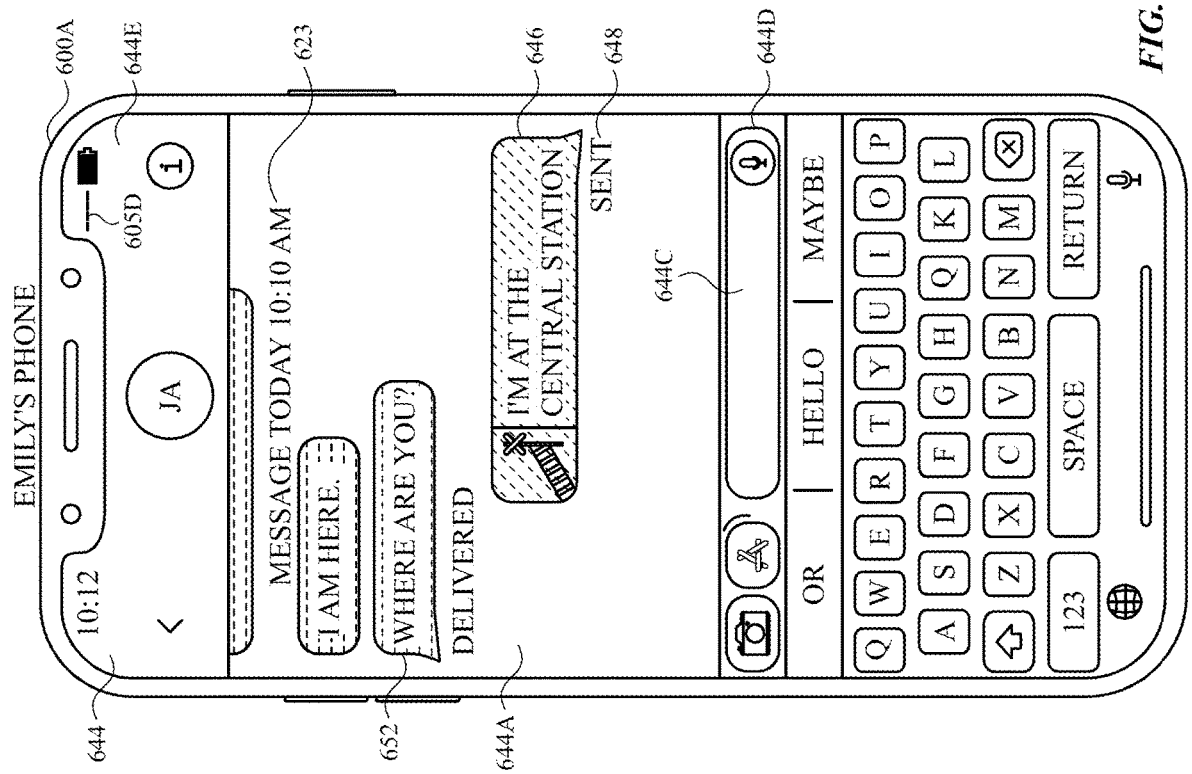
Figure 6O:
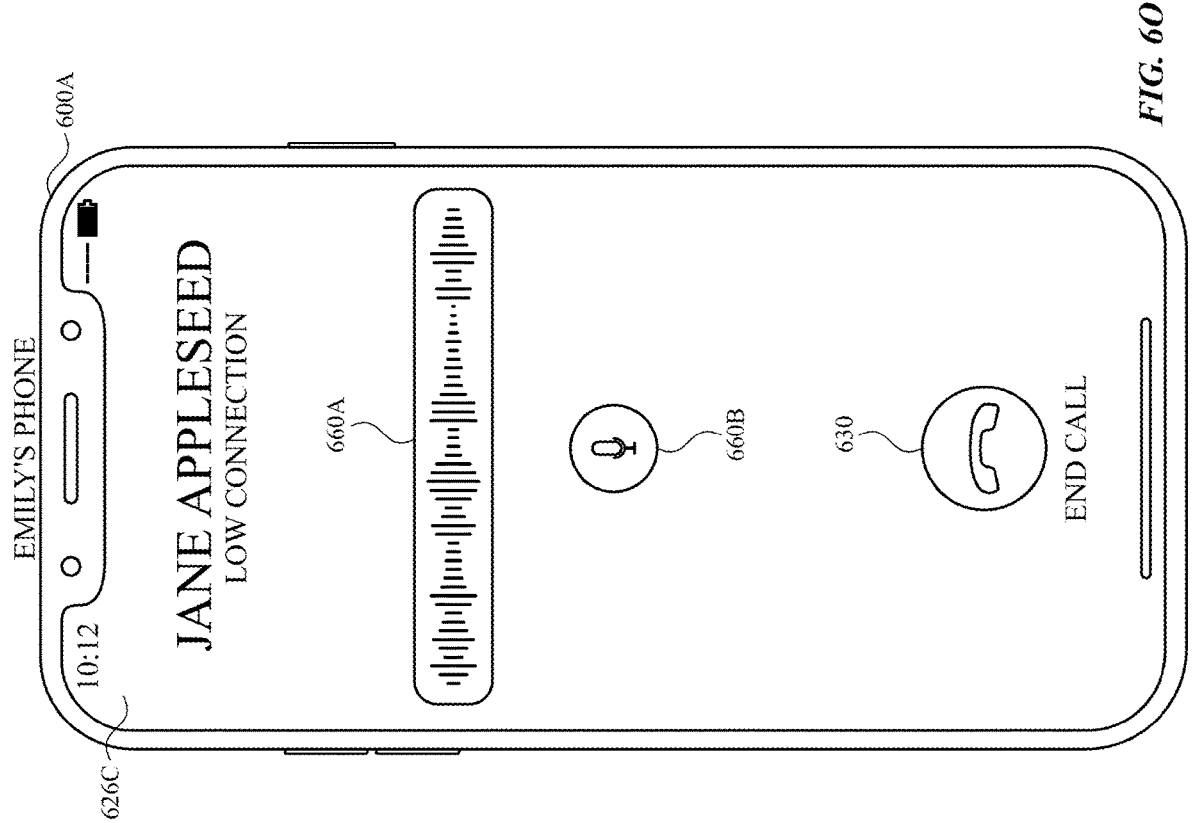

FIG. 6N illustrates computer system 600A displaying user interface 650 of a messaging application. User interface 650 displays a list of representations 650A-650F of previous conversations that are arranged based on whether computer system 600A can communicate with the corresponding participant via a local message. Conversations 650A-650C are displayed at the top of the list and have a first appearance (e.g., color) because they are accessible via local message (e.g., a communication network other than a terrestrial wireless network). Conversations 650D-650F are displayed below conversation 650C and have a second appearance (e.g., a color different from conversations 650A-650C) because they are not accessible via local message. User interface 650 displays nearby recipient indicator 652, which indicates a number of potential recipients that are currently accessible to computer system 600A via local message Returning to FIG. 6J, while displaying call user interface 626B, computer system detects input 610G (e.g., a tap) selecting voice message option 640A (e.g., instead of detecting input 610F selecting text message option 640B). In response to detecting input 610G, computer system 600A displays voice message user interface 626C as shown in FIG. 6O. In voice message user interface 626C, computer system 600A displays (e.g., maintains display of) call status indicator 636 and displays voice message indicator 660A and voice record option 660B (e.g., replaces voice message option 640A and text message option 640B with voice message indicator 660A and voice record option 660B). Voice message indicator 660A displays a representation of a recorded voice message (e.g., a representation of the amplitude of the voice message over time). In some embodiments, voice message indicator 660A is displayed after a voice message is recorded, or displayed (and, optionally, updated) while a voice message is being recorded. In response to detecting an input (e.g., a tap) selecting voice record option 660B, computer system 600A starts or stops recording a voice message (e.g., based on whether a voice message is not actively being recorded or is actively being recorded, respectively). In some embodiments, computer system 600A begins recording a voice message in response to detecting selection of voice message option 640A. In some embodiments, in response to detecting selection of voice record option 660B, computer system 600A attempts to send the voice recording represented by voice message indicator 660A, and optionally, adds a representation of the voice message to a message conversation between Emily and Jane.

Voice message user interface 626C includes end call option 630 (e.g., computer system 600A maintains display of end call option 630 from call user interface 626A). In some embodiments, in response to detecting an input (e.g., a tap) selecting end call option 630 in call user interface 626B, computer system 600A ceases display of call user interface 626C, and if computer system 600A is still attempting to initiate communication with Jane, stops attempting to initiate communication with Jane.

FIG. 7 is a flow diagram illustrating a method for low-bandwidth and emergency communication using a computer system in accordance with some embodiments. Method 700 is performed at a computer system (e.g., 100, 300, 500, 600A, 600B, 800A, 800B, a smartphone, tablet, and/or a smartwatch) that is in communication with a display generation component (e.g., 602A, 602B, 802A, 802B, a display controller and/or a touch-sensitive display system). Some operations in method 700 are, optionally, combined, the orders of some operations are, optionally, changed, and some operations are, optionally, omitted.

As described below, method 700 provides an intuitive way for performing low-bandwidth and/or emergency communication. The method reduces the cognitive burden on a user for performing low-bandwidth and/or emergency communication, thereby creating a more efficient human-machine interface. For battery-operated computing devices, enabling a user to performing low-bandwidth and/or emergency communication faster and more efficiently conserves power and increases the time between battery charges.

The computer system displays (702), via the display generation component, a user interface (e.g., 604, 614A, 614B, 644, 806B, 812, or 822) for initiating (e.g., sending and/or receiving) a communication (e.g., 616A, 616B, 618A, 618B, 620A, 620B, 624A, 624B, 646, 824A, 824B, 828A, and/or 828B) (e.g., a user interface of a communication application (e.g., messaging application); a user interface with one or more options (e.g., icons, buttons, affordances, interactive graphical elements, a keyboard, a send option, and/or a call option) to send a text message, initiate a phone call, and/or initiate a video conference). In some embodiments, the user interface is a user interface of a messaging application that includes a message conversation between two or more participants with one or more messages between the two or more participants in a messages region.

Displaying the user interface includes: (704) in accordance with a determination (e.g., by the computer system) that a terrestrial wireless network (e.g., a cellular network and/or an internet network (e.g., WI-FI)) is available to the computer system to initiate the communication (e.g., the computer system is able to connect to the terrestrial wireless network; and/or the computer system is receiving a signal (e.g., from the terrestrial wireless network) with sufficient strength and/or consistency to initiate (e.g., send and/or receive) a communication;), displaying at least a portion of the user interface (e.g., 605B, 614A3, 614B3, 614A4, 614A4, 642E, 642F, 644C, 644D, 616A, 616B, 618A, 618B, 812C, 812D, 806M, 806N, 822C, and/or 822D) with a first appearance (e.g., displaying one or more elements (e.g., a message, a selectable send option, and/or a text entry field) of the user interface with a first color, text, or graphical element;); and (706) in accordance with a determination that no terrestrial wireless network is available to the computer system to initiate the communication (and, optionally, that an alternative communication network that is not a terrestrial wireless network is available to the computer system to initiate the communication) (e.g., the computer system is not able to connect to any terrestrial wireless network; the computer system is not receiving a signal (e.g., from a terrestrial wireless network) with sufficient strength and/or consistency to initiate (e.g., send and/or receive) a communication; and/or communication via a wireless network (e.g., a terrestrial wireless network) or internet network is not available), displaying the portion of the user interface (e.g., 605D, 614A3, 614B3, 614A4, 614A4, 642E, 642F, 644C, 644D, 620A, 620B, 624A, 624B, 646, 622A, 622B, 648, 812C, 812D, 806M, 806N, 822C, and/or 822D) with a second appearance (e.g., displaying the one or more elements of the user interface with a second color, text, or graphical element that indicates that no terrestrial wireless network is reachable;), where the second appearance is different from the first appearance and includes an indication (e.g., text, a graphic, and/or a color) that the communication can be initiated via an alternative communication network other than the terrestrial wireless network (e.g., a peer-to-peer (e.g., ad-hoc) network wherein devices exchange information without a central node via communication mediums (e.g., wirelessly, wired) directly or indirectly (e.g., sending information to an intermediary device(s) in communication with an intended recipient) or a satellite communication network).

In some embodiments, the terrestrial wireless network is determined to be reachable by the presence of a wireless (e.g., cellular) signal. In some embodiments, the user interface includes a send option (e.g., 614A4, 614B4, 642F, 644D, 812D, 806N, and/or 822D) that is green or blue to indicate a communication will be initiated via the terrestrial wireless network, and/or non-communicable text (e.g., 617, "Text Message") is present in a compose field (e.g., 642E, 614A3, 614B3, 644C, 812C, 806M, and/or 822C) of the user interface to indicate that the communication will be sent via terrestrial wireless network, and/or text at the top of the conversation history that indicates the message as an instant message. In some embodiments, the computer system displays at least a portion of the user interface with the first appearance in accordance with a determination that one or more particular types of communication network are available to the computer system to initiate the communication (e.g., a determination that a wireless network (e.g., a terrestrial wireless network) and/or an internet network is available to the computer system to initiate the communication).

In some embodiments, the user interface includes a send option (614A4, 614B4, 642F, 644D, 812D, 806N, and/or 822D) that is orange to indicate a communication will be initiated via a communication network other than a terrestrial wireless network, and/or non-communicable text (e.g., "local message", 622A, and/or 622B) is present in a compose field (e.g., 642E, and/or 614A3, 614B3, 644C, 812C, 806M, and/or 822C) of the user interface to indicate the communication will be sent via the alternative communication network, and/or text at the top of the conversation history that indicates the message as "Local Message" (e.g., 622A, 622B, and/or 823). In some embodiments, the computer system displays the portion of the user interface with the second appearance in accordance with a determination that one or more particular types of communication network are not available to the computer system to initiate the communication (e.g., a determination that no terrestrial wireless network or that neither a terrestrial cellular network nor an internet network is available to the computer system to initiate the communication).

Displaying at least a portion of the user interface with a first appearance in accordance with a determination that a terrestrial wireless network is available to the computer system to initiate the communication and with a second appearance that is different from the first appearance in accordance with a determination that no terrestrial wireless network is available to the computer system to initiate the communication provides the user with visual feedback about whether or not a terrestrial wireless network is available to the computer system to initiate the communication, which provides improved visual feedback.

In some embodiments, the alternative communication network other than the terrestrial wireless network includes (e.g., is) a peer-to-peer communication network. In some embodiments, a peer-to-peer communication network allows devices to send information to each other locally, or to send messages peer-to-peer to reach a device with wireless signal to send to the recipient. In some embodiments, the alternative communication network includes (e.g., is) a satellite communication network.

In some embodiments, the first appearance includes (e.g., is) one or more messages (e.g., 616A, 616B, 618A, and/or 618B) having a first color (e.g., green or blue) and the second appearance includes (e.g., is) one or more messages (e.g., 620A, 620B, 624A, 624B, 646, 824A, and/or 824B) having a second color (e.g., orange or yellow) different from the first color (e.g., the first appearance does not include the second color and/or the second appearance does not include the first color).

In some embodiments, the computer system displays representations of messages (e.g., in a message conversation displayed in a messaging application) sent via a terrestrial wireless network with a different color than representations of messages that are sent via the alternative communication network. In some embodiments, the computer system displays representations of messages (e.g., in a message conversation displayed in a messaging application) received via a terrestrial wireless network with a different color than representations of messages that are received via the alternative communication network. In some embodiments, the one or more messages having a first color are displayed concurrently (e.g., concurrently in the same user interface) with the one or more messages having a second color.

Including a one or more messages having a first color in the first appearance and one or more messages having a second, different color in the second appearance provides the user with visual feedback about whether or not a terrestrial wireless network was used to send the communication, which provides improved visual feedback.

In some embodiments, in accordance with the determination that no terrestrial wireless network is available to the computer system to initiate the communication, the computer system displays, in the user interface, a representation of a map and/or a satellite view (e.g., 816A, 816B, 826A, and/or 826B) (e.g., of a location of the computer system). In some embodiments, the representation of the map and/or the satellite view is displayed (e.g., concurrently displayed) with a representation of a message that is being prepared to be sent or has been sent by the computer system. Displaying, in the user interface, a representation of a map and/or a satellite view in accordance with the determination that no terrestrial wireless network is available to the computer system to initiate the communication provides the user with additional visual information about the computer system without requiring additional user input, which provides improved visual feedback, reduces the number of inputs needed to perform an operation, and performs an operation when a set of conditions has been met without requiring further user input.

In some embodiments, the indication that the communication can be initiated via an alternative communication network other than the terrestrial wireless network includes an indication (e.g., 605D or 652) (e.g., text, a graphic, and/or a color) at a fixed (e.g., constant) location (e.g., 605) in the user interface for initiating the communication (e.g., at the top of the user interface, at the top of a message conversation, and/or in a region (e.g., status bar) of the user interface that includes one or more indications of system status (e.g., signal strength, battery level, and/or connection status)). In some embodiments, the computer system replaces (e.g., substitutes) an indication (e.g., 605B) of wireless connection status (e.g., in the status bar) with the indication (e.g., 605D) that the communication can be initiated via an alternative communication network other than the terrestrial wireless network (e.g., ceases to display the indication of wireless connection at a first location and displays the indication that the communication can be initiated via an alternative communication network other than the terrestrial wireless network at the first location). Providing an indication that the communication can be initiated via an alternative communication network at a fixed location in the user interface for initiating the communication provides the user with visual feedback about the communication state of the computer system at a consistent location, which provides improved visual feedback.

In some embodiments, the user interface (e.g., 604 or 642) includes one or more representations of suggested recipients (e.g., 608A-608G, 642A, 642B1-642B6, or 830A-830G) for the communication (e.g., one or more selectable graphical user interface elements that, when selected, add a corresponding recipient to a list of recipients to receive the communication); in accordance with a determination that a terrestrial wireless network is available to the computer system to initiate the communication, the computer system displays the one or more representations of suggested recipients (e.g., 608A-608G or 830A-830G) for the communication in a first manner (e.g., a first order and/or a first set of representations of suggested recipients for the communication); and in accordance with a determination that no terrestrial wireless network is available to the computer system to initiate the communication, the computer system displays the one or more representations of suggested recipients (e.g., 608A-608G or 830A-830G) for the communication in a second manner (e.g., a second order and/or a second (e.g., different) set of representations of suggested recipients for the communication) different from the first manner. Displaying representations of suggested recipients for the communication in different manners based on whether or not a terrestrial wireless network is available to the computer system to initiate the communication provides the user with more relevant suggested recipients and visual feedback about what recipients are available based on network availability, which provides improved visual feedback and performs an operation when a set of conditions has been met without requiring further user input.

In some embodiments, the one or more representations of suggested recipients (e.g., 608B and 608C in FIG. 6B, 642B1, or 830A and 830B in FIG. 8K) for the communication are based on (e.g., selected by the computer system based on) a proximity of remote computer systems (e.g., devices) associated with the suggested recipients for the communication to the computer system (e.g., representations of recipients associated with remote computer systems that are within a predefined distance of the computer system). In some embodiments, the computer system displays the one or more representations of suggested recipients for the communication in a manner (e.g., the first manner and/or the second manner) that is based on a proximity of remote computer systems associated with the suggested recipients to the computer system. In some embodiments, the computer system displays representations of entities (e.g., users, groups of users, companies, and/or services) that are associated with remote computer systems within a threshold distance of the computer system at a top of a list of the one or more representations of suggested recipients for the communication. In some embodiments, the computer system displays only representations of entities that are associated with remote computer systems within a threshold distance of the computer system. Basing the one or more representations of suggested recipients for the communication on a proximity of remote computer systems associated with the suggested recipients for the communication to the computer system provides the user with more relevant suggested recipients and visual feedback about what recipients are close to the user, which provides improved visual feedback and performs an operation when a set of conditions has been met without requiring further user input.

In some embodiments, the one or more representations of suggested recipients (e.g., 642B2) for the communication are based on (e.g., selected by the computer system based on) a proximity of remote computer systems (e.g., devices) associated with the suggested recipients for the communication to the computer system (e.g., representations of recipients associated with remote computer systems that are within a predefined distance of the computer system) and a determination that the suggested recipients are associated (e.g., previously associated) with the computer system (e.g., known contactable users and/or contactable users that are in a list of contactable users associated with the computer system (e.g., a contacts list of a user account associated with and/or logged into the computer system)). In some embodiments, the computer system displays representations of entities that are associated with the computer system and are associated with a remote computer system that is within a threshold distance of the computer system at a top of a list of the one or more representations of suggested recipients for the communication. Basing the one or more representations of suggested recipients for the communication on a proximity of remote computer systems associated with the suggested recipients for the communication to the computer system and a determination that the suggested recipients are associated with the computer system provides the user with more relevant suggested recipients and visual feedback about what known contacts are close to the user, which provides improved visual feedback and performs an operation when a set of conditions has been met without requiring further user input.

In some embodiments, the one or more representations of suggested recipients (e.g., 642B3) for the communication are based on (e.g., selected by the computer system based on) a proximity of remote computer systems (e.g., devices) associated with the suggested recipients for the communication to the computer system (e.g., representations of recipients associated with remote computer systems that are within a predefined distance of the computer system) and a determination that the suggested recipients are designated (e.g., by a user) associated (e.g., previously associated) with the computer system (e.g., favorite contacts). In some embodiments, the computer system displays representations of entities that are designated as favorite contacts and are associated with a remote computer system that is within a threshold distance of the computer system at a top of a list of the one or more representations of suggested recipients for the communication. Basing the one or more representations of suggested recipients for the communication on a proximity of remote computer systems associated with the suggested recipients for the communication to the computer system and a determination that the suggested recipients are designated associated with the computer system provides the user with more relevant suggested recipients and visual feedback about what designated contacts are close to the user, which provides improved visual feedback and performs an operation when a set of conditions has been met without requiring further user input.

In some embodiments, the one or more representations of suggested recipients (e.g., 642B4) for the communication are based on (e.g., selected by the computer system based on) a determination that the suggested recipients are associated (e.g., previously associated) with the computer system (e.g., known contactable users and/or contactable users that are in a list of contactable users associated with the computer system (e.g., a contacts list of a user associated with and/or logged into the computer system)) and how recently and/or frequently (e.g., based on a predetermined threshold amount of time, a threshold number of times, and/or relative to other contactable users) the suggested recipients have been in contact with (e.g., have contacted or have been contacted by) a user (e.g., with a user account) associated with the computer system (e.g., by the computer system and/or a user account associated with the computer system). In some embodiments, the computer system displays representations of recently and/or frequently contacted users at a top of a list of the one or more representations of suggested recipients for the communication. Basing the one or more representations of suggested recipients for the communication on a determination that the suggested recipients are associated with the computer system and how recently and/or frequently the suggested recipients have been contacted provides the user with more relevant suggested recipients and visual feedback about what contacts have been recently and/or frequently contacted, which provides improved visual feedback and performs an operation when a set of conditions has been met without requiring further user input.

In some embodiments, displaying the user interface (e.g., 650) for initiating the communication includes: in accordance with a determination that no terrestrial wireless network is available to the computer system to initiate the communication, displaying, in the user interface for initiating the communication, an indication (e.g., 652) (e.g., text, a graphic, and/or a color) of a number of computer systems (or, optionally, a number of entities) that are accessible via the alternative communication network other than the terrestrial wireless network. In some embodiments, displaying the indication of the number of computer systems that are accessible via the alternative communication network other than the terrestrial wireless network includes replacing (e.g., substituting) an indication of wireless connection status (e.g., in a status bar) with the indication of the number of computer systems that are accessible via the alternative communication network other than the terrestrial wireless network (e.g., ceasing to display the indication of wireless connection at a first location and displaying the indication of the number of computer systems that are accessible via the alternative communication network other than the terrestrial wireless network at the first location). Displaying, in the user interface for initiating the communication, an indication of a number of computer systems that are accessible via the alternative communication network other than the terrestrial wireless network in accordance with a determination that no terrestrial wireless network is available to the computer system to initiate the communication provides visual feedback about the number of users to which the communication can be sent, which provided improved visual feedback and performs an operation when a set of conditions has been met without requiring further user input.

In some embodiments, displaying the user interface (e.g., 604) for initiating the communication includes: displaying, in a first portion (e.g., 604 in FIG. 6A; or 612B) (e.g., region, tab, section, portion of a list, and/or section of a list) of the user interface for initiating the communication, a first set of representations of contactable entities (e.g., 608 in FIG. 6A; or 608A and 608D-608G in FIG. 6B) (e.g., regardless of whether or not the contactable entity can be contacted via the alternative communication network; all entities in a user's contacts list); and displaying, in a second portion (e.g., 612A) (e.g., region, tab, section, portion of a list, and/or section of a list), different from the first portion, of the user interface for initiating the communication, a second set of representations of contactable entities (e.g., 608B and 608C in FIG. 6B) (e.g., a subset of the plurality of representations of contactable entities) that can be contacted (e.g., are associated with remote computer systems that are accessible) via the alternative communication network, wherein the first set of representations of contactable entities is different from the second set of representations of contactable entities. In some embodiments, the second portion of the user interface does not include any representations of entities that cannot be contacted via the alternative communication network (e.g., the second portion of the user interface includes only representations of entities that can be contacted via the alternative communication network. Displaying a first set of representation of contactable entities in a first portion of the user interface for initiating the communication and a second, different set of representations of contactable entities that can be contacted via the alternative communication network in a second, different portion of the user interface for initiating the communication provides the user with visual feedback about which entities can be contacted via the alternative communication network, which provides improved visual feedback.

In some embodiments, the computer system is in communication with one or more input devices; the computer system detects, via the one or more input devices, one or more inputs (e.g., 610A) (e.g., touch inputs and/or voice command inputs) corresponding to a request to display one or more representations of contactable entities (e.g., a request to search for and display a desired contactable entity, such as, e.g., selection of a search affordance and/or entry of one or more characters into a search field); and in response to detecting the one or more inputs corresponding to a request to display one or more representations of contactable entities, the computer system displays, in the user interface (e.g., 604 or 650), one or more representations of contactable entities, including: in accordance with a determination that a computer system associated with a respective contactable entity satisfies a proximity condition, the computer system displays a representation of the respective entity in a first manner (e.g., 608B and 608C in FIG. 6B; or 650A-650C) (e.g., bolded, not greyed out, or otherwise emphasized (e.g., relative to a representation of an entity that does not satisfy the proximity condition)); and in accordance with a determination that a computer system associated with the respective contactable entity does not satisfy the proximity condition, the computer system displays the representation of the respective contactable entity in a second manner (e.g., greyed out or otherwise de-emphasized (e.g., relative to a representation of an entity that satisfies the proximity condition)) different from the first manner (e.g., 608A and 608D-608G in FIG. 6B; or 650D-650F). In some embodiments, in accordance with a determination that a computer system associated with a respective contactable entity satisfies a proximity condition, the representation of the respective entity is selectable (e.g., the computer system enables selection of the representation of the respective entity); and in accordance with a determination that a computer system associated with the respective contactable entity does not satisfy the proximity condition, the representation of the respective contactable entity is not selectable (e.g., the computer system disables selection of the representation of the respective contactable entity). Displaying a representation of an entity in different manners based on whether or not a computer system associated with a respective contactable entity satisfies a proximity condition provides the user with visual feedback about the proximity of the respective contactable entity and performs an operation when a set of conditions has been met without requiring further user input.

In some embodiments, the user interface (e.g., 604 or 650) includes one or more representations of potential recipients (e.g., 608A-608G or 650A-650F) for the communication (e.g., one or more selectable graphical user interface elements that, when selected, add a corresponding recipient to a list of recipients to receive the communication), including a first representation of a first potential recipient. In some embodiments, in accordance with a determination that a computer system associated with the first potential recipient is accessible via the alternative communication network, the computer system displays the first representation of the first potential recipients with a first color (e.g., 608B in FIG. 6B; or 650A) (e.g., orange or yellow) (and, optionally, without a second color); and in accordance with a determination that a computer system associated with the first potential recipient is not accessible via the alternative communication network, the computer system displays the first representation of the first potential recipients with a second color (and, optionally, without the first color) different from the first color (e.g., 608A in FIG. 6B; or 650D). Displaying the first representation of the first potential recipients with a first color or a second, different color based on whether or not the first potential recipient is accessible via the alternative communication network provides the user with a visual indication of the accessibility of the first potential recipient via the alternative communication network, which provides improved visual feedback and performs an operation when a set of conditions has been met without requiring further user input.

In some embodiments, the computer system displays, in the user interface (e.g., 604 in FIG. 6B or 650), one or more representations (e.g., 608A-608G or 650A-650F) (e.g., a list of representations) of previous conversations (e.g., one or more communications (e.g., messages) between a user associated with the computer system and one or more other entities), wherein an order (e.g., from top to bottom and/or from left to right) of the one or more representations of previous conversations is based on accessibility of computer systems associated with participants of the previous conversations via the alternative communication network (e.g., 604 in FIG. 6B or 650) (e.g., representations of conversations that include entities that are associated with computer systems that are within a threshold distance of the computer system and/or are accessible via the alternative communication network are displayed at the top of a list of previous conversations). In some embodiments, the one or more representations of previous conversations include a first representation of a first conversation and a second representation of a second conversation, and displaying the one or more representations of the previous conversations includes: in accordance with a determination that one or more participants of the first conversation are accessible via the alternative communication network and one or more participants of the second conversation are not accessible via the alternative communication network, displaying the first representation of the first conversation before (e.g., earlier, above, and/or to the left of) the second representation of the second conversation; and in accordance with a determination that one or more participants of the first conversation are not accessible via the alternative communication network and one or more participants of the second conversation are accessible via the alternative communication network, displaying the second representation of the second conversation before (e.g., earlier, above, and/or to the left of) the first representation of the first conversation. Basing an order of the one or more representations of previous conversations on accessibility of computer systems associated with participants of the previous conversations via the alternative communication network provides the user with a relevant ordering of previous conversations when initiating a communication via the alternative communication network, which provides improved visual feedback.

In some embodiments, the computer system displays, in the user interface (e.g., 604 in FIG. 6B or 650), one or more representations (e.g., 608A-608G or 650A-650F) (e.g., a list of representations) of previous conversations (e.g., one or more communications (e.g., messages) between a user associated with the computer system and one or more other entities), including a first representation (e.g., 608A, 608B, 650A, or 650D) of a first conversation, wherein displaying the one or more representations of the previous conversations includes: in accordance with a determination that a computer system of one or more participants of the first conversation is accessible via the alternative communication network, displaying an indication (e.g., 608B, or 650A) (e.g., text, a graphic, and/or a color) that a computer system of one or more participants of the first conversation is accessible via the alternative communication network; and in accordance with a determination that a computer system of one or more participants of the first conversation is not accessible via the alternative communication network, displaying the first representation of the first conversation without the indication (e.g., 608A or 650D) that a computer system of one or more participants of the first conversation is accessible via the alternative communication network. Displaying an indication that a computer system of one or more participants of the first conversation is accessible via the alternative communication network in accordance with a determination that a computer system of one or more participants of the first conversation is accessible via the alternative communication network provides the user with visual feedback about whether or not the of one or more participants of the first conversation are accessible via the alternative communication network, which provides improved visual feedback and performs an operation when a set of has been met without requiring further user input.

In some embodiments, the computer system detects one or more inputs (e.g., 610E, 610H, or 810I) corresponding to a request to send the communication (e.g., 646); in response to detecting one or more inputs corresponding to a request to send the communication, the computer system attempts to send the communication (e.g., 646; or the call in FIG. 6I) via a terrestrial wireless network (e.g., FIG. 6L or FIG. 6I) before attempting to send the communication via the alternative network; and after attempting to send the communication via a terrestrial wireless network, in accordance with (e.g., in response to) a determination (or receiving an indication) that attempting to send the communication via a terrestrial wireless network failed, the computer system attempts to send the communication via the alternative communication network (e.g., FIG. 6N or FIG. 6J). In some embodiments, after attempting to send the communication via a terrestrial wireless network, the computer system attempts to send the communication via the alternative communication network in response to detecting selection (e.g., another selection) of a selectable send option (e.g., button, icon, and/or affordance). Attempting to send the communication via the alternative communication network after attempting to send the communication via a terrestrial wireless network and in response to a determination that attempting to send the communication via a terrestrial wireless network failed provides the user with a backup communication option without requiring additional user input if a terrestrial wireless network fails, which reduces the number of inputs needed to perform an operation.

In some embodiments, the determination that no terrestrial wireless network is available to the computer system to initiate the communication (e.g., 646) is made if the computer system is able to receive a signal from a terrestrial wireless network but is unable to establish a communication link (e.g., the communication network does not work and/or is incompatible with the computer system). Making a determination that no terrestrial wireless network is available to the computer system to initiate the communication if the computer system is able to receive a signal from a terrestrial wireless network but is unable to establish a communication link provides the user with an indication that the communication can be initiated via an alternative communication network under these circumstances, which provides improved visual feedback. In some embodiments, the computer system is automatically (e.g., by default and/or without explicit user input) enabled to initiate (and/or send) the communication via the alternative communication network. Automatically enabling the computer system to initiate the communication via the alternative communication network allows the computer system to initiate communication via the alternative communication network automatically without additional input when no terrestrial wireless network is available to the computer system to initiate the communication, which reduces the number of inputs needed to perform an operation. In some embodiments, the computer system detects selection of an option (e.g., 640A, 640B, 804D, 806G, or 836A) (e.g., a button, affordance, toggle, switch, and/or user-interactive graphical object) for enabling (and, optionally, disabling) communication via the alternative communication network; and in response to detecting selection of an option for enabling communication via the alternative communication network, the computer system enables the computer system to communicate via the alternative communication network. In some embodiments, the option for enabling communication via the alternative communication network is displayed in a control menu, control user interface (e.g., 626B or 804), or a widget (e.g., 806B) that includes a plurality of selectable options for controlling settings of the computer system. Enabling the computer system to communicate via the alternative communication network in response to detecting selection of an option for enabling communication via the alternative communication network provides the user with greater ability to configure the functionality of the computer system and enable a mode that allows the computer system to initiate communication via the alternative communication network automatically without additional input when no terrestrial wireless network is available to the computer system to initiate the communication, which reduces the number of inputs needed to perform an operation.

In some embodiments, the computer system detects one or more inputs corresponding to a request to initiate the communication via a phone call (e.g., FIG. 6I); in response to detecting the one or more inputs corresponding to a request to initiate the communication via a phone call: in accordance with a determination that a terrestrial wireless network is available to the computer system to initiate the communication, the computer system initiates the communication via a phone call; and in accordance with a determination that no terrestrial wireless network is available to the computer system to initiate the communication, the computer system displays a user interface of a messaging application (e.g., 642) for initiating (and/or sending) the communication via a message (e.g., a text and/or audio message) (and, optionally, without attempting to initiate the communication via a phone call). Initiating the communication via a phone call or displaying a user interface of a messaging application for initiating the communication via a message based on whether or not a terrestrial wireless network is available to the computer system to initiate the communication provides the user with a relevant communication protocol without requiring additional input, which reduces the number of inputs needed to perform an operation and performs an operation when a set of conditions has been met without requiring further user input.

In some embodiments, displaying the user interface includes: in accordance with a determination that no terrestrial wireless network is available to the computer system to initiate the communication, displaying one or more options (e.g., 806J or 806K) for selecting content of the communication. In some embodiments, the computer system displays a predefined set of words and/or images that can be included in the communication (e.g., predetermined word, phrases, and/or images that can be selected). In some embodiments, the computer system does not provide (e.g., display) a QWERTY keyboard for generating the content of the communication. In some embodiments, the size of content is constrained or limited (e.g., to a predetermined number of characters, images, and/or data size (e.g., bytes)). Displaying one or more options for selecting content of the communication in accordance with a determination that no terrestrial wireless network is available to the computer system to initiate the communication allows the computer system to provide the user with content options that are preferable for communicating via the alternative communication network when no terrestrial wireless network is available and reduces the number of inputs required to compose the communication, which provides improved visual feedback, reduces the number of inputs needed to perform an operation and performs an operation when a set of conditions has been met without requiring further user input.

In some embodiments, in accordance with a determination that one or more communications (e.g., messages) have been requested to be sent but have not been sent (e.g., are pending or queued to be sent), the computer system displays (e.g., in a predetermined and/or fixed location of a user interface (e.g., the user interface for initiating the communication), such as a status bar; or in a non-fixed location such as, e.g., underneath or next to a representation of the communication) an indication (e.g., 648 and/or 654) (e.g., text, a graphic, an animation, and/or a color) that one or more communications have been requested to be sent but have not been sent. In some embodiments, the indication displays a number of communications that have been requested to be sent but have not been sent. Displaying an indication that one or more communication have been requested to be sent, but have not been sent, in accordance with a determination that one or more communications have been requested to be sent but have not been sent provides the user with visual feedback about the status of previously initiated communications, which provides improved visual feedback.

In some embodiments, while displaying the indication (e.g., 648) that one or more communications (e.g., 646) have been requested to be sent but have not been sent, the computer system detects an input (e.g., 610I) corresponding to a selection of the indication that one or more communications have been requested to be sent but have not been sent (e.g., a tap on the indication). In some embodiments, in response to detecting an input (e.g., 610I) corresponding to a selection of the indication that one or more communications have been requested to be sent but have not been sent, the computer system displays representations, different from the indication that one or more communications have been requested to be sent but have not been sent, of the one or more communications that have been requested to be sent but have not been sent (e.g., a list of pending and/or queued messages (e.g., with individual, separate, and/or distinct representations for each message)). Displaying representations of the one or more communications that have been requested to be sent but have not been sent in response to detecting an input corresponding to a selection of the indication that one or more communications have been requested to be sent but have not been sent provides the user with visual feedback about the status of previously initiated communications, which provides improved visual feedback.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, displaying a portion of a user interface with different appearances based on whether a terrestrial wireless network is available to a computer system to initiate a communication can be applied to method 900. For brevity, these details are not repeated below.

FIGS. 8A-8S illustrate exemplary user interfaces for low-bandwidth and emergency communication, in accordance with some embodiments. The user interfaces in these figures are used to illustrate the processes described below, including the processes in FIG. 9.

FIG. 8A illustrates computer system 800A (e.g., a smartphone, 100, 300, or 500) associated with a user named Luke. In FIG. 8A, computer system 800A displays user interface 804, which displays (e.g., concurrently displays) option 804A to power off computer system 800A, medical ID option 804B (e.g., to view medical information of a user associated with computer system 800A), emergency SOS call option 804C, emergency SOS message option 804D, and cancel option 804E. In some embodiments, computer system 800A displays user interface 804 in response to detecting an input (e.g., a press with a duration that satisfies a duration threshold or a plurality of presses (e.g., 2 presses, 3 presses, or 5 presses) within a predetermined amount of time) on hardware button 801.

In response to detecting input 810A (e.g., a drag or swipe gesture) corresponding to selection of emergency SOS call option 804C, computer system 800A attempts to initiate a phone call to a designated emergency services number (e.g., 911, 112, or 999, depending on the country or region). In response to detecting input 810B (e.g., a drag or swipe gesture) corresponding to selection of emergency SOS message option 804D, computer system 800A displays emergency messaging user interface 812, described later with reference to FIG. 8D.

Turning to FIG. 8B, computer system 800A displays user interface 806 (e.g., a page of a multi-page home screen that includes a plurality of selectable icons for launching and/or opening respective applications). User interface 806 displays calendar widget 806A and emergency SOS widget 806B. In some embodiments, a widget is a user-interactive graphical object that displays (and, optionally, updates display of) information obtained from a corresponding application. Emergency SOS widget 806B provides a user with the ability to initiate (or attempt to initiate) and/or send (or attempt to send) an emergency communication. Header 806H ("SEND SOS") indicates a current state (e.g., send state) of emergency SOS widget 806B, and indicates that emergency SOS widget 806B is currently configured to send an SOS.

Emergency SOS widget 806B displays representations 806C1-806C4 of recipients selected to receive an emergency communication generated and/or sent using emergency SOS widget 806B. In some embodiments, recipients are automatically selected by computer system 800A and/or previously selected by a user associated with computer system 800A (e.g., via an emergency SOS settings menu). Representations 806C1-806C4 of recipients selected to receive an emergency communication include the first name and last initial of the recipients to protect privacy. The avatars in can be representations 806C1-806C4 of recipients selected to receive an emergency communication can be blurred or displayed with reduced fidelity to protect privacy. Emergency SOS widget 806B displays message information indicator 806D, which indicates the number of recipients selected to receive the emergency communication (e.g., 5, 10, or 18 people) and a summary of content to be included in the communication (e.g., the sender's name, location, and phone number). Optional message option 806E can be selected to initiate a process for adding additional content (e.g., customized and/or predetermined text and/or graphics) to the emergency communication. In some embodiments, computer system 800A (or widget 806B) limits the amount and/or type of content that can be added using optional message option 806E.

Computer system 800A detects input 810C selecting send option 806G. In response to detecting input 810C selecting send option 806G, computer system 800A initiates a process for sending the emergency communication to the number of recipients indicated in message information indicator 806D (including recipients represented by representations 806C1-806C4) and with the information summarized in message information indicator 806D. In some embodiments, in response to detecting selection of send option 806G, computer system 800A displays confirmation prompt 808 (e.g., a pop up) to confirm that the user wants to send the SOS communication, as shown in FIG. 8C. While displaying confirmation prompt 808, computer system 800A dims, blurs, and/or greys out portions of user interface 806 other than confirm option 808. Confirmation prompt 808 includes confirm option 808A and cancel option 808B. In some embodiments, in response to detecting input corresponding to selection of cancel option 808B, computer system ceases to display confirmation prompt 808 and removes any visual effects added in response to detecting input 810C selecting send option 806G (e.g., computer system 800A re-displays user interface 806).

In FIG. 8C, computer system 800A detects input 810D selecting confirm option 808A. In response to detecting selection of confirm option 808A, computer system 800A enters an emergency communication mode and displays messaging user interface 812 shown in FIG. 8D, which allows a user to add additional content to the communication.

In FIG. 8D, messaging user interface 812 includes message conversation region 812A, keyboard 812B, message compose field 812C, and send option 812D. Additional content for the communication has been added to message compose field 812C using messaging user interface 812 by selecting message compose field 812C and entering the text "I FELL IN A DEEP RAVINE AND CAN'T GET OUT!" using keyboard 812B. In some embodiments, message compose field 812C is selected by default when messaging user interface 812 is displayed. In some embodiments, computer system 800A restricts the number of characters and/or type of content that can be added to message compose field 812C and/or the communication.

In FIG. 8D, computer system 800A detects input 810E (e.g., a tap) selecting send option 812D. In response to detecting the selection of send option 812D, computer system 800A sends (or attempts to send) the emergency communication to the number of recipients indicated in message information indicator 806D with the information summarized in message information indicator 806D and the content in message compose field 812C in FIG. 8D. In some embodiments, computer system 800A sends (or attempts to send) the emergency communication to the number of recipients indicated in message information indicator 806D with the information summarized in message information indicator 806D in response to detecting selection of confirm option 808A, without displaying messaging user interface 812. After the communication is sent in response to detecting input 810E, computer system 800A displays message 814A and location indicator 816A (e.g., a map or satellite view with a pin at the sender's location) corresponding to the communication in message conversation region 812A of messaging user interface 812, as shown in FIG. 8E.

FIGS. 8F-8G illustrate user interfaces displayed on computer system 800B associated with a recipient of the communication sent by computer system 800A when or after the communication is sent. In FIG. 8F, while computer system 800B is displaying user interface 818 (e.g., a home screen), computer system 800B receives an alert of the message. In response to receiving the alert, computer system 800B displays notification 820, which includes communication summary 820A and location indicator 820B. Communication summary 820A includes indications of the sender (e.g., Luke), the situation (e.g., an emergency), and the distance of the sender relative to computer system 800B (e.g., 0.5 miles away).

A user can select notification 820 to view additional details of the emergency communication. In response to detecting input 810F selecting notification 820, computer system 800B displays messaging user interface 822 shown in FIG. 8G. Messaging user interface 822 displays message 814B (corresponding to message 814A) and location indicator 816B (corresponding to location indicator 816A) in message conversation region 822A, which display the content of the emergency communication.

Turning to FIG. 8H, after sending the emergency communication, computer system 800A updates emergency SOS widget 806B. FIG. 8H illustrates emergency SOS widget 806B after the emergency communication is sent in FIG. 8D. Header 806I indicates that an SOS communication has been sent, safe communication option 806I can be selected to notify the recipients of the emergency communication that the sender is now safe (e.g., with a predefined communication), and additional information option 806K can be selected to provide additional information via a customized communication.

In response to detecting input 810H (e.g., a tap) selecting additional information option 806K, computer system 800A scrolls user interface 806 (including emergency SOS widget 806B) upward on display 802A and displays keyboard 806L, message compose field 806M, and send option 806N. Additional information is added to message compose field 806M by selecting message compose field 806M and entering the text "I CAN'T FIND A WAY OUT!" using keyboard 806L. In some embodiments, computer system 800A selects message compose field 806M by default in response to detecting selection of additional information option 806K. In some embodiments, computer system 800A restricts the number of characters and/or type of content that can be added to message compose field 806M.

In response to detecting input 810I (e.g., a tap) selecting send option 806N, computer system 800A sends the content in message compose field 806M to emergency services and any selected emergency recipients (e.g., emergency contacts). After the additional information is sent, message 824A and location indicator 826A (e.g., an updated location indicator) are added to message conversation region 812A in messaging user interface 812. Message 824A includes the additional information from message compose field 806M, and location indicator 826A provides an updated location of computer system 800A (e.g., the location of computer system 800A when the additional information is sent).

Turning to FIG. 8K, computer system 800B displays user interface 828 of a messaging application after the additional information is sent. User interface 828 displays a list 830 of previous conversations 830A-830G. Similar to user interface 604 in FIG. 6B, conversations 830A-830G are separated into two portions of user interface 828, nearby portion 832A and out of range portion 832B, based on the proximity of computer systems associated with participants of the conversations. Conversation 830A corresponds to the emergency SOS conversation initiated by computer system 800A. In response to detecting input 810K (e.g., a tap) selecting conversation 830A, computer system 800B displays (e.g., re-displays) messaging user interface 822, as shown in FIG. 8M. In FIG. 8M, messaging user interface 822 has been updated (e.g., compared to FIG. 8G) to include message 824B (corresponding to message 824A) and location indicator 826B (corresponding to location indicator 826A). FIG. 8L illustrates the corresponding messaging user interface 812 displayed by computer system 800A (which is unchanged from FIG. 8J).

Messaging user interface 822 provides the recipient associated with computer system 800B to respond in the emergency system conversation. In FIG. 8M, a message ("I'M ON MY WAY") is composed in message compose field 822C using keyboard 822B (or, optionally, a voice input), sent by computer system 800B in response to detecting input 810L selecting send option 822D, and added to the emergency system message conversation. FIG. 8N illustrates messaging user interface 812 displayed by computer system 800A, which has been updated to include message 828A received by Luke; and FIG. 8O illustrates messaging user and 822 displayed by computer system 800B, which has been updated to include corresponding message 828B sent by the user (e.g., John) associated with computer system 800B.

FIGS. 8O and 8P illustrate functionality of location indicator 826B. In FIG. 8O, computer system 800B detects input 810M (e.g., a tap) selecting location indicator 826B. In response to detecting selection of location indicator 826B, computer system 800B minimizes keyboard 822B and displays map 830 (and/or a satellite view) with location marker 830A and location marker 830B. Location marker 830A represents the location of computer system 800A associated with (at the time of) message 814A. Location marker 830B represents the location of computer system 800A associated with (at the time of) message 824A. Location markers can be selected to view a message corresponding to the marker. For example, in response to detecting input 810N (e.g., a tap or tap and hold) on location marker 830B in FIG. 8P, computer system 800B displays message 824C, which includes the content and time of the message corresponding to location marker 830B (e.g., message 824A and/or message 824B). Location indicator 816A, 816B, and 826A have analogous functionality.

Returning to FIG. 8H, emergency SOS widget 806B displays safe communication option 806J. In some embodiments, computer system 800A detects input 810B (e.g., a tap) selecting safe communication option 806J (e.g., instead of or in addition to detecting input 810H selecting additional information option 806K). In response to detecting selection of safe communication option 806J, computer system 800A sends data indicating that Luke is safe, as illustrated by safe indication 832 ("LUKAS REPORTED SAFE") displayed in the emergency system message conversation in user interface 822 of FIG. 8Q.

FIG. 8R illustrates techniques for displaying a representation of an emergency message (or emergency message conversation) in a list of content items, such as a news feed or a list of items selected as being contextually relevant to a user. Computer system 800B displays user interface 834 with tabs 834C1-834C5. Tab 834C1 labeled "FOR YOU" is selected and includes list 834A of content items 834A1-834A4 that are selected (e.g., based on user preferences and/or prior activity) from different types of content items as being relevant to the user associated with computer system 800B. The types of content items shown (e.g., concurrently displayed) in list 834 in FIG. 8R include, for example, an emergency communication (e.g., 834A1), an advertisement (e.g., 834A2), a maintenance or repair notice (e.g., 834A3), and a news story (e.g., 834A4, about a lost dog). View indicators 834B1-834B4 indicate the number of users or times that an item has been viewed.

FIG. 8S illustrates computer system 800A in a low-power state displaying user interface 836 (e.g., a low-power user interface). User interface 836 includes indicator 652, indicating that nearby users are available for communication via a network other than a terrestrial wireless communication network. User interface 836 displays a single emergency SOS option 836A, in contrast to concurrently displaying (as, e.g., in user interface 804 shown in FIG. 8A) an emergency SOS call option (e.g., emergency SOS call option 804C) and an emergency SOS message option (e.g., emergency SOS message option 804D). In some embodiments, in response to detecting input 810N (e.g., a tap, drag, or swipe) selecting emergency SOS option 836A, computer system 800A attempts to initiate a phone call to a designated emergency service (as described in response to selection of emergency SOS call option 804C) or, alternatively, initiates an emergency communication mode (as described in response to selection of emergency SOS message option 804D) based on communication network status. For example, if a terrestrial wireless communication network is available, computer system 800A attempts to initiate a phone call to a designated emergency service in response to detecting selection of emergency SOS option 836A; and if no terrestrial wireless communication network is available, computer system 800A initiates an emergency communication mode (e.g., displays user interface 812 shown in FIG. 8D) in response to detecting selection of emergency SOS option 836A.

FIG. 9 is a flow diagram illustrating a method for low-bandwidth and/or emergency communication using a computer system in accordance with some embodiments. Method 900 is performed at a computer system (e.g., 100, 300, 500, 600A, 600B, 800A, 800B, a smartphone, tablet, and/or a smartwatch) that is in communication with a display generation component and one or more input devices (e.g., a touch-sensitive surface, a touchscreen, a button, and/or a microphone). Some operations in method 900 are, optionally, combined, the orders of some operations are, optionally, changed, and some operations are, optionally, omitted.

As described below, method 900 provides an intuitive way for providing low-bandwidth and/or emergency communication. The method reduces the cognitive burden on a user for performing low-bandwidth and/or emergency communication, thereby creating a more efficient human-machine interface. For battery-operated computing devices, enabling a user to perform low-bandwidth and/or emergency communication faster and more efficiently conserves power and increases the time between battery charges.

While the computer system is in an emergency communication mode (e.g., FIG. 8D) (e.g., a set (e.g., a particular set and/or one or more particular types) of communication networks is not available to initiate a communication (e.g., the computer system is not able to connect to any of the set of communication networks; and/or the computer system is not receiving a signal (e.g., from any of the set of communication networks) with sufficient strength and/or consistency to initiate (e.g., send and/or receive) a communication), and/or the computer system is communicating via an alternative communication network (e.g., a peer-to-peer (e.g., ad-hoc) network, where devices exchange information without a central node via communication mediums directly or indirectly (e.g., sending information to an intermediary device(s) in communication with an intended recipient): the computer system displays (902), via the display generation component, a first user interface (e.g., 812, 806B, or 822) (e.g., an emergency communication interface (e.g., a widget) for communicating an emergency communication) specific to the emergency communication mode (e.g., the first user interface is not displayed prior to the emergency communication mode) that includes (e.g., concurrently including) a selectable send communication option (e.g., 806G, 808A, 812D, 806J, 806N, or 822D) (e.g., an affordance, button, graphical element, graphical object, and/or icon; displaying the send communication option is in response to determining the one or more recipients are reachable (e.g., the computer system is able to connect to)) to send a communication (e.g., 814A, 814B, 816A, 816B, 824A, 824B, 826A, 826B, 828A, 828B, or 832) (e.g., an emergency communication)) to one or more recipients that are automatically selected (e.g., selected without further user input and/or by a computer system (e.g., the computer system and/or a remote computer system)) based on a proximity of remote computer systems (e.g., devices) associated with the one or more recipients (e.g., 806C1-806C4) to the computer system (e.g., one or more external devices;) without providing (e.g., displaying) information that identifies the one or more recipients (e.g., without identifying any of the one or more recipients).

In some embodiments, the selectable send communication option is a "send" affordance. In some embodiments, the communication includes (e.g., only includes) a name of the user (first and/or last name), a location of the user, a phone number of the user, and/or a customized message (e.g., a customized text message for which the number of characters and/or type of content is restricted (e.g., no emojis and/or less than a predetermined number of characters)). In some embodiments, the external devices must be within a predefined distance of the computer system. In some embodiments, the first user interface includes (e.g., concurrently with the send communication option) an indication corresponding to the one or more recipients (e.g., limited information about the one or more recipients that does not identify the recipients). In some embodiments, the indication of the one or more recipients includes location(s) of one or more recipients, the number of recipients, and/or phone number(s) of one or more recipients. In some embodiments, displaying the first user interface includes displaying content (e.g., a summary of content) that will be in the communication.

While the computer system is in the emergency communication mode, the computer system receives (904), via the one or more input devices, one or more inputs (e.g., 810C, 810D, 810E, 810G, 810I, or 810L) (e.g., a single-tap gesture, a double-tap gesture, and/or a non-tap gesture (e.g., a swipe gesture and/or a press-and-hold gesture)) that include a selection of the send communication option.

While the computer system is in the emergency communication mode, in response to receiving the one or more inputs, the computer system sends (906) the communication (e.g., 814A, 814B, 816A, 816B, 824A, 824B, 826A, 826B, 828A, 828B, or 832) to the one or more recipients. In some embodiments, via an alternative communication network (e.g., a peer-to-peer (e.g., ad-hoc) network wherein devices exchange information without a central node via communication mediums directly or indirectly (e.g., sending information to an intermediary device(s) in communication with an intended recipient). Automatically selecting one or more recipients of a communication based on a proximity of remote computer system associated with the one or more recipients to the computer system without providing information that identifies the one or more recipients reduces the need for additional inputs to select recipients and provides recipients that are most relevant in an emergency situation while providing the ability to maintain the anonymity of the recipients, which provides improved visual feedback and reduces the number of inputs needed to perform an operation.

In some embodiments, the first user interface (e.g., 812, 806B, or 822) specific to the emergency communication mode, including the send communication option (e.g., 806G, 808A, 812D, 806J, 806N, or 822D), is not displayed (e.g., is not available on the computer system or not available in a messaging user interface or a respective system user interface such as a control user interface or a computer system power down user interface that includes an option to power down the computer system) while the computer system is not in the emergency communication mode. Not displaying the first user interface specific to the emergency communication mode, including the send communication option, while the computer system is not in the emergency communication mode allows the user to access the first user interface in the emergency communication mode while eliminating the possibility of mistakenly accessing the first user interface when not in the emergency communication mode, which provides additional control options without cluttering the user interface.

In some embodiments, the computer system displays a selectable emergency communication option (e.g., 804C or 836A) (e.g., an icon, button, affordance, and/or user-interactive user interface object); while displaying the selectable emergency communication option, the computer system receives, via the one or more input devices, an input (e.g., 810A or 810N) that selects the emergency communication option; and in response to receiving the input that selects the emergency communication option: in accordance with a determination that a terrestrial wireless network (e.g., a cellular network and/or an internet network (e.g., WI-FI)) is available to the computer system to initiate a communication, the computer system initiates a communication (e.g., a phone call) to a designated recipient (e.g., an emergency service such as "911," "211," or "999," depending on the country or region) via the terrestrial wireless network (In some embodiments, the computer system initiates the communication to the designated recipient via the terrestrial wireless network without entering or activating the emergency communication mode); and in accordance with a determination that no terrestrial wireless network is available to the computer system to initiate a communication, the computer system enters (e.g., activating and/or initiating) the emergency communication mode (e.g., 812, 806B, or 822) (and, optionally, displaying the first user interface specific to the emergency communication mode). Initiating a communication to a designated recipient via the terrestrial wireless network or entering the emergency communication mode depending on whether or not a terrestrial wireless network is available to the computer system to initiate a communication provides the user with a contextually relevant response to selection of the emergency communication option, which provides improved visual feedback and performs an operation when a set of conditions has been met without requiring further user input.

In some embodiments, the computer system displays, concurrently (e.g., FIG. 8A), a selectable emergency communication option (e.g., 804C) (e.g., an icon, button, affordance, slider, and/or user-interactive user interface object) and a selectable emergency mode option (e.g., 804D) (e.g., an icon, button, affordance, slider, and/or user-interactive user interface object); the computer system receives, via the one or more input devices, an input (e.g., 810A or 810B) corresponding to selection of the emergency communication option or the emergency mode option; and in response to receiving the input corresponding to selection of the emergency communication option or the emergency mode option: in accordance with a determination that the input corresponds to selection of the emergency communication option (e.g., 810A), the computer system attempts to initiate a communication (e.g., a phone call) to a designated recipient (e.g., an emergency service such as "911") via the terrestrial wireless network (In some embodiments, the computer system initiates the communication to the designated recipient via the terrestrial wireless network without entering or activating the emergency communication mode); and in accordance with a determination that the input corresponds to selection of the emergency mode option (e.g., 810B), the computer system enters (e.g., activating and/or initiating) the emergency communication mode (e.g., 812, 806B, or 822) (and, optionally, displaying the first user interface specific to the emergency communication mode). Concurrently displaying an option to initiate a communication via the terrestrial wireless network and an option to enter the emergency communication mode provides the user with a user interface for efficiently choosing between techniques for sending an emergency communication without the need to navigate multiple user interfaces and/or menus, which reduces the number of inputs needed to perform an operation.

In some embodiments, while the computer system is in a low-power mode (e.g., FIG. 8S), the computer system displays a selectable emergency mode option (e.g., 836A) (e.g., an icon, button, affordance, slider, and/or user-interactive user interface object); the computer system receives, via the one or more input devices, an input (e.g., 810N) corresponding to selection of the emergency mode option; and in response to receiving the input corresponding to selection of the emergency mode option, the computer system enters (e.g., activating and/or initiating) the emergency communication mode (e.g., 812, 806B, or 822) (and, optionally, displaying the first user interface specific to the emergency communication mode and/or exiting (e.g., ceasing to operate the computer system in) the low-power mode). Entering the emergency communication mode in response to receiving an input corresponding to selection, while in a low-power mode, of the emergency mode option provides the user with a quick and efficient technique for entering the emergency communication mode from a low-power mode without navigating additional user interfaces, which reduces the number of inputs needed to perform an operation.

In some embodiments, the one or more recipients (e.g., 806C1-806C4) are selected based on contact information (e.g., name (first and/or last), phone number(s), email address(es), user name(s), physical address(es), image (e.g., profile picture, avatar, or emoji) included in a user account associated with the computer system. In some embodiments, the one or more recipients do not include any recipients for which the user account associated with the computer system does not include contact information (e.g., the one or more recipients only include recipients for which the user account associated with the computer system includes contact information). In some embodiments, the one or more recipients are selected in part in accordance with a determination that the user account associated with the computer system includes contact information for the one or more recipients (e.g., each of the one or more recipients). Selecting the one or more recipients based on contact information included in a user account associated with the computer system provides the user with quick access to relevant recipients in an emergency situation without having to navigate a contacts menu or application, which reduces the number of inputs needed to perform an operation.

In some embodiments, the one or more recipients (e.g., 806C1-806C4) includes a first recipient, and a user account associated with the computer system does not include contact information of the first recipient (e.g., the first recipient is not included in a list of contactable entities associated with a user account associated with the computer system). Including a recipient that is not associated with a user account of the computer system provides the user with potentially previously unknown recipients in proximity to the user that may be able to assist in an emergency situation which reduces the need to select additional recipients (e.g., from a list of contactable users), which reduces the number of inputs needed to perform an operation.

In some embodiments, in accordance with a determination that the communication is associated with a first type of communication (e.g., a first type of emergency, such as, e.g., a private emergency), the one or more recipients (e.g., 806C1-806C4) are selected to consist of a first set of recipients; and in accordance with a determination that the communication is associated with a second type of communication (e.g., a second type of emergency different from the first type of emergency, such as, e.g., a public emergency (e.g., a flood, hurricane, earthquake, or other natural disaster)) that is different from the first type of communication, the one or more recipients are selected to consist of a second set of recipients, wherein the second set of recipients includes more recipients than the first set of recipients. Selecting different sets of recipients with different numbers of recipients based on the type of communication enables the computer system to select a set of recipients (and a size of the set) as appropriate for a particular context without the user having to select recipients, which reduces the number of inputs needed to perform an operation.

In some embodiments, in response to receiving the one or more inputs (e.g., 810C and 810D): before sending the communication to the one or more recipients (e.g., 806C1-806C4), the computer system displays a selectable confirmation option (e.g., 808A), wherein the one or more inputs include a selection (e.g., 810D) of the selectable confirmation option, and wherein sending the communication to the one or more recipients is performed in response to receiving the selection of the confirmation option. Displaying the selectable confirmation option in response to receiving the one or more input and before sending the communication provides the user with visual feedback that confirmation is requested in order to send the communication, which provides improved visual feedback.

In some embodiments, the first user interface (e.g., 806B) specific to the emergency communication mode includes an indication (e.g., 806D) (e.g., text and/or a graphic) of the number of recipients in the one or more recipients. In some embodiments, the computer system displays the indication of the number of recipients in the one or more recipients concurrently with the send communication option. Including an indication of the number of recipients in the first user interface provides the user with visual feedback of a number of recipients to which the communication is to be sent, which provides improved visual feedback.

In some embodiments, after sending the communication to the one or more recipients (e.g., in response to receiving the one or more inputs), the computer system displays content of the communication in a message (e.g., 814A, 814B, 816A, 816B, 824A, 824B, 826A, 826B, 828A, 828B, or 832) (e.g., a text message or instant message) of a message conversation (e.g., a message conversation with an emergency service and/or a message conversation displayed in a messaging application). Displaying content of the communication in a message of a message conversation after sending the communication to the one or more recipients provides visual feedback to the user that the message was sent and indicates that additional messages may be sent and/or received, which provides improved visual feedback.

In some embodiments, sending the communication to the one or more recipients includes sending the communication to the one or more recipients via a communication network (e.g., a peer-to-peer network and/or a satellite communication network) other than a terrestrial wireless network (and, optionally, other than a terrestrial internet network and/or a terrestrial cellular network). In some embodiments, the communication network other than a terrestrial wireless network is a peer-to-peer network (e.g., the computer system sends the communication via a peer-to-peer network). In some embodiments, the communication network other than a terrestrial wireless network is a satellite communication network.

In some embodiments, after sending the communication to the one or more recipients, the computer system displays a selectable safety communication option (e.g., 806J); the computer system detects an input (e.g., 810G) selecting the safety communication option; and in response to detecting the input selecting the safety communication option, the computer system sends a safety communication (e.g., 832) to the one or more recipients that indicates (e.g., via text, a graphic, a color, and/or an animation) that a user associated with the computer system is safe. In some embodiments, the safety communication is sent (e.g., propagated) via the communication network other than a terrestrial wireless network. In some embodiments, the safety communication is sent via a messaging application (e.g., a text messaging application and/or an instant messaging application) or an application that provides location information of other computer systems. Sending a safety communication to the one or more recipients that indicates that a user associated with the computer system is safe in response to detecting selection of a displayed safety communication option provides the user with a visual indication that a safety communication can be sent and an efficient technique for sending the safety communication without additional inputs, which provides improved visual feedback and reduces the number of inputs needed to perform an operation.

In some embodiments, after sending the communication to the one or more recipients, the computer system displays a second user interface (e.g., 834) (e.g., a user interface that is not specific to the emergency communication mode, a news tab, and/or a user interface that includes a plurality of representations of news stories) that concurrently includes a representation of the communication (e.g., 834A1) and a representation of a news story (e.g., 834A4) (e.g., a news article). In some embodiments, the representation of the communication includes at least a portion of content included in the communication. In some embodiments, the computer system detects an input selecting the representation of the communication, and in response to detecting the input selecting the representation, the computer system displays content of the communication. Displaying a representation of the communication in a second user interface concurrently with a the news story provides the user with visual feedback that the communication was sent or received and displays the representation of the communication with other content of interest to the user, which provides improved visual feedback.

In some embodiments, the computer system detects selection of an option (e.g., 640A, 640B, 804D, 806G, or 836A) (e.g., a button, affordance, toggle, switch, and/or user-interactive graphical object) for enabling (and, optionally, disabling) communication via an alternative communication network other than a terrestrial wireless network (and, optionally, other than an internet network); and in response to detecting selection (e.g., 610F, 610G, 810C, or 810N) of an option for enabling communication via the alternative communication network, the computer system enables the computer system to communicate via the alternative communication network. In some embodiments, the option for enabling communication via the alternative communication network is displayed in a control menu, control user interface, or widget that includes a plurality of selectable options for controlling settings of the computer system. Enabling the computer system to communicate via the alternative communication network in response to detecting selection of an option for enabling communication via the alternative communication network provides the user with greater ability to configure the functionality of the computer system and enable a mode that allows the computer system to initiate communication via the alternative communication network automatically without additional input when no terrestrial wireless network is available to the computer system to initiate the communication, which reduces the number of inputs needed to perform an operation.

In some embodiments, the first user interface specific to the emergency communication mode is an application widget (e.g., 806B) (e.g., corresponding to an emergency communication application). In some embodiments, an application widget is displayed in a fixed and/or persistent position on a display or user interface (e.g., a home screen or a displayed user interface (e.g., user interface 400) that includes user interface elements corresponding to respective applications, such that when a user interface element is activated, the computer system displays the respective application corresponding to the activated user interface element), as opposed to, e.g., an application window that can be moved and/or re-positioned on a display or user interface during standard operation (e.g., when not in a reconfiguration mode).

In some embodiments, while the computer system is in the emergency communication mode (e.g., 806B) (e.g., while displaying the first user interface specific to the emergency communication mode) (and, optionally, before sending the communication to the one or more recipients), the computer system displays (e.g., in the first user interface) information (e.g., 806C1-806C4 or 806D) of a first recipient of the one or more recipients, including: in accordance with a determination that a user account associated with the computer system includes contact information of the first recipient, the computer system displays a first set of information of the first recipient; and in accordance with a determination that a user account associated with the computer system does not include contact information of the first recipient, the computer system displays a second set of information of the first recipient that is different from the first set of information, wherein the first set of information includes more information than the second set of information (e.g., the computer system displays limited (e.g., less) information about nearby users that are not contacts of the user associated with the computer system). Displaying different sets of information, including different amounts of information, based on whether or not contact information of the recipient is included in a user account associated with the computer system provides the user with visual feedback about whether the recipient is someone the user may know, which provides improved visual feedback.

In some embodiments, the second set of information (e.g., 806C1-806C4) includes a first name (e.g., full first name) associated with the first recipient and does not include a full last name associated with the first recipient (e.g., the computer system displays the full first name and last initial of the first recipient). Displaying a full name of a recipient based on contact information of the recipient being included in a user account associated with the computer system provides the user with visual feedback that the recipient is someone the user may know, which provides improved visual feedback. In some embodiments, the first set of information (e.g., 806C1-806C4) includes a first image (e.g., photo or avatar) associated with the first recipient, and the second set of information includes a second avatar image associated with the first recipient that has lower fidelity than the first image (e.g., the second image is a lower fidelity (e.g., blurred) version of the first image). Displaying a higher fidelity avatar of a recipient based on contact information of the recipient being included in a user account associated with the computer system provides the user with visual feedback that the recipient is someone the user may know, which provides improved visual feedback.

In some embodiments, the communication to the one or more recipients includes information representing a location of the computer system (e.g., 816A, 816B, 826A, and/or 826B) (e.g., the location of the computer system at the time of sending the communication). Including a location of the computer system in the communication provides the user with additional information about the computer system without requiring additional user input, which provides improved visual feedback and reduces the number of inputs needed to perform an operation.

In some embodiments, the computer system displays a map (e.g., 830) that includes a first indication (e.g., 830A) (e.g., a pin or dot) at the location of the computer system and a second indication (e.g., 830B) at a location of the computer system associated with a second (e.g., earlier or later) communication (e.g., an earlier communication, a subsequent communication, and/or a second emergency communication) from the computer system (e.g., to the one or more recipients). Displaying a map that includes a first indication at the location of the computer system and a second indication at a location of the computer system associated with a second communication from the computer system provides the user with visual information about the location of the computer system over time without requiring additional user input, which provides improved visual feedback and reduces the number of inputs needed to perform an operation.

Note that details of the processes described above with respect to method 900 (e.g., FIG. 9) are also applicable in an analogous manner to the methods described/above. For example, method 700 optionally includes one or more of the characteristics of the various methods described above with reference to method 900. For example, selecting recipients based on proximity can be applied to method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve low-bandwidth and/or emergency communication. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to send and/or receive an emergency message. Accordingly, use of such personal information data enables users to send and/or receive an emergency message. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of emergency communications, the present technology can be configured to allow users to select to "opt in" or "opt out" of participation in the collection of personal information data during registration for services or anytime thereafter. In another example, users can select not to be selected to receive emergency messages. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, low-bandwidth and/or emergency communication based on non-personal information data or a bare minimum amount of personal information, such as the content being requested by the device associated with a user, other non-personal information available to the emergency communication mode, or publicly available information.

What is claimed is:

1. A computer system configured to communicate with a display generation component, comprising:
   one or more processors; and
   memory storing one or more programs configured to be executed by the one or more processors, the one or more programs including instructions for:
     displaying, via the display generation component, a user interface for initiating a communication, the user interface including:
       in accordance with a determination that a terrestrial wireless network is available to the computer system of a first user to initiate the communication to a second user that is different from the first user, displaying at least a portion of the user interface with a first appearance; and
       in accordance with a determination that no terrestrial wireless network is available to the computer system of the first user to initiate the communication to the second user that is different from the first user, displaying the portion of the user interface with a second appearance, wherein the second appearance is different from the first appearance and includes an indication that the communication to the second user that is different from the first user can be initiated via an alternative communication network other than the terrestrial wireless network.

2. The computer system of claim 1, wherein the alternative communication network other than the terrestrial wireless network includes a peer-to-peer communication network.

3. The computer system of claim 1, wherein the first appearance includes one or more messages having a first color and the second appearance includes one or more messages having a second color different from the first color.

4. The computer system of claim 1, the one or more programs further including instructions for:
   in accordance with the determination that no terrestrial wireless network is available to the computer system of the first user to initiate the communication to the second user that is different from the first user, displaying, in the user interface, a representation of a map and/or a satellite view.

5. The computer system of claim 1, wherein the indication that the communication to the second user that is different from the first user can be initiated via an alternative communication network other than the terrestrial wireless network includes an indication at a fixed location in the user interface for initiating the communication.

6. The computer system of claim 1, wherein the user interface includes one or more representations of suggested recipients for the communication, the one or more programs further including instructions for:
   in accordance with a determination that a terrestrial wireless network is available to the computer system to initiate the communication, displaying the one or more representations of suggested recipients for the communication in a first manner; and
   in accordance with a determination that no terrestrial wireless network is available to the computer system to initiate the communication, displaying the one or more representations of suggested recipients for the communication in a second manner different from the first manner.

7. The computer system of claim 6, wherein the one or more representations of suggested recipients for the communication are based on a proximity of remote computer systems associated with the suggested recipients for the communication to the computer system.

8. The computer system of claim 6, wherein the one or more representations of suggested recipients for the communication are based on a proximity of remote computer systems associated with the suggested recipients for the communication to the computer system and a determination that the suggested recipients are associated with the computer system.

9. The computer system of claim 6, wherein the one or more representations of suggested recipients for the communication are based on a proximity of remote computer systems associated with the suggested recipients for the communication to the computer system and a determination that the suggested recipients are associated with the computer system.

10. The computer system of claim 6, wherein the one or more representations of suggested recipients for the communication are based on a determination that the suggested recipients are associated with the computer system and how recently and/or frequently the suggested recipients have been in contact with a user associated with the computer system.

11. The computer system of claim 1, wherein displaying the user interface for initiating the communication includes:
    in accordance with a determination that no terrestrial wireless network is available to the computer system to initiate the communication, displaying, in the user interface for initiating the communication, an indication of a number of computer systems that are accessible via the alternative communication network other than the terrestrial wireless network.

12. The computer system of claim 11, wherein displaying the user interface for initiating the communication includes:
    displaying, in a first portion of the user interface for initiating the communication, a first set of representations of contactable entities; and
    displaying, in a second portion, different from the first portion, of the user interface for initiating the communication, a second set of representations of contactable entities that can be contacted via the alternative communication network, wherein the first set of representations of contactable entities is different from the second set of representations of contactable entities.

13. The computer system of claim 1, wherein the computer system is in communication with one or more input devices, the one or more programs further including instructions for:
    detecting, via the one or more input devices, one or more inputs corresponding to a request to display one or more representations of contactable entities; and
    in response to detecting the one or more inputs corresponding to the request to display the one or more representations of the contactable entities, displaying, in the user interface, the one or more representations of the contactable entities, including:

in accordance with a determination that a computer system associated with a respective contactable entity satisfies a proximity condition, displaying a representation of the respective entity in a first manner; and in accordance with a determination that a computer system associated with the respective contactable entity does not satisfy the proximity condition, displaying the representation of the respective contactable entity in a second manner different from the first manner.

14. The computer system of claim 1, wherein the user interface includes one or more representations of potential recipients for the communication, including a first representation of a first potential recipient, the one or more programs further including instructions for:

in accordance with a determination that a computer system associated with the first potential recipient is accessible via the alternative communication network, displaying the first representation of the first potential recipients with a first color; and in accordance with a determination that a computer system associated with the first potential recipient is not accessible via the alternative communication network, displaying the first representation of the first potential recipients with a second color different from the first color.

15. The computer system of claim 1, the one or more programs further including instructions for:

displaying, in the user interface, one or more representations of previous conversations, wherein an order of the one or more representations of previous conversations is based on accessibility of computer systems associated with participants of respective previous conversations via the alternative communication network.

16. The computer system of claim 1, the one or more programs further including instructions for:

displaying, in the user interface, one or more representations of previous conversations, including a first representation of a first conversation and a second representation of a second conversation, wherein displaying the one or more representations of the previous conversations includes:

in accordance with a determination that a computer system of one or more participants of the first conversation is accessible via the alternative communication network, displaying an indication that the computer system of the one or more participants of the first conversation is accessible via the alternative communication network; and in accordance with a determination that a computer system of one or more participants of the first conversation is not accessible via the alternative communication network, displaying the first representation of the first conversation without the indication that the computer system of the one or more participants of the first conversation is accessible via the alternative communication network.

17. The computer system of claim 1, the one or more programs further including instructions for:

detecting one or more inputs corresponding to a request to send the communication;

in response to detecting one or more inputs corresponding to a request to send the communication, attempting to send the communication via a terrestrial wireless network before attempting to send the communication via the alternative communication network; and after attempting to send the communication via the terrestrial wireless network, in accordance with a determination that attempting to send the communication via the terrestrial wireless network failed, attempting to send the communication via the alternative communication network.

18. The computer system of claim 1, wherein the determination that no terrestrial wireless network is available to the computer system of the first user to initiate the communication to the second user that is different from the first user is made if the computer system is able to receive a signal from a terrestrial wireless network but is unable to establish a communication link.

19. The computer system of claim 1, wherein the computer system is automatically enabled to initiate the communication via the alternative communication network.

20. The computer system of claim 1, the one or more programs further including instructions for:

detecting selection of an option for enabling communication via the alternative communication network; and in response to detecting selection of an option for enabling communication via the alternative communication network, enabling the computer system to communicate via the alternative communication network.

21. The computer system of claim 1, the one or more programs further including instructions for:

detecting one or more inputs corresponding to a request to initiate the communication via a phone call; and in response to detecting the one or more inputs corresponding to a request to initiate the communication via a phone call:

in accordance with a determination that a terrestrial wireless network is available to the computer system to initiate the communication, initiating the communication via a phone call; and in accordance with a determination that no terrestrial wireless network is available to the computer system to initiate the communication, displaying a user interface of a messaging application for initiating the communication via a message.

22. The computer system of claim 1, wherein displaying the user interface includes:

in accordance with a determination that no terrestrial wireless network is available to the computer system to initiate the communication, displaying one or more options for selecting content of the communication.

23. The computer system of claim 1, the one or more programs further including instructions for:

in accordance with a determination that one or more communications have been requested to be sent but have not been sent, displaying an indication that one or more communications have been requested to be sent but have not been sent.

24. The computer system of claim 23, the one or more programs further including instructions for:

while displaying the indication that one or more communications have been requested to be sent but have not been sent, detecting an input corresponding to a selection of the indication that one or more communications have been requested to be sent but have not been sent; and in response to detecting an input corresponding to a selection of the indication that one or more communications have been requested to be sent but have not been sent, displaying representations, different from the indication that one or more communications have been requested to be sent but have not been sent, of the one or more communications that have been requested to be sent but have not been sent.

25. A non-transitory computer-readable storage medium storing one or more programs configured to be executed by one or more processors of a computer system that is in communication with a display generation component, the one or more programs including instructions for:
   displaying, via the display generation component, a user interface for initiating a communication, the user interface including:
      in accordance with a determination that a terrestrial wireless network is available to the computer system of a first user to initiate the communication to a second a second user that is different from the first user, displaying at least a portion of the user interface with a first appearance; and
      in accordance with a determination that no terrestrial wireless network is available to the computer system of the first user to initiate the communication to the second user that is different from the first user, displaying the portion of the user interface with a second appearance, wherein the second appearance is different from the first appearance and includes an indication that the communication to the second user that is different from the first user can be initiated via an alternative communication network other than the terrestrial wireless network.

26. The non-transitory computer-readable storage medium of claim 25, wherein the alternative communication network other than the terrestrial wireless network includes a peer-to-peer communication network.

27. The non-transitory computer-readable storage medium of claim 25, the one or more programs further including instructions for:
   in accordance with the determination that no terrestrial wireless network is available to the computer system of the first user to initiate the communication to the second user that is different from the first user, displaying, in the user interface, a representation of a map and/or a satellite view.

28. The non-transitory computer-readable storage medium of claim 25, wherein the indication that the communication to the second user that is different from the first user can be initiated via an alternative communication network other than the terrestrial wireless network includes an indication at a fixed location in the user interface for initiating the communication.

29. The non-transitory computer-readable storage medium of claim 25, wherein the user interface includes one or more representations of suggested recipients for the communication, the one or more programs further including instructions for:
   in accordance with a determination that a terrestrial wireless network is available to the computer system to initiate the communication, displaying the one or more representations of suggested recipients for the communication in a first manner; and
   in accordance with a determination that no terrestrial wireless network is available to the computer system to initiate the communication, displaying the one or more representations of suggested recipients for the communication in a second manner different from the first manner.

30. The non-transitory computer-readable storage medium of claim 25, wherein displaying the user interface for initiating the communication includes:
   in accordance with a determination that no terrestrial wireless network is available to the computer system to initiate the communication, displaying, in the user interface for initiating the communication, an indication of a number of computer systems that are accessible via the alternative communication network other than the terrestrial wireless network.

31. The non-transitory computer-readable storage medium of claim 25, wherein the computer system is in communication with one or more input devices, the one or more programs further including instructions for:
   detecting, via the one or more input devices, one or more inputs corresponding to a request to display one or more representations of contactable entities; and
   in response to detecting the one or more inputs corresponding to the request to display the one or more representations of the contactable entities, displaying, in the user interface, the one or more representations of the contactable entities, including:
      in accordance with a determination that a computer system associated with a respective contactable entity satisfies a proximity condition, displaying a representation of the respective entity in a first manner; and
      in accordance with a determination that a computer system associated with the respective contactable entity does not satisfy the proximity condition, displaying the representation of the respective contactable entity in a second manner different from the first manner.

32. The non-transitory computer-readable storage medium of claim 25, wherein the user interface includes one or more representations of potential recipients for the communication, including a first representation of a first potential recipient, the one or more programs further including instructions for:
   in accordance with a determination that a computer system associated with the first potential recipient is accessible via the alternative communication network, displaying the first representation of the first potential recipients with a first color; and
   in accordance with a determination that a computer system associated with the first potential recipient is not accessible via the alternative communication network, displaying the first representation of the first potential recipients with a second color different from the first color.

33. The non-transitory computer-readable storage medium of claim 25, the one or more programs further including instructions for:
   displaying, in the user interface, one or more representations of previous conversations, wherein an order of the one or more representations of previous conversations is based on accessibility of computer systems associated with participants of respective previous conversations via the alternative communication network.

34. The non-transitory computer-readable storage medium of claim 25, the one or more programs further including instructions for:
   displaying, in the user interface, one or more representations of previous conversations, including a first representation of a first conversation and a second representation of a second conversation, wherein displaying the one or more representations of the previous conversations includes:
      in accordance with a determination that a computer system of one or more participants of the first conversation is accessible via the alternative communication network, displaying an indication that the computer system of the one or more participants of the first conversation is accessible via the alternative communication network; and in accordance with a determination that a computer system of one or more participants of the first conversation is not accessible via the alternative communication network, displaying the first representation of the first conversation without the indication that the computer system of the one or more participants of the first conversation is accessible via the alternative communication network.

35. The non-transitory computer-readable storage medium of claim 25, the one or more programs further including instructions for:

detecting one or more inputs corresponding to a request to send the communication;

in response to detecting one or more inputs corresponding to a request to send the communication, attempting to send the communication via a terrestrial wireless network before attempting to send the communication via the alternative communication network; and after attempting to send the communication via the terrestrial wireless network, in accordance with a determination that attempting to send the communication via the terrestrial wireless network failed, attempting to send the communication via the alternative communication network.

36. The non-transitory computer-readable storage medium of claim 25, wherein the determination that no terrestrial wireless network is available to the computer system of the first user to initiate the communication to the second user that is different from the first user is made if the computer system is able to receive a signal from a terrestrial wireless network but is unable to establish a communication link.

37. The non-transitory computer-readable storage medium of claim 25, wherein the computer system is automatically enabled to initiate the communication via the alternative communication network.

38. The non-transitory computer-readable storage medium of claim 25, the one or more programs further including instructions for:

detecting selection of an option for enabling communication via the alternative communication network; and in response to detecting selection of an option for enabling communication via the alternative communication network, enabling the computer system to communicate via the alternative communication network.

39. The non-transitory computer-readable storage medium of claim 25, the one or more programs further including instructions for:

detecting one or more inputs corresponding to a request to initiate the communication via a phone call; and in response to detecting the one or more inputs corresponding to a request to initiate the communication via a phone call:

in accordance with a determination that a terrestrial wireless network is available to the computer system to initiate the communication, initiating the communication via a phone call; and in accordance with a determination that no terrestrial wireless network is available to the computer system to initiate the communication, displaying a user interface of a messaging application for initiating the communication via a message.

40. The non-transitory computer-readable storage medium of claim 25, wherein displaying the user interface includes:

in accordance with a determination that no terrestrial wireless network is available to the computer system to initiate the communication, displaying one or more options for selecting content of the communication.

41. The non-transitory computer-readable storage medium of claim 25, the one or more programs further including instructions for:

in accordance with a determination that one or more communications have been requested to be sent but have not been sent, displaying an indication that one or more communications have been requested to be sent but have not been sent.

42. A method, comprising:

at a computer system that is in communication with a display generation component:

displaying, via the display generation component, a user interface for initiating a communication, the user interface including:

in accordance with a determination that a terrestrial wireless network is available to the computer system of a first user to initiate the communication to a second user that is different from the first user, displaying at least a portion of the user interface with a first appearance; and in accordance with a determination that no terrestrial wireless network is available to the computer system of the first user to initiate the communication to the second user that is different from the first user, displaying the portion of the user interface with a second appearance, wherein the second appearance is different from the first appearance and includes an indication that the communication to the second user that is different from the first user can be initiated via an alternative communication network other than the terrestrial wireless network.

43. The method of claim 42, wherein the alternative communication network other than the terrestrial wireless network includes a peer-to-peer communication network.

44. The method of claim 42, further comprising:

in accordance with the determination that no terrestrial wireless network is available to the computer system of the first user to initiate the communication to the second user that is different from the first user, displaying, in the user interface, a representation of a map and/or a satellite view.

45. The method of claim 42, wherein the indication that the communication to the second user that is different from the first user can be initiated via an alternative communication network other than the terrestrial wireless network includes an indication at a fixed location in the user interface for initiating the communication.

46. The method of claim 42, wherein the user interface includes one or more representations of suggested recipients for the communication, the method further comprising:

in accordance with a determination that a terrestrial wireless network is available to the computer system to initiate the communication, displaying the one or more representations of suggested recipients for the communication in a first manner; and in accordance with a determination that no terrestrial wireless network is available to the computer system to initiate the communication, displaying the one or more representations of suggested recipients for the communication in a second manner different from the first manner.

47. The method of claim 42, wherein displaying the user interface for initiating the communication includes:
   in accordance with a determination that no terrestrial wireless network is available to the computer system to initiate the communication, displaying, in the user interface for initiating the communication, an indication of a number of computer systems that are accessible via the alternative communication network other than the terrestrial wireless network.

48. The method of claim 42, wherein the computer system is in communication with one or more input devices, the method further comprising:
   detecting, via the one or more input devices, one or more inputs corresponding to a request to display one or more representations of contactable entities; and
   in response to detecting the one or more inputs corresponding to the request to display the one or more representations of the contactable entities, displaying, in the user interface, the one or more representations of the contactable entities, including:
      in accordance with a determination that a computer system associated with a respective contactable entity satisfies a proximity condition, displaying a representation of the respective entity in a first manner; and
      in accordance with a determination that a computer system associated with the respective contactable entity does not satisfy the proximity condition, displaying the representation of the respective contactable entity in a second manner different from the first manner.

49. The method of claim 42, wherein the user interface includes one or more representations of potential recipients for the communication, including a first representation of a first potential recipient, the method further comprising:
   in accordance with a determination that a computer system associated with the first potential recipient is accessible via the alternative communication network, displaying the first representation of the first potential recipients with a first color; and
   in accordance with a determination that a computer system associated with the first potential recipient is not accessible via the alternative communication network, displaying the first representation of the first potential recipients with a second color different from the first color.

50. The method of claim 42, further comprising:
   displaying, in the user interface, one or more representations of previous conversations, wherein an order of the one or more representations of previous conversations is based on accessibility of computer systems associated with participants of respective previous conversations via the alternative communication network.

51. The method of claim 42, further comprising:
   displaying, in the user interface, one or more representations of previous conversations, including a first representation of a first conversation and a second representation of a second conversation, wherein displaying the one or more representations of the previous conversations includes:
      in accordance with a determination that a computer system of one or more participants of the first conversation is accessible via the alternative communication network, displaying an indication that the computer system of the one or more participants of the first conversation is accessible via the alternative communication network; and
      in accordance with a determination that a computer system of one or more participants of the first conversation is not accessible via the alternative communication network, displaying the first representation of the first conversation without the indication that the computer system of the one or more participants of the first conversation is accessible via the alternative communication network.

52. The method of claim 42, further comprising:
   detecting one or more inputs corresponding to a request to send the communication;
   in response to detecting one or more inputs corresponding to a request to send the communication, attempting to send the communication via a terrestrial wireless network before attempting to send the communication via the alternative communication network; and
   after attempting to send the communication via the terrestrial wireless network, in accordance with a determination that attempting to send the communication via the terrestrial wireless network failed, attempting to send the communication via the alternative communication network.

53. The method of claim 42, wherein the determination that no terrestrial wireless network is available to the computer system of the first user to initiate the communication to the second user that is different from the first user is made if the computer system is able to receive a signal from a terrestrial wireless network but is unable to establish a communication link.

54. The method of claim 42, wherein the computer system is automatically enabled to initiate the communication via the alternative communication network.

55. The method of claim 42, further comprising:
   detecting selection of an option for enabling communication via the alternative communication network; and
   in response to detecting selection of an option for enabling communication via the alternative communication network, enabling the computer system to communicate via the alternative communication network.

56. The method of claim 42, further comprising:
   detecting one or more inputs corresponding to a request to initiate the communication via a phone call; and
   in response to detecting the one or more inputs corresponding to a request to initiate the communication via a phone call:
      in accordance with a determination that a terrestrial wireless network is available to the computer system to initiate the communication, initiating the communication via a phone call; and
      in accordance with a determination that no terrestrial wireless network is available to the computer system to initiate the communication, displaying a user interface of a messaging application for initiating the communication via a message.

57. The method of claim 42, wherein displaying the user interface includes:
   in accordance with a determination that no terrestrial wireless network is available to the computer system to initiate the communication, displaying one or more options for selecting content of the communication.

58. The method of claim 42, further comprising:
   in accordance with a determination that one or more communications have been requested to be sent but have not been sent, displaying an indication that one or more communications have been requested to be sent but have not been sent.

* * * * *